(12) United States Patent
Sun

(10) Patent No.: US 11,913,264 B2
(45) Date of Patent: Feb. 27, 2024

(54) ACTUATION ASSEMBLY AND REFUELING PORT OR CHARGING PORT FLIP COVER ASSEMBLY

(71) Applicant: ILLINOIS TOOL WORKS INC., Glenview, IL (US)

(72) Inventor: Yuan Sun, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 323 days.

(21) Appl. No.: 17/515,973

(22) Filed: Nov. 1, 2021

(65) Prior Publication Data

US 2022/0136292 A1 May 5, 2022

(30) Foreign Application Priority Data

Nov. 1, 2020 (CN) .......................... 202011199308.5
Apr. 1, 2021 (CN) .......................... 202110356755.5
Apr. 1, 2021 (CN) .......................... 202110356763.X

(51) Int. Cl.
*E05B 83/34* (2014.01)
*E05B 81/18* (2014.01)
(Continued)

(52) U.S. Cl.
CPC .............. *E05B 83/34* (2013.01); *B60K 15/05* (2013.01); *E05B 81/06* (2013.01); *E05B 81/18* (2013.01); *E05B 81/30* (2013.01); *E05F 15/614* (2015.01); *B60K 2015/0569* (2013.01); *E05Y 2201/434* (2013.01); *E05Y 2201/716* (2013.01); *E05Y 2900/534* (2013.01)

(58) Field of Classification Search
CPC ........ E05B 83/34; E05F 15/614; B60K 81/06; B60K 81/18; B60K 81/30; B60K 2015/0569

USPC ........................................................ 296/97.22
See application file for complete search history.

(56) References Cited

U.S. PATENT DOCUMENTS

2016/0375762 A1* 12/2016 Lee .................... B60K 15/05
                                                     296/97.22
2020/0122570 A1* 4/2020 Sha .................... E05B 81/06

FOREIGN PATENT DOCUMENTS

CN      110562332 A    12/2019
DE   102019128551 A1    4/2020

OTHER PUBLICATIONS

Office Action from corresponding German Patent Application No. 10 2021 127 868.6, dated Sep. 16, 2022 (16 pages).

* cited by examiner

*Primary Examiner* — Mahmoud Gimie
(74) *Attorney, Agent, or Firm* — Quarles & Brady LLP

(57) ABSTRACT

An actuation assembly for a refueling port or charging port flip cover assembly is rotatably mounted on a base and includes a locking means, a flip cover rotating shaft, a transmission gear, a drive gear and a drive member. The locking means is movably disposed on the base and configured to lock or release a flip cover. The flip cover rotating shaft is configured to rotate the flip cover and includes a fitting portion. The transmission gear includes a receiving portion and is installed around the fitting portion. The drive gear and the drive member are configured to synchronously rotate. The drive gear is meshed with the transmission gear and the drive member is configured to drive the locking means. In moving the locking means from a release position to a locking position, the drive gear blocks the rotation of the transmission gear and prevents the flip cover from opening.

10 Claims, 40 Drawing Sheets

(51) Int. Cl.
*E05B 81/30* (2014.01)
*B60K 15/05* (2006.01)
*E05F 15/614* (2015.01)
*E05B 81/06* (2014.01)

ACTUATION ASSEMBLY AND REFUELING PORT OR CHARGING PORT FLIP COVER ASSEMBLY

CROSS REFERENCE TO RELATED APPLICATIONS

This application claims priority to Chinese Application Serial No. 202011199308.5, filed Nov. 1, 2020, Chinese Application Serial No. 202110356763.X, filed Apr. 1, 2021, and Chinese Application Serial No. 202110356755.5, filed Apr. 1, 2021 each of which is hereby incorporated by reference in its entirety.

FIELD OF THE DISCLOSURE

The present disclosure relates to a flip cover assembly, and in particular to a refueling port or charging port flip cover assembly for a vehicle.

BACKGROUND

A refueling port or charging port flip cover for a vehicle is configured to expose or cover a refueling port or a charging port of the vehicle. The refueling port or charging port flip cover is rotatably mounted on a vehicle body. When refueling or charging is not required, the refueling port or charging port flip cover needs to be locked in a closed position by a locking means. When refueling or charging is required, the locking means needs to release the flip cover, and the flip cover is then moved from the closed position to an open position. Therefore, there is a need for an actuation assembly capable of controlling the movements of the flip cover and the locking means.

SUMMARY

An object of the present disclosure is to meet, at least in part, the above technical requirements. According to a first aspect of the present disclosure, the present disclosure provides an actuation assembly for actuating a flip cover rotatably mounted on a base. The actuation assembly includes a locking means, a flip cover rotating shaft, a transmission gear, a drive gear and a drive member. The locking means is movably disposed on the base and is configured to lock or release the flip cover. The flip cover rotating shaft is configured to drive the flip cover to rotate, and the flip cover rotating shaft comprises a fitting portion. The transmission gear comprises a receiving portion, and the transmission gear is installed around the fitting portion of the flip cover rotating shaft by means of the receiving portion. The drive gear and the drive member are configured to synchronously rotate under the drive of a common power source, the drive gear is meshed with the transmission gear for transmission, and the drive member is configured to drive the locking means to move. The fitting portion and the receiving portion are provided with an engagement structure configured to enable the receiving portion to be rotatably engaged with or disengaged from the fitting portion. When the receiving portion is rotatably engaged with the fitting portion, the drive gear is capable of driving the flip cover to rotate by means of the transmission gear and the flip cover rotating shaft. When the receiving portion is rotatably disengaged from the fitting portion, the transmission gear is capable of rotating with respect to the flip cover rotating shaft.

According to the actuation assembly described above, the locking means has a locking position and a release position, and the locking means is configured to lock the flip cover when the locking means is in the locking position and to release the flip cover when the locking means is in the release position. The engagement structure is configured such that, in the process of moving the locking means from the locking position to the release position, the receiving portion is rotationally disengaged from the fitting portion such that the transmission gear rotates with respect to the flip cover rotating shaft and, when the receiving portion is rotationally engaged with the fitting portion to drive the flip cover rotating shaft to rotate by means of the transmission gear so as to open the flip cover, the locking means is in the release position.

According to the actuation assembly described above, the engagement structure comprises a protrusion disposed on the flip cover rotating shaft and a protrusion receiving cavity formed in the transmission gear, the protrusion being formed by extending outward from an outer periphery of the flip cover rotating shaft. In a rotating direction of the flip cover rotating shaft, the size of the protrusion receiving cavity is greater than that of the protrusion.

According to the actuation assembly described above, the transmission gear is in the shape of a fan, and an outer circumference of the fan comprises toothed portion for meshing with the drive gear. The toothed portion is disposed around the receiving portion.

According to the actuation assembly described above, a central angle of the toothed portion of the outer circumference of the transmission gear is greater than the maximum angle to which the flip cover is capable of being opened.

According to the actuation assembly described above, the drive gear comprises outer teeth disposed around the entire outer circumference of the drive gear.

According to the actuation assembly described above, a drive means comprises a drive shaft, the drive gear and the drive member being connected to the drive shaft, and the drive gear and the drive member being capable of rotating with the rotation of the drive shaft. The drive shaft is driven by the common power source.

According to the actuation assembly described above, the drive member comprises a drive arm, the drive arm being rotatable about the drive shaft. The drive arm and the locking means are configured such that the drive arm is capable of pushing the locking means to move from the locking position towards the release position.

According to a second aspect of the present disclosure, the present disclosure provides a refueling port or charging port flip cover assembly comprising a base, a flip cover, and an actuation assembly according to the first aspect of the present disclosure. The flip cover is rotatably mounted on the base. The actuation assembly is disposed on the base.

According to the refueling port or charging port flip cover assembly described above, the base is provided with a through hole and the flip cover is provided with a locking receiving portion. The locking means is capable of passing through the through hole and the locking receiving portion to lock the flip cover.

According to a third aspect of the present disclosure, the present disclosure provides an actuation assembly for actuating a flip cover movably mounted on a base. The actuation assembly comprises a drive gear and a transmission gear. The drive gear is configured to be rotatably driven. The transmission gear is configured to be rotatable in a first direction under the drive of the drive gear to open the flip cover with respect to the base, and to be rotatable in a second direction opposite to the first direction to close the flip cover with respect to the base. Herein, a plurality of first drive teeth and a second drive tooth having the shape different from that of the plurality of first drive teeth are disposed on the outer circumference of the drive gear, and the second drive tooth is configured to be capable of blocking the transmission gear from rotating in the first direction and therefore preventing the flip cover from opening when the flip cover is closed and the drive gear remains stationary.

According to the actuation assembly of the third aspect of the present disclosure, a plurality of first transmission teeth, a second transmission tooth and a transmission disengagement portion are disposed on the outer circumference of the transmission gear, one end of the transmission disengagement portion in a circumferential direction is connected to one of the first transmission teeth, the other end thereof in the circumferential direction is connected to the second transmission tooth, and the transmission disengagement portion is a toothless portion and is configured to be capable of accommodating the second drive tooth. The plurality of first drive teeth can be meshed with the plurality of first transmission teeth such that the drive gear drives the transmission gear to rotate. Herein, when the flip cover is closed, the second drive tooth engages with the first transmission tooth that is connected to the transmission disengagement portion, so as to block the transmission gear from rotating to open the flip cover.

According to the actuation assembly of the third aspect of the present disclosure, the second drive tooth has a tooth crest configured to cooperate with the first transmission tooth that is connected to one end of the transmission disengagement portion of the transmission gear, so as to block transmission gear from rotating.

According to the actuation assembly of the third aspect of the present disclosure, a third drive tooth having the shape different from that of the plurality of first drive teeth and a drive disengagement portion are further disposed on the outer circumference of the drive gear. The drive disengagement portion is a toothless portion The second drive tooth is disposed between the plurality of first drive teeth and the drive disengagement portion, and one end of the drive disengagement portion in a circumferential direction is connected to the second drive tooth, and the other end thereof in the circumferential direction is connected to the third drive tooth. The third drive tooth comprises a limiting face connected to the drive disengagement portion, the limiting face is configured to cooperate with the tooth crest of the second transmission tooth for limiting the magnitude of rotation of the drive gear with respect to the transmission gear.

According to the actuation assembly of the third aspect of the present disclosure, the size of the second drive tooth is greater than that of the first drive tooth on any circumference centered on a rotational axis of the drive gear and extending through the second drive tooth and the first drive teeth.

According to the actuation assembly of the third aspect of the present disclosure, an addendum circle of the second drive tooth coincides with an addendum circle of the first drive teeth.

According to the actuation assembly of the third aspect of the present disclosure, the tooth crests of the teeth on the drive gear are on the same circumference, or the tooth crests of the teeth on the transmission gear are on one circumference.

According to the actuation assembly of the third aspect of the present disclosure, the actuation assembly further comprises a locking means and a drive member. The locking means is movably disposed on the base, the locking means has a locking position and a release position, and the locking means is configured to be movable between the locking position and the release position. The drive gear and the drive member are configured to synchronously rotate under the drive of the common power source and the drive member is configured to drive the locking means to move. Herein, the drive gear and the transmission gear are configured such that, in the process of moving the locking means from the locking position to the release position, the drive gear is rotationally disengaged from the transmission gear and, in the process of moving the locking means from the release position to the locking position, the drive gear is rotationally disengaged from the transmission gear, and is capable of blocking the transmission gear from rotating to open the flip cover.

According to a fourth aspect of the present disclosure, the present disclosure provides a refueling port or charging port flip cover assembly, comprising a base, a flip cover, and the actuation assembly described above. The flip cover is movably mounted on the base. The actuation assembly is disposed on the base.

According to the refueling port or charging port flip cover assembly of the fourth aspect of the present disclosure, the base is provided with a through hole, and the flip cover is provided with a locking receiving portion. The locking means is capable of passing through the through hole and the locking receiving portion to lock the flip cover.

According to the actuation assembly of the present disclosure, the drive gear is capable of blocking the transmission gear from rotating to open the flip cover when the flip cover is in a closed position and the locking means is moved from the release position towards the locking position.

The concept, specific structures and resulting technical effects of the present disclosure are further described below in conjunction with the accompanying drawings so as to fully understand the object, features and effects of the present disclosure.

BRIEF DESCRIPTION OF THE DRAWINGS

The present disclosure will be understood more easily when the following detailed description is read in conjunction with the accompanying drawings, in which.

DETAILED DESCRIPTION OF EMBODIMENTS

Various specific embodiments of the present disclosure will be described below with reference to the accompanying drawings which constitute part of this description. It is to be understood that although the terms indicating orientations, such as "front", "rear", "upper", "lower", "left", "right", "top" and "bottom", are used in the present disclosure to describe structural parts and elements in various examples of the present disclosure, these terms are used herein only for ease of illustration and are determined based on the example orientations as shown in the accompanying drawings. Since the embodiments disclosed in the present application can be arranged in different directions, these terms indicating directions are merely illustrative and should not be considered as limitations.

Figure 1A:
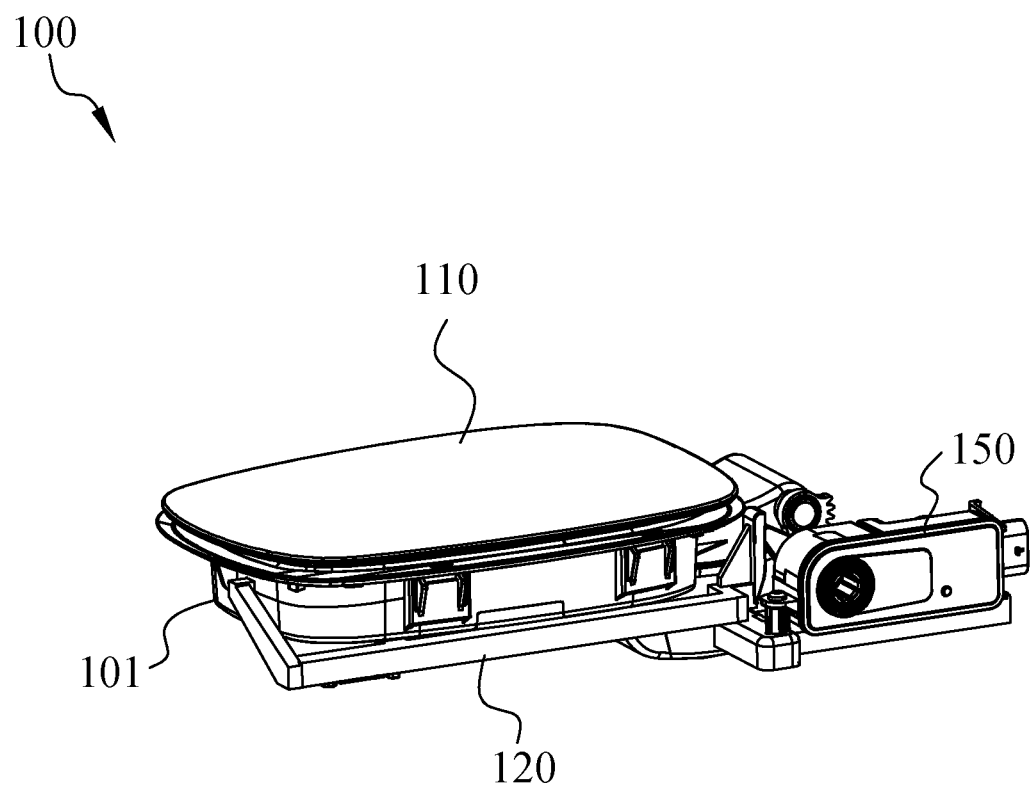
FIG. 1A is a perspective view, viewed from the front, of a first embodiment of a refueling port or charging port flip cover assembly of the present disclosure, with a flip cover being in a closed state.
Figure 1B:
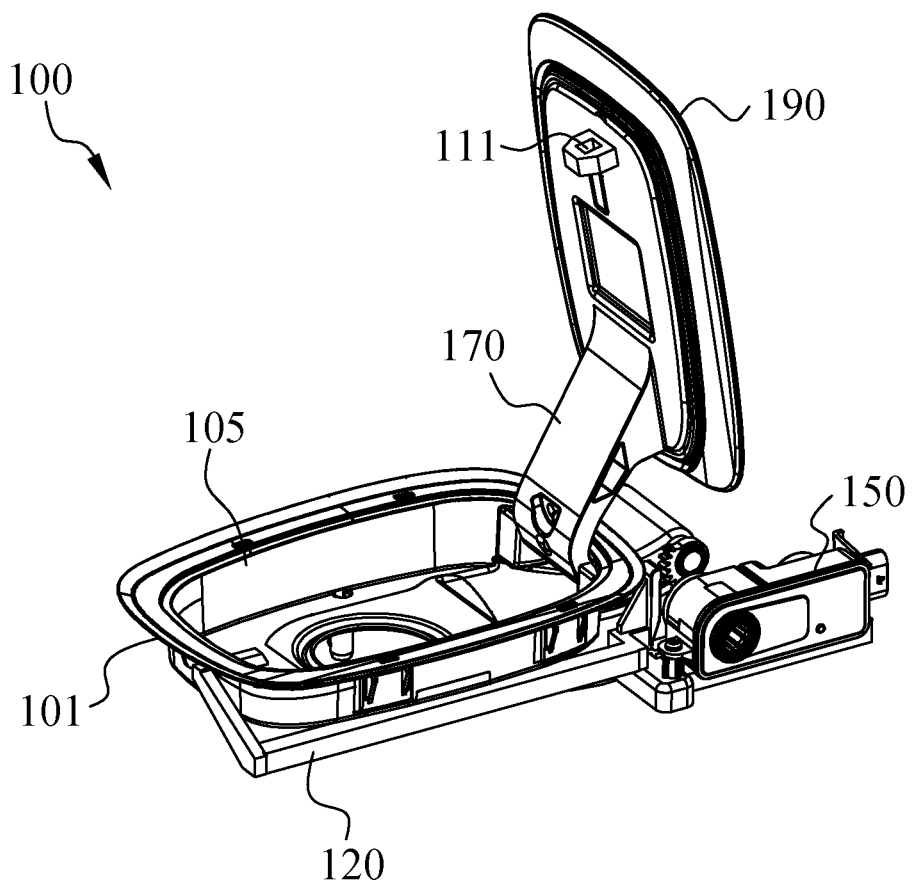
FIG. 1B is a perspective view, viewed from the front, of the refueling port or charging port flip cover assembly shown in FIG. 1A, with the flip cover being in an open state.
Figure 1C:
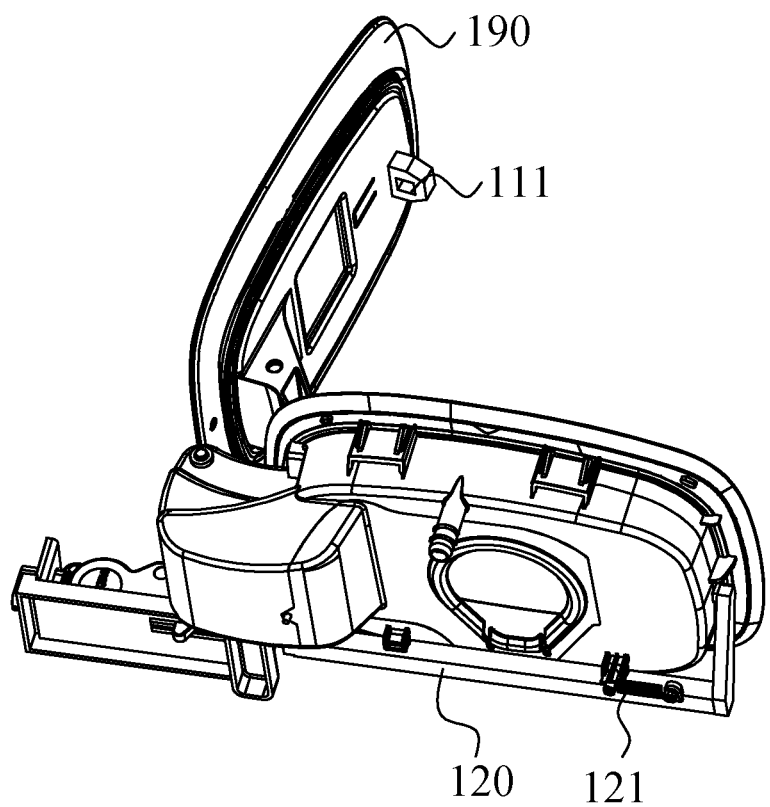
FIG. 1C is a perspective view, viewed from below, of the refueling port or charging port flip cover assembly shown in FIG. 1A.
Figure 1D:
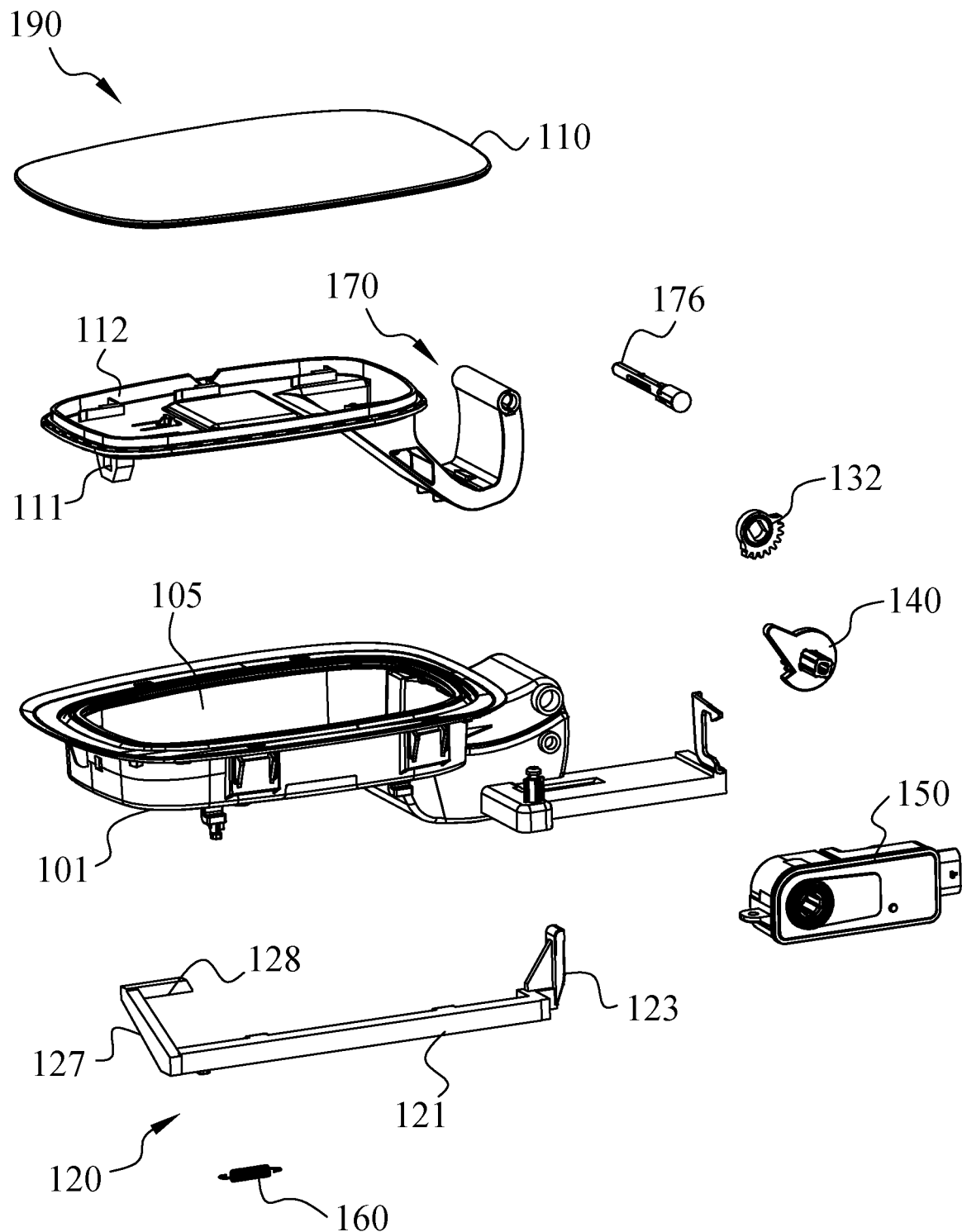
FIG. 1D is an exploded view, viewed from the front, of the refueling port or charging port flip cover assembly shown in FIG. 1A.
Figure 1E:
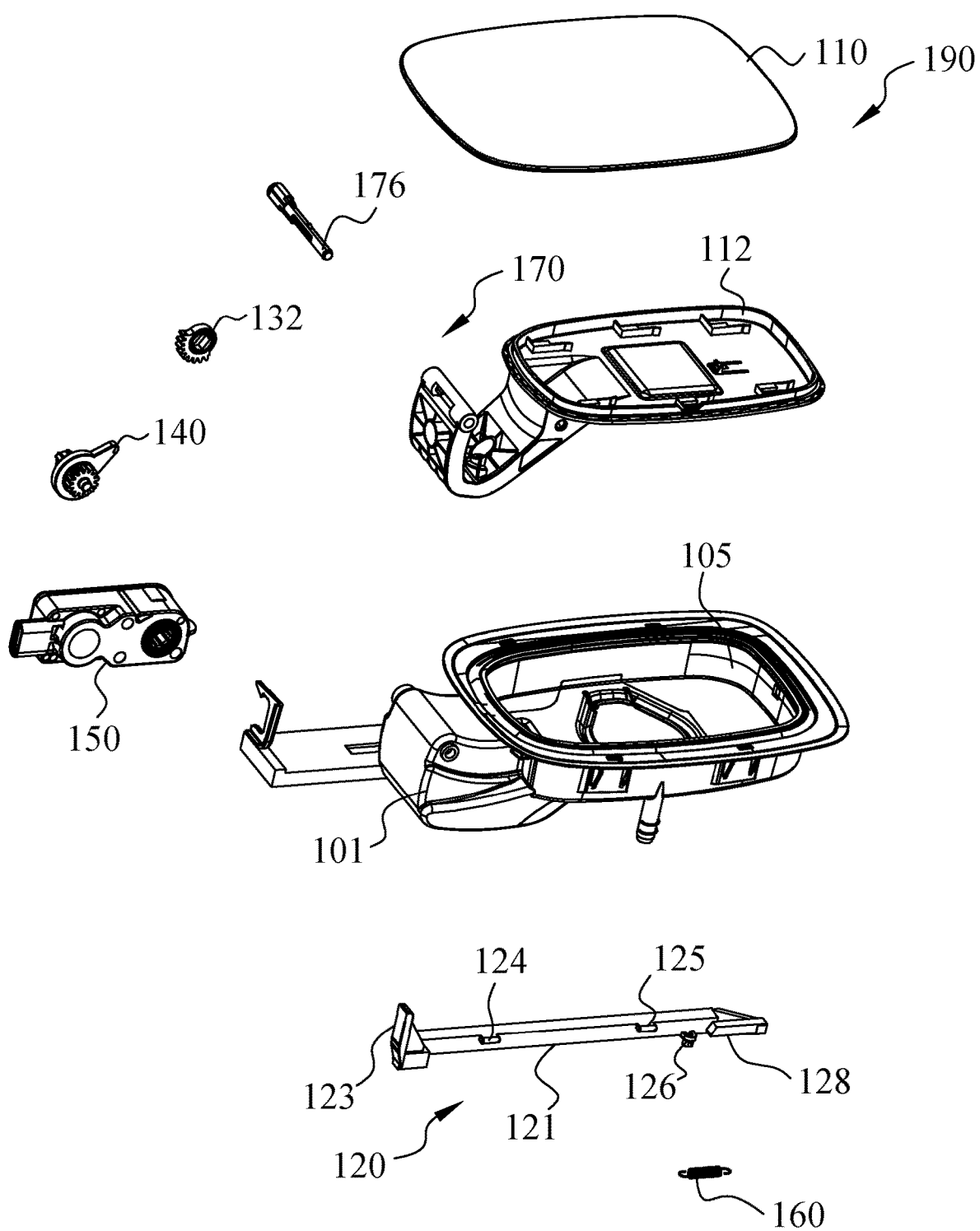
FIG. 1E is an exploded view, viewed from the rear, of the refueling port or charging port flip cover assembly shown in FIG. 1A.

FIG. 1A is a perspective view, viewed from the front, of a first embodiment of a refueling port or charging port flip cover assembly 100 of the present disclosure, with a flip cover 190 being in a closed state. FIG. 1B is a perspective view, viewed from the front, of the refueling port or charging port flip cover assembly 100 shown in FIG. 1A, with the flip cover 190 being in an open state. FIG. 1C is a perspective view, viewed from below, of the refueling port or charging port flip cover assembly 100 shown in FIG. 1A. FIG. 1D is an exploded view, viewed from the front, of the refueling port or charging port flip cover assembly 100 shown in FIG. 1A. FIG. 1E is an exploded view, viewed from the rear, of the refueling port or charging port flip cover assembly 100 shown in FIG. 1A. For convenience of illustration and description, the right side of a base 101 shown in FIG. 1A is defined as the right side, and the other side opposite to the right side is defined as the left side. Moreover, the front side of the base 101 shown in FIG. 1A is defined as the front side, and the side opposite to the front side is defined as the rear side.

As shown in FIGS. 1A-1E, the refueling port or charging port flip cover assembly 100 includes a base 101, a flip cover 190, and an actuation assembly. The actuation assembly includes a hinge 170, a flip cover rotating shaft 176, a transmission gear 132, a drive means 140, a power source 150, a locking means 120, and an elastic component 160. The hinge 170, the flip cover rotating shaft 176, the transmission gear 132, the drive means 140, the power source 150, the locking means 120, and the elastic component 160 are mounted on the base 101. Specifically, the base 101 has a receiving cavity 105. The flip cover 190 includes a flip cover body 110 and a connecting portion 112. The flip cover body 110 covers the connecting portion 112. The connecting portion 112 is connected to the hinge 170. The right end of the hinge 170 is rotatably mounted on the base 101 by means of the flip cover rotating shaft 176 such that the flip cover 190 is rotatable with respect to the base 101. The connecting portion 112 is provided with a flip cover hole 111.

The transmission gear 132 is installed around the flip cover rotating shaft 176. The flip cover 190 has a closed position and an open position. When the flip cover 190 is in the closed position, the flip cover 190 covers the top of the receiving cavity 105 to shield the top of the receiving cavity 105. When the flip cover 190 is in the open position, the receiving cavity 105 is exposed to accommodate an external component for refueling or charging. The locking means 120 is mounted on the front side of the base 101 and is configured to lock or release the hinge 170, so as to lock or release the flip cover 190. The locking means 120 has a locking position and a release position. When the locking means 120 is in the locking position, the locking means 120 passes through a through hole 222 (see FIG. 2B) in the base 101 and extends into the flip cover hole 111 in the hinge 170. When the locking means 120 is in the release position, the locking means 120 is withdrawn from the flip cover hole 111 in the hinge 170, such that the flip cover 190 can rotate with respect to the base 101. The power source 150 is mounted at a lower portion of the front side of the base 101 and is configured to provide a driving force to drive the flip cover 190 to open or close and to provide a driving force to drive the locking means 120 to lock or release. As an example, the power source 150 is an electric motor. The drive means 140 is mounted on the front side of the base 101 and is disposed substantially on the rear side of the power source 150. The drive means 140 is configured to rotate under the drive of the power source 150. Rotation of the drive means 140 drives the locking means 120 and the transmission gear 132 to move. The elastic component 160 is mounted below the base 101 and is configured to provide a force for moving the locking means 120 from the release position to the locking position. As an example, the elastic component 160 is a spring.

Figure 2A:
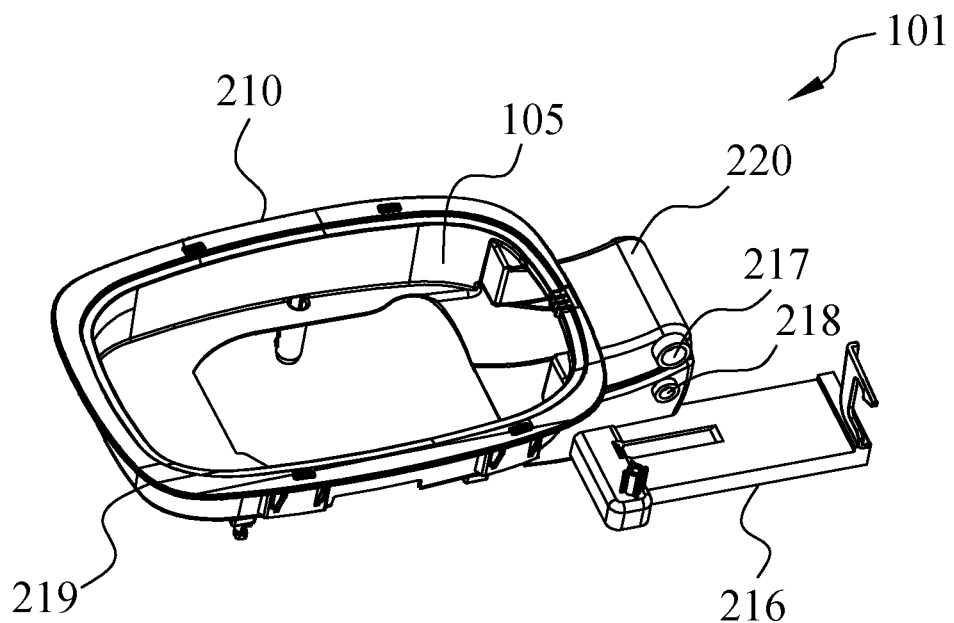
FIG. 2A is a perspective view, viewed from above, of a base shown in FIGS. 1A-1E.
Figure 2B:
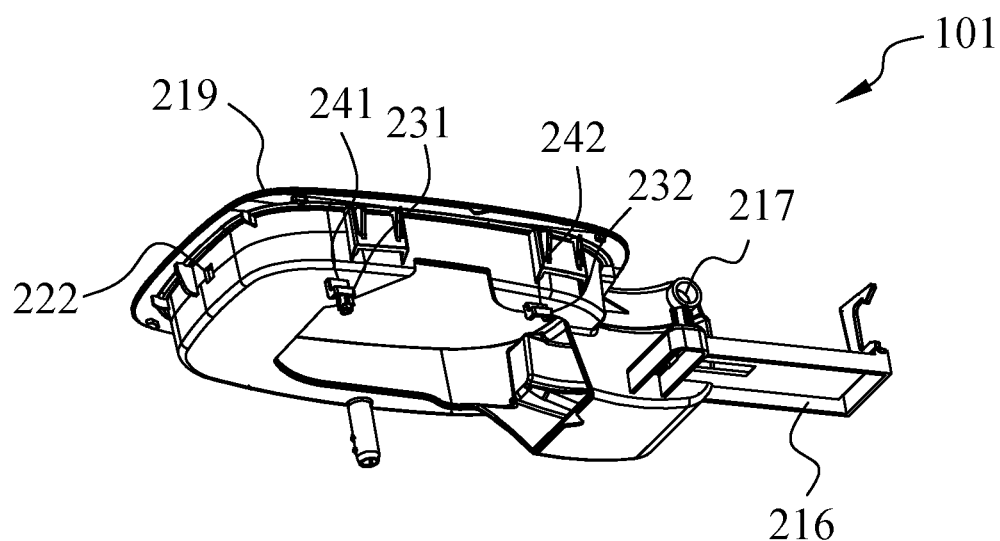
FIG. 2B is a perspective view, viewed from below, of the base shown in FIGS. 1A-1E.

FIG. 2A is a perspective view, viewed from above, of the base 101 shown in FIGS. 1A-1E. FIG. 2B is a perspective view, viewed from below, of the base 101 as shown in FIGS. 1A-1E for more clearly illustrating the specific structure of the base 101. As shown in FIGS. 2A and 2B, the base 101 includes a housing 210 forming the receiving cavity 105, and a mounting portion 220. The mounting portion 220 is connected to the housing 210, and is located at the right end of the base 101. The base 101 can be mounted on a vehicle body by means of the mounting portion 220. The top and the bottom of the receiving cavity 105 of the housing 210 are opened such that after the flip cover assembly 100 is mounted on the vehicle body, the receiving cavity 105 communicates with a fuel tank opening or a charging port of a vehicle. In this way, the external component for refueling or charging may extend into the fuel tank opening or the charging port of the vehicle through the receiving cavity 105. A receiving cavity (not shown in the figures) in communication with the receiving cavity 105 of the housing 210 is formed in the mounting portion 220 of the base 101 and is configured to accommodate a part of the hinge 170.

At the top of the housing 210 of the base 101, a flange 219 is provided, said flange is formed by folding outward from the top of the housing. A side wall of the housing 210 is provided with the through hole 222. The through hole 222 is formed in the left end of the base 101 and close to the front side. The through bore 222 is configured to receive a locking pin 128 on the locking means 120 (see FIGS. 1D and 1E).

The lower portion of the front side of the base 101 is provided with a protrusion 231 and a protrusion 232. The protrusion 231 and the protrusion 232 extend downward from the bottom of the base 101 toward the front side such that a recess 241 is formed between the protrusion 231 and the base 101, and a recess 242 is formed between the protrusion 232 and the base 101. The recesses 241, 242 are configured to accommodate the locking means 120, thereby guiding the locking means 120 to move in left and right directions. One end of the elastic component 160 is connected to the protrusion 231 such that the elastic component 160 is connected to the base 101.

A power source mounting plate 216, a flip cover rotating shaft mounting hole 217, and a drive device mounting portion 218 are disposed at the position of the mounting portion 220 on the front side of the base 101. The flip cover rotating shaft mounting hole 217 and the drive device mounting portion 218 penetrate the base 101 in front and rear directions. Herein, the power source 150 is disposed on the power source mounting plate 216. The flip cover rotating shaft mounting hole 217 is configured to accommodate the flip cover rotating shaft 176 and the drive device mounting portion 218 is configured to accommodate the drive means 140.

Figure 3:
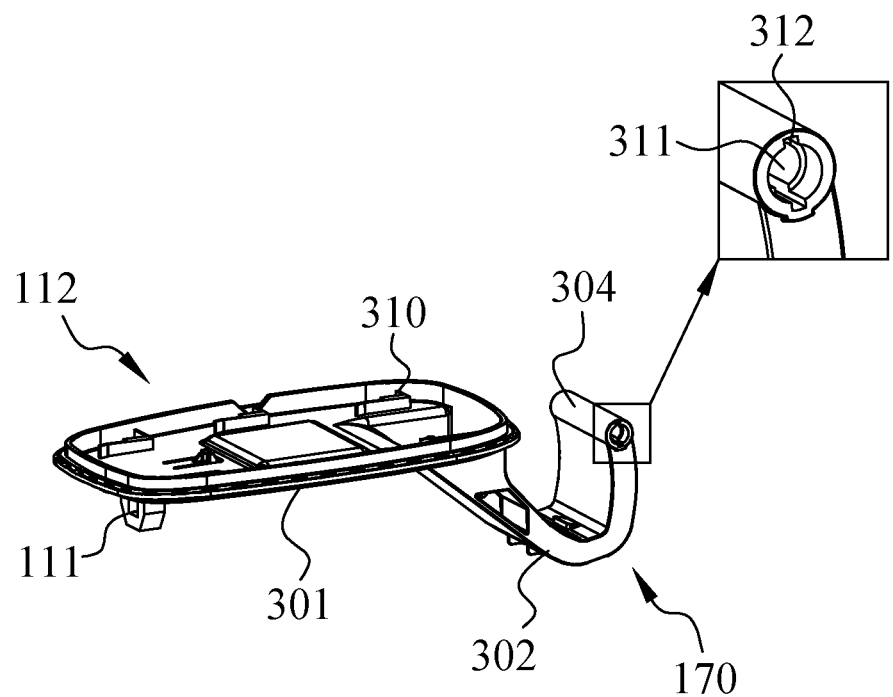
FIG. 3 is a perspective view, viewed from the front, of a hinge shown in FIGS. 1A-1E.

FIG. 3 is a perspective view, viewed from the front, of the hinge 170 and the connecting portion 112 for the flip cover 190 shown in FIGS. 1A-1E, for illustrating the specific structures of the hinge 170 and the connecting portion 112 for the flip cover 190. As shown in FIG. 3, the hinge 170 and the connecting portion 112 for the flip cover 190 are integrally formed. The hinge 170 is connected to the right side of the connecting portion 112. The connecting portion 112 is configured for connection with the flip cover body 110. Specifically, the top of the connecting portion 112 is provided with a hinge snap-fitting portion 310, the bottom of the flip cover body 110 is provided with a corresponding flip cover snap-fitting portion (not shown), and the hinge snap-fitting portion 310 is capable of cooperating with the flip cover snap-fitting portion to connect the connecting portion 112 and the flip cover body 110 together. The lower side of the left end of the connecting portion 112 is provided with the flip cover hole 111 to form a locking receiving portion. When the locking means 120 passes through the through hole 222 in the base 101 and the flip cover hole 111 (i.e., the locking receiving portion) in the connecting portion 112 for the flip cover 190, the locking means 120 can lock the flip cover 190 and the hinge 170. When the locking means 120 is withdrawn from the flip cover hole 111, the locking means 120 releases the flip cover 190 and the hinge 170, and the flip cover 190 can be opened. The hinge 170 is substantially bent-shaped and includes a hinge rotating shaft 304 disposed at an end thereof. The hinge rotating shaft 304 is substantially a cylinder that is accommodated in the flip cover rotating shaft mounting hole 217 of the base 101 such that the hinge 170 can rotate with respect to the base 101. The hinge rotating shaft 304 is provided with a flip cover rotating shaft accommodating portion 311. The flip cover rotating shaft accommodating portion 311 is substantially a cylinder that is formed by extending in the front and rear directions. A radial accommodating structure 312 is also disposed on circumference of the front end of the flip cover rotating shaft accommodating portion 311, and is formed by extending in a radial direction of the flip cover rotating shaft accommodating portion 311. The flip cover rotating shaft accommodating portion 311 is configured to cooperate with the flip cover rotating shaft 176 such that the flip cover rotating shaft 176 can be connected to the hinge 170.

A specific structure of the locking means 120 will now be described with reference to FIGS. 1D and 1E. As shown in FIGS. 1D and 1E, the locking means 120 includes a locking rod 121, a locking portion 127, a pushing portion 123, a guide portion 124, a guide portion 125, and a protrusion 126. The locking rod 121 has an elongated shape and extends for a length in the left and right directions. The locking portion 127 is disposed at the left end of the locking rod 121 and is substantially in the shape of a hook protruding toward the rear side. One end of the locking portion 127 is connected to the locking rod 121, and the other end thereof forms the locking pin 128. The locking pin 128 can extend into or be withdrawn from the through hole 222 in base 101 and the flip cover hole 111 in the hinge 170, so as to lock the flip cover 190 to the base 101 or to release the flip cover 190 from the base 101. Referring to FIG. 1D, the pushing portion 123 is disposed at the right end of the locking rod 121 and is substantially plate-shaped. The pushing portion 123 is disposed in a vertical direction and is connected to the locking rod 121. The pushing portion 123 is configured to cooperate with the drive means 140. When the drive means 140 pushes the pushing portion 123, the drive means 140 can push the locking means 120 to move. The guide portion 124 and the guide portion 125 are disposed on the rear side of the locking rod 121, and the guide portion 124 and the guide portion 125 are disposed apart by a distance. The guide portion 124 and the guide portion 125 can cooperate with the protrusion 232 and the protrusion 231 on the base 101 respectively, so as to guide the locking means 120 to move in the left and right directions. The protrusion 126 is disposed on the rear side of the locking rod 121, and is disposed between the guide portion 125 and the locking portion 127. One end of the elastic component 160 is connected to the protrusion 126, and the other end of the elastic component 160 is connected to the base 101.

Figure 4A:
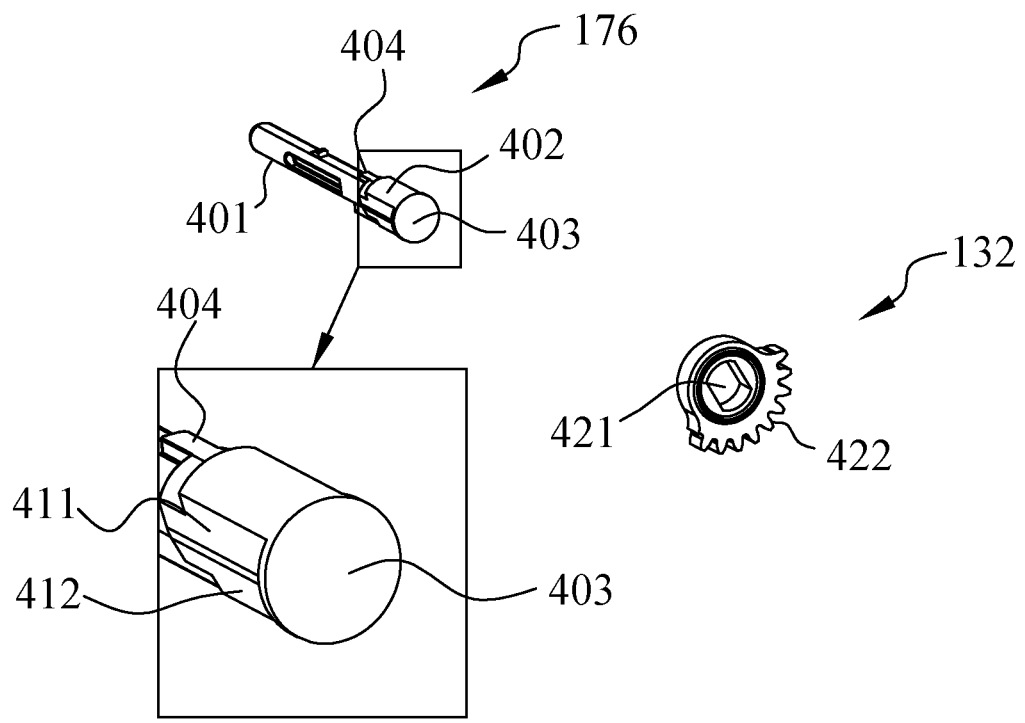
FIG. 4A is a perspective view of a flip cover rotating shaft and a transmission gear shown in FIGS. 1A-1E.

FIG. 4A is a perspective view of the flip cover rotating shaft 176 and the transmission gear 132 shown in FIGS. 1A-1E, for illustrating the specific structures of the flip cover rotating shaft 176 and the transmission gear 132. As shown in FIG. 4A, the flip cover rotating shaft 176 includes a rotating shaft body 401, a protrusion 402, and a cover 403. Specifically, the rotating shaft body 401 is substantially a cylinder that can be accommodated in the flip cover rotating shaft accommodating portion 311 and engaged with the flip cover rotating shaft accommodating portion 311. A radial protrusion 404 is disposed on circumference of the middle section of the rotating shaft body 401 and is formed by extending outward in a radial direction of the rotating shaft body 401. The radial protrusion 404 cooperates with the radial accommodating structure 312 on the hinge 170 to connect the flip cover rotating shaft 176 to the hinge 170. The front end of the rotating shaft body 401 is provided with a protrusion 402. The protrusion 402 is formed by extending outward from the outer periphery of the flip cover rotating shaft 176 in the radial direction. More specifically, the protrusion 402 includes an upper protrusion 411 and a lower protrusion 412. The left and right sides of the upper protrusion 411 and the left and right sides of the lower protrusion 412 are all planar. A left side face of the upper protrusion 411 and a left side face of the lower protrusion 412 form an obtuse angle, and a right side face of the upper protrusion 411 and a right side face of the lower protrusion 412 also form an obtuse angle for cooperation with the transmission gear 132. The cover 403 is disposed at the front end of the rotating shaft body 401, and the circumferential dimension of the cover 403 is greater than that of the rotating shaft body 401 to prevent the transmission gear 132 from being separated from the front end of the rotating shaft body 401 after being installed around the rotating shaft body 401.

As shown in FIG. 4A, the transmission gear 132 is a fan-shaped gear. Specifically, the middle of the transmission gear is provided with a protrusion receiving cavity 421. The protrusion receiving cavity 421 runs through the transmission gear 132 in the front and rear directions. The left and right opposite sides of the protrusion receiving cavity 421 are planar, and the upper and lower opposite sides are arc-shaped. The size of the protrusion receiving cavity 421 is greater than that of the protrusion 402 such that the protrusion 402 can be accommodated in the protrusion receiving cavity 421. The fan-shaped outer circumferential portion of the transmission gear 132 is a toothed portion 422 that can be meshed with the drive gear 504. The toothed portion 422 is disposed around the protrusion receiving cavity 421. A central angle of the toothed portion 422 of the outer circumference of the transmission gear 132 is greater than the maximum angle to which the flip cover 190 can be opened.

Figure 4B:
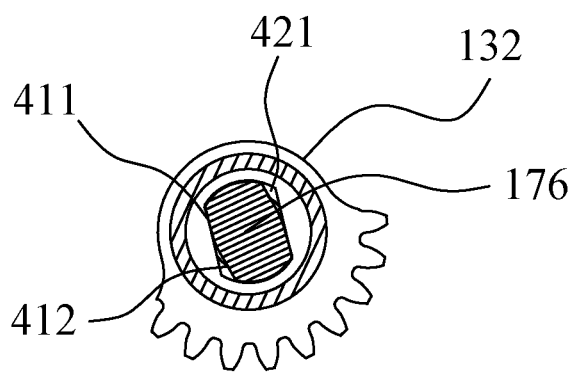
FIG. 4B is a sectional view of the flip cover rotating shaft and the transmission gear shown in FIGS. 1A-1E when they are cooperated with each other.

FIG. 4B is a sectional view of the flip cover rotating shaft 176 and the transmission gear 132 shown in FIGS. 1A-1E in cooperation, for illustrating the cooperative relationship of the protrusion 402 on the flip cover rotating shaft 176 and the protrusion receiving cavity 421 on the transmission gear 132. As shown in FIG. 4B, the protrusion 402 is accommodated in the protrusion receiving cavity 421. In the state shown in FIG. 4B, the left side face of the upper protrusion 411 abuts against a left side wall of the protrusion receiving cavity 421, the right side face of the lower protrusion 412 abuts against a right side wall of the protrusion receiving cavity 421, while the right side face of the upper protrusion 411 does not abut against the right side wall of the protrusion receiving cavity 421, and the left side face of the lower protrusion 412 does not abut against the left side wall of the protrusion receiving cavity 421. At this moment, if the transmission gear 132 rotates in a counterclockwise direction, since the left side face of the upper protrusion 411 abuts against the left side wall of the protrusion receiving cavity 421 and the right side face of the lower protrusion 412 abuts against the right side wall of the protrusion receiving cavity 421, the transmission gear 132 can drive the flip cover rotating shaft 176 to rotate in the counterclockwise direction. However, if the transmission gear 132 rotates in a clockwise direction at this moment, since the right side face of the upper protrusion 411 does not abut against the right side wall of the protrusion receiving cavity 421 and the left side face of the lower protrusion 412 does not abut against the left side wall of the protrusion receiving cavity 421, the transmission gear 132 does not drive the flip cover rotating shaft 176 to rotate, but rotates with respect to the flip cover rotating shaft 176. The transmission gear 132 can drive the flip cover rotating shaft 176 to rotate only after the right side face of the upper protrusion 411 abuts against the right side wall of the protrusion receiving cavity 421 and the left side face of the lower protrusion 412 abuts against the left side wall of the protrusion receiving cavity 421.

The protrusion 402 and the protrusion receiving cavity 421 are respectively referred to as a fitting portion and a receiving portion, and the transmission gear 132 is installed around the fitting portion of the flip cover rotating shaft 176 by means of the receiving portion. The protrusion (fitting portion) 402 and the protrusion receiving cavity (receiving portion) 421 can form an engagement structure such that the fitting portion and the receiving portion can be rotatably engaged or disengaged. When the receiving portion is rotatably engaged with the fitting portion, the transmission gear 132 can drive the flip cover rotating shaft 176 to rotate, and when the receiving portion is rotatably disengaged from the fitting portion, the transmission gear 132 can rotate with respect to the flip cover rotating shaft 176.

Figure 5A:
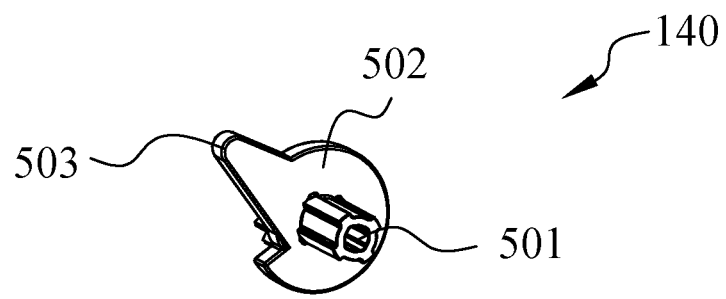
FIG. 5A is a perspective view, viewed from the front, of a drive means shown in FIGS. 1A-1E.
Figure 5B:
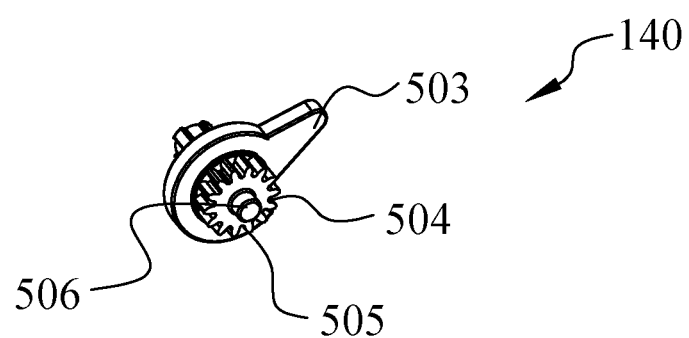
FIG. 5B is a perspective view, viewed from the rear, of the drive means shown in FIGS. 1A-1E.

FIG. 5A is a perspective view, viewed from the front, of the drive means 140 shown in FIGS. 1A-1E. FIG. 5B is a perspective view, viewed from the rear, of the drive means 140 as shown in FIGS. 1A-1E for more clearly illustrating the specific structure of the drive means 140. As shown in FIGS. 5A and 5B, the drive means 140 includes a drive shaft 501, a drive member 502, a drive gear 504, and a mounting shaft 506. The drive shaft 501, the drive member 502, the drive gear 504, and the mounting shaft 506 are sequentially connected together, and the drive shaft 501 and the mounting shaft 506 are arranged coaxially. Specifically, the drive member 502 is substantially a circular disc, and a drive arm 503 is disposed thereon and is configured to be in contact with the pushing portion 123 of the locking means 120 (see FIGS. 1D and 1E). The drive gear 504 is an external gear on which outer teeth 505 are disposed. The outer teeth 505 are disposed around the entire outer circumference of the drive gear 504. The outer teeth 505 can be meshed with the toothed portion 422 of the transmission gear 132. The drive shaft 501 is connected to an output portion (not shown) of the power source 150 such that the power source 150 can drive the drive shaft 501 to rotate when being activated. In the embodiment of the present disclosure, the power source 150 can drive the drive shaft 501 to rotate in the clockwise and counterclockwise directions, and therefore, the drive means 140 can also rotate in the clockwise and counterclockwise directions under the drive of the power source 150. The mounting shaft 506 can be accommodated in the drive device mounting portion 218 (see FIG. 2A) of the base 101 such that the drive means 140 is mounted on the base 101.

Figure 6A:
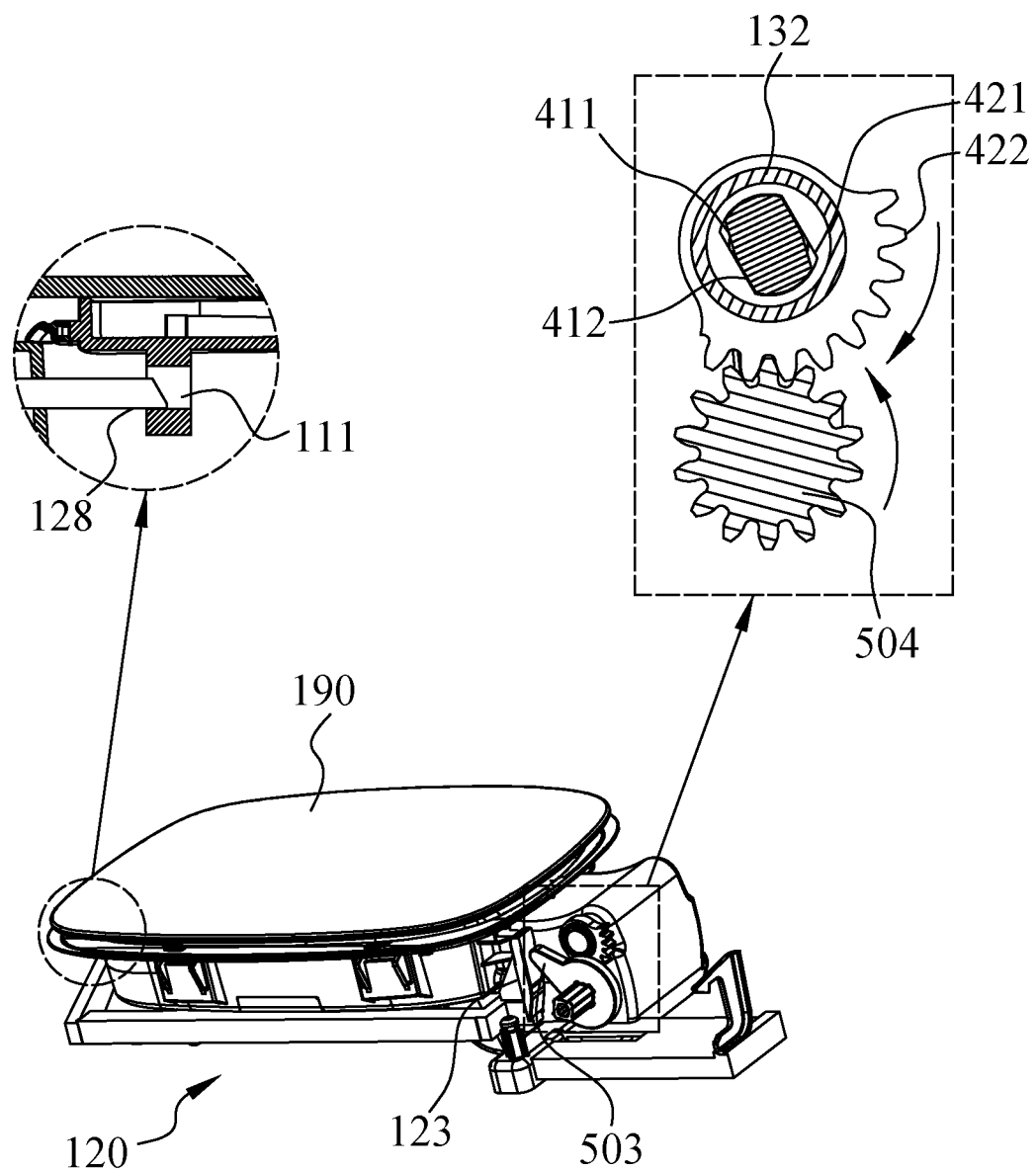
FIG. 6A is a schematic diagram showing the state of the flip cover assembly when the locking means is in a locking position and the flip cover is in a closed position.
Figure 6B:
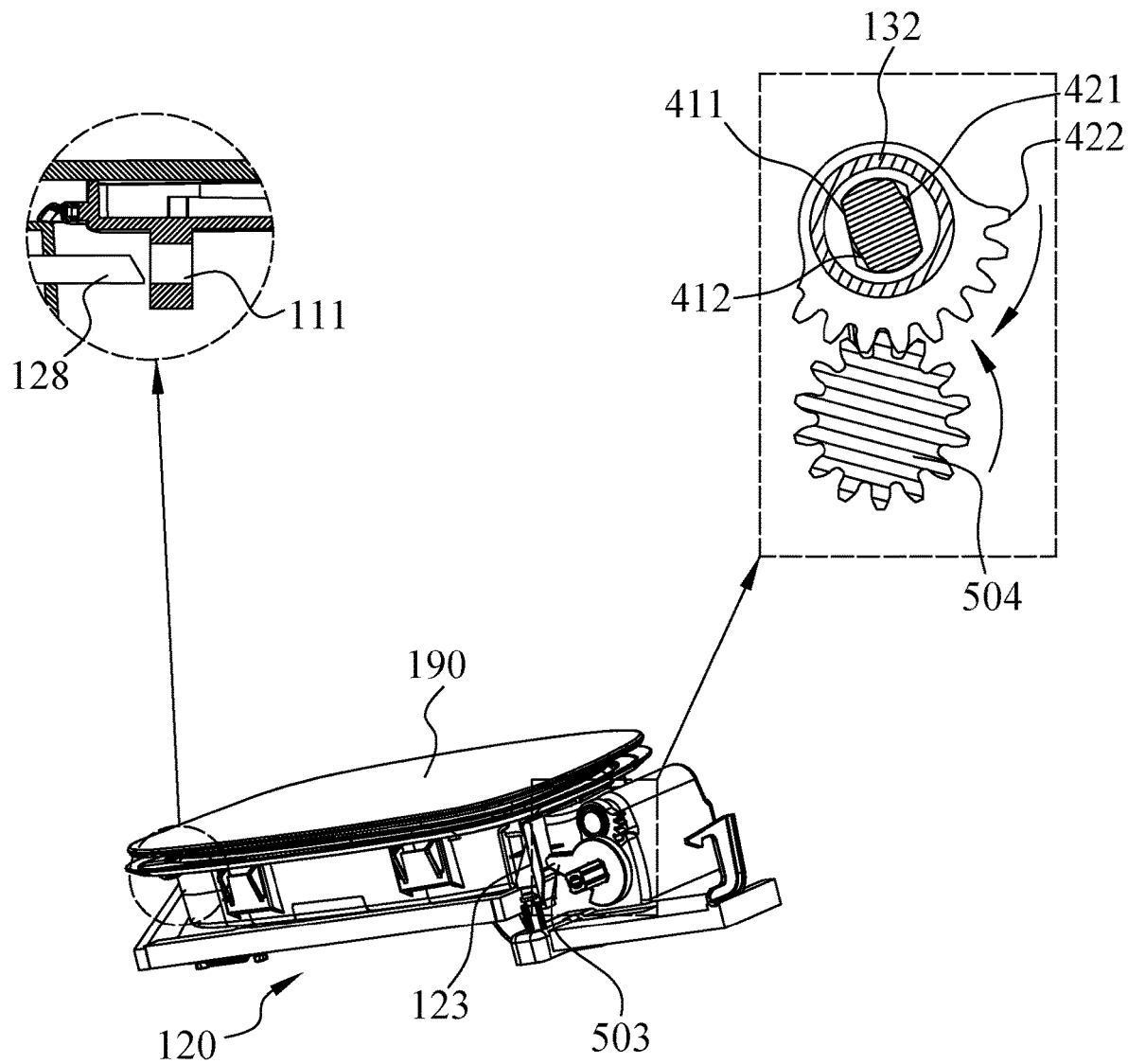
FIG. 6B is a schematic diagram showing the state of the flip cover assembly when the locking means is in a release position and the flip cover is in the closed position.
Figure 6C:
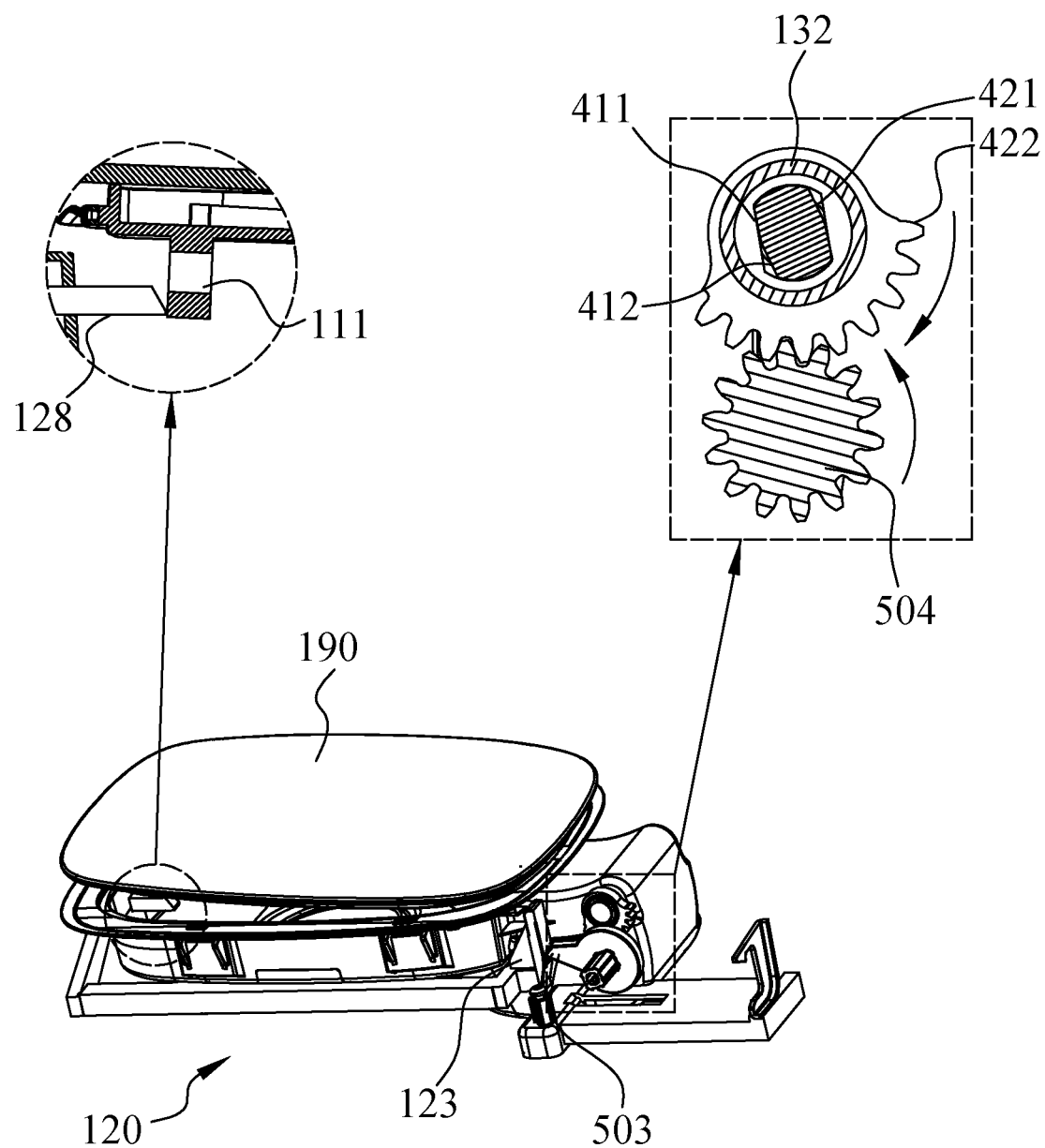
FIG. 6C is a schematic diagram showing a state in which a drive arm of a drive member is disengaged from a pushing portion of the locking means.
Figure 6D:
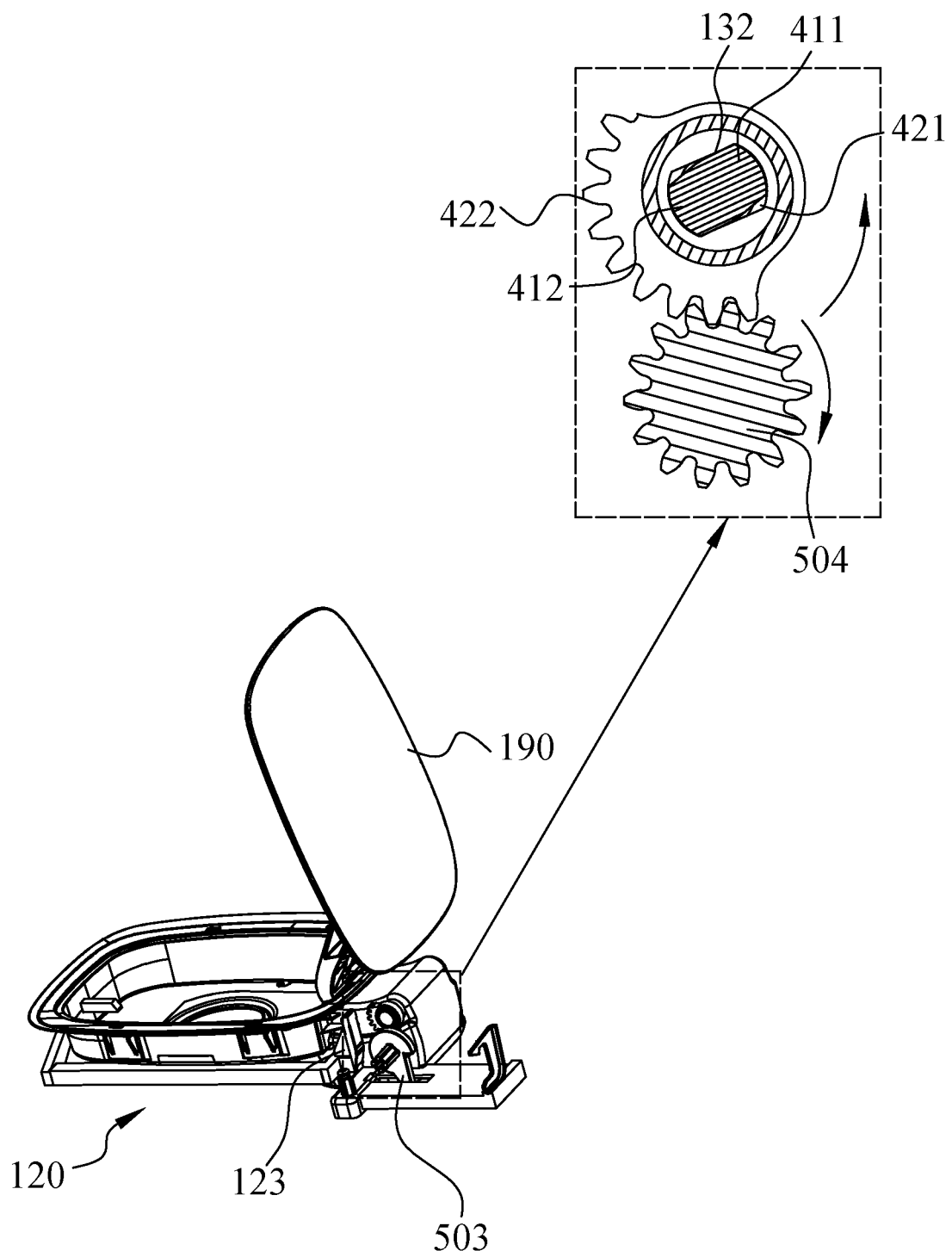
FIG. 6D is a schematic diagram showing a first state of the flip cover assembly when the flip cover is completely opened.
Figure 6E:
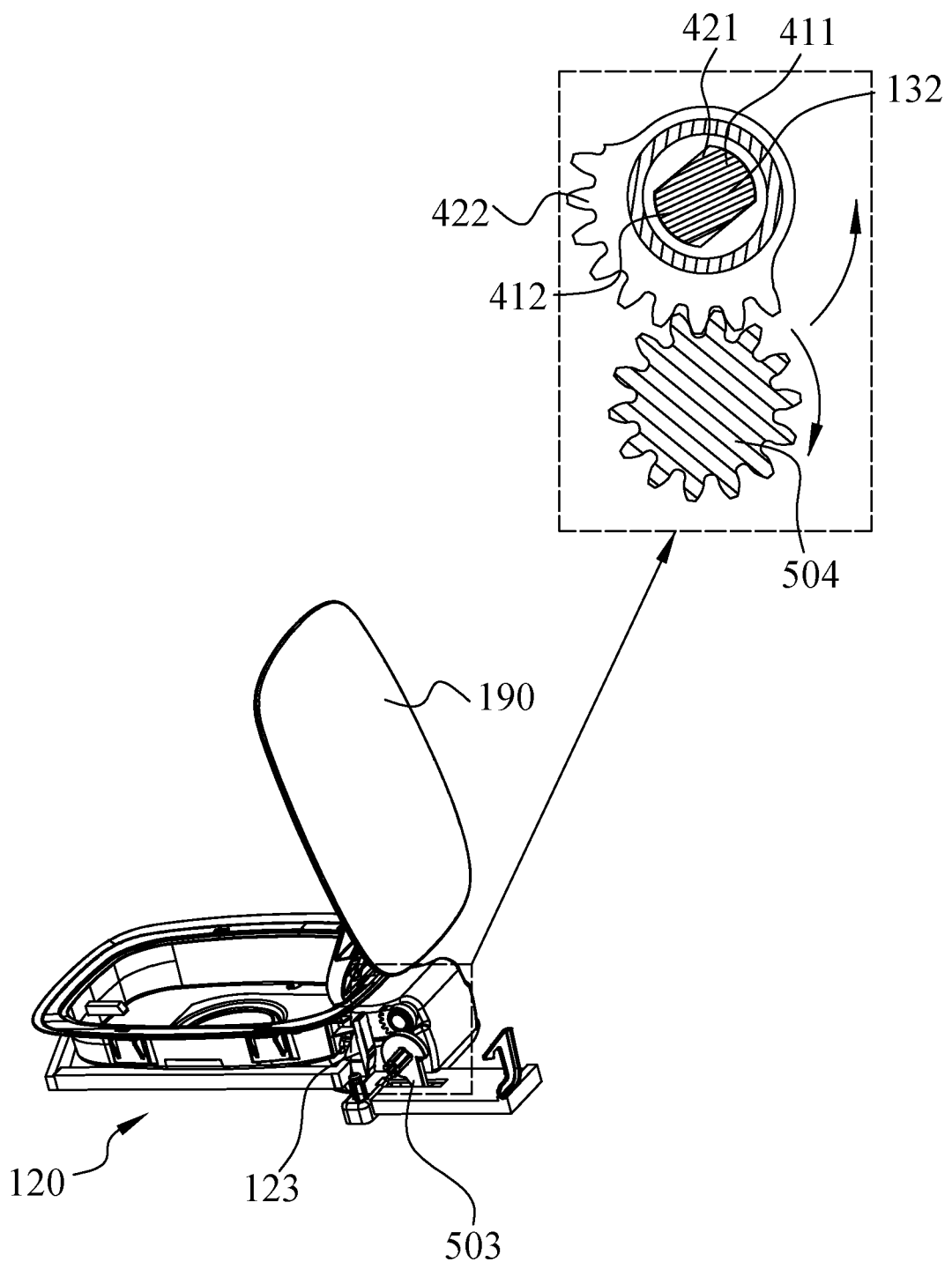
FIG. 6E is a schematic diagram showing a second state of the flip cover assembly when the flip cover is completely opened.
Figure 6F:
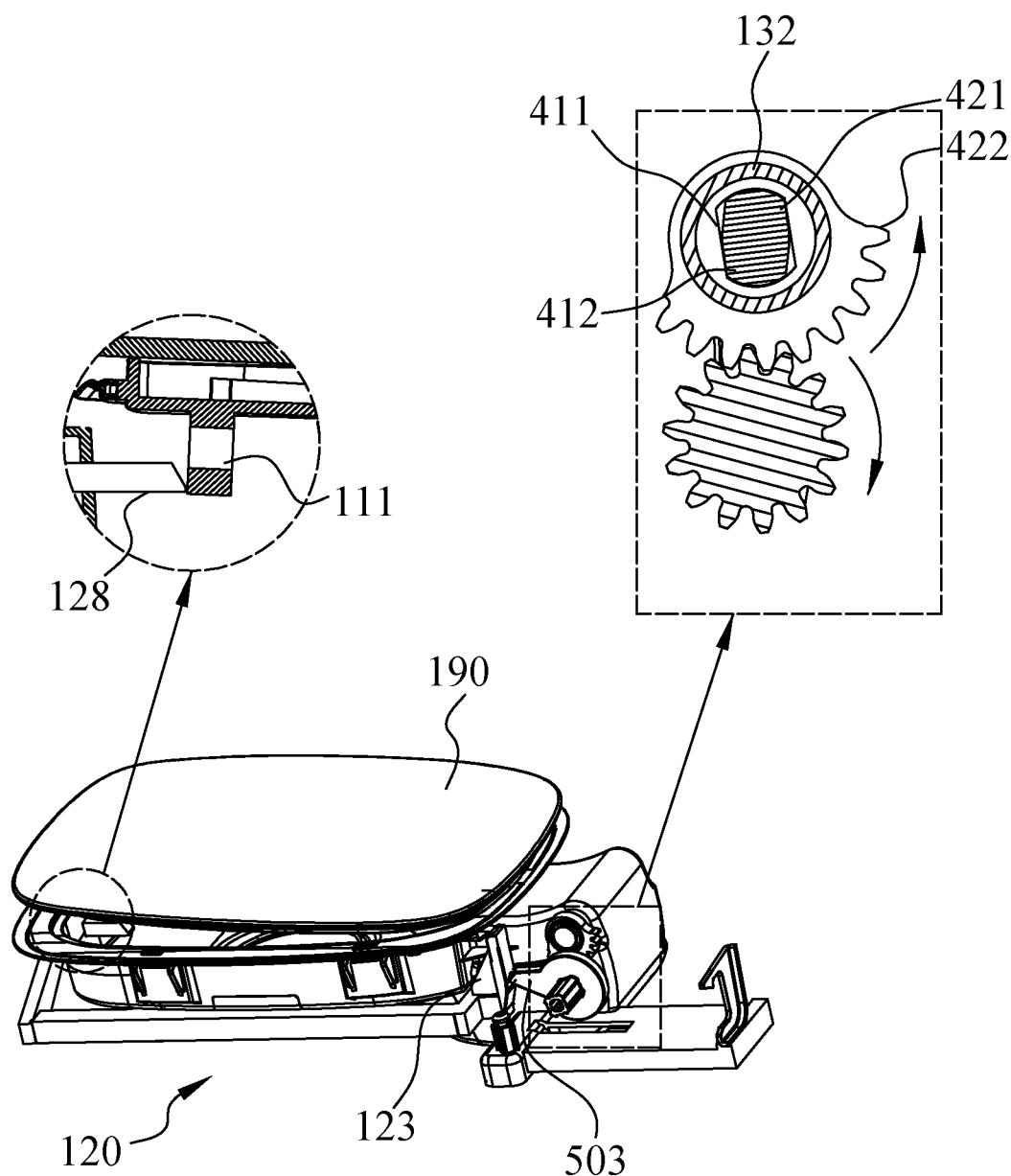
FIG. 6F is a schematic diagram showing a state in which the drive arm of the drive member is in contact with the pushing portion of the locking means.
Figure 6G:
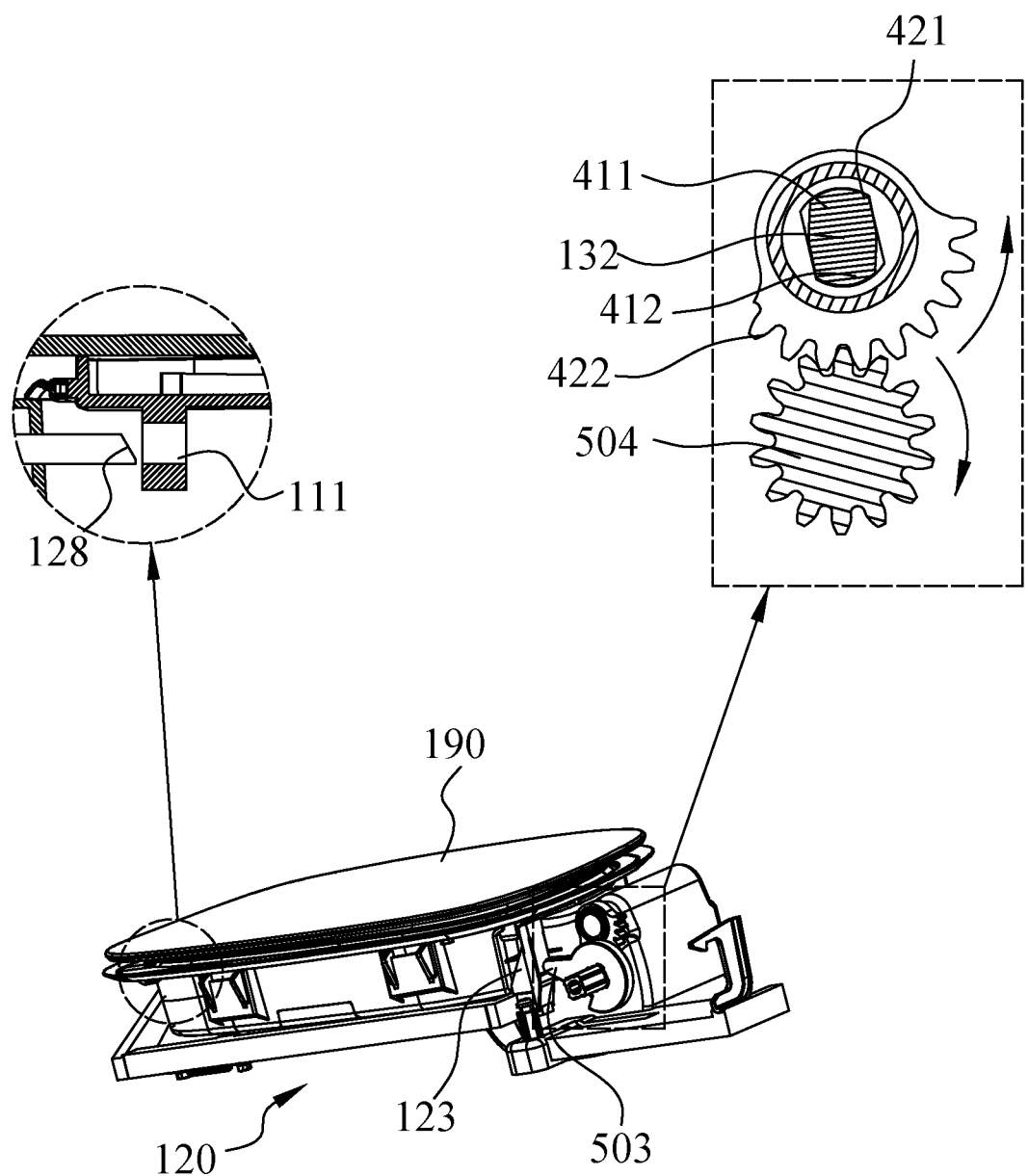
FIG. 6G is a schematic diagram showing the state of the flip cover assembly when the locking means is in the release position and the flip cover is in the closed position.
Figure 6H:
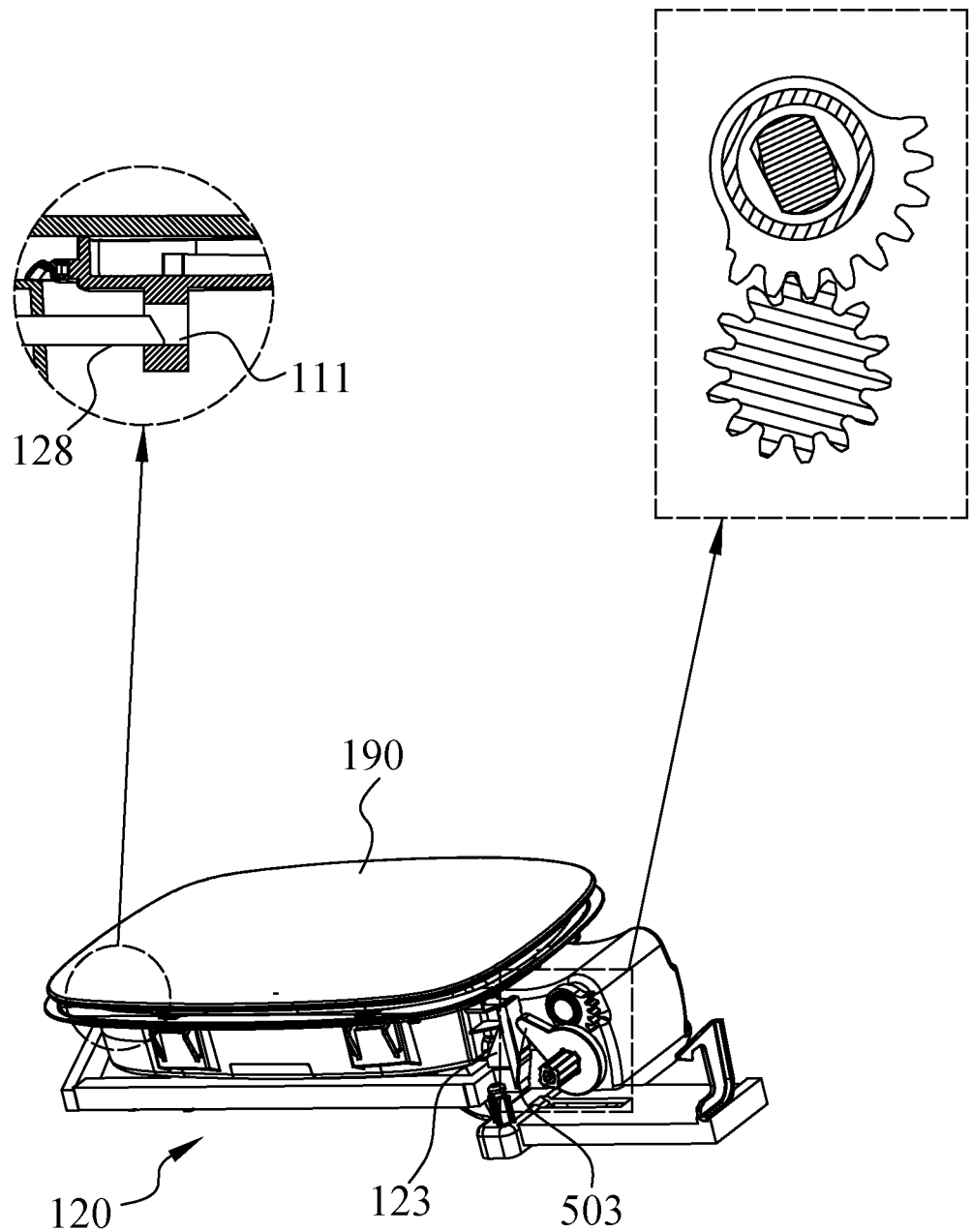
FIG. 6H is a schematic diagram showing the state of the flip cover assembly when the locking means is in the locking position and the flip cover is in the closed position.

The process of releasing and opening the flip cover 190 and the process of closing and locking the flip cover 190 are described below in conjunction with FIGS. 6A-6H:

FIG. 6A is a schematic diagram showing the state of the flip cover assembly 100 when the locking means 120 is in the locking position and the flip cover 190 is in the closed position. FIG. 6B is a schematic diagram showing the state of the flip cover assembly 100 when the locking means 120 is in the release position and the flip cover 190 is in the closed position. FIG. 6C is a schematic diagram showing a state in which the drive arm 503 of the drive member 502 is separated from the pushing portion 123 of the locking means 120. FIG. 6D is a schematic diagram showing a first state of the flip cover assembly 100 when the flip cover 190 is completely opened. FIG. 6E is a schematic diagram showing a second state of the flip cover assembly 100 when the flip cover 190 is completely opened. FIG. 6F is a schematic diagram showing a state in which the drive arm 503 of the drive member 502 is in contact with the pushing portion 123 of the locking means 120. FIG. 6G is a schematic diagram showing the state of the flip cover assembly 100 when the locking means 120 is in the release position and the flip cover 190 is in the closed position. FIG. 6H is a schematic diagram showing the state of the flip cover assembly 100 when the locking means 120 is in the locking position and the flip cover 190 is in the closed position. For the convenience of illustration of the positional relationship of the components in different states in FIGS. 6A-6H, the power source 150 is removed from FIGS. 6A-6H to better illustrate the cooperative relationship of the components in the flip cover assembly 100. Dashed circular boxes in FIGS. 6A-6H show enlarged sectional views illustrating the cooperative relationship of the locking pin 128 of the locking means 120 and the flip cover hole 111 of the hinge 170, and dashed rectangular boxes in FIGS. 6A-6H show enlarged sectional views illustrating the cooperative relationship of the protrusion 402 of the flip cover rotating shaft 176, the transmission gear 132, and the drive gear 504.

FIGS. 6A-6D show the process of releasing and opening the flip cover 190. As shown in FIG. 6A, the flip cover 190 is in the closed position, and the locking means 120 is in the locking position. The locking pin 128 of the locking means 120 is inserted into the through hole 222 of the base 101 and the flip cover hole 111 in the hinge 170, thereby retaining the flip cover 190 in the closed position. At this moment, the right side face of the upper protrusion 411 of the protrusion 402 of the flip cover rotating shaft 176 abuts against the right side wall of the protrusion receiving cavity 421, and the left side face of the lower protrusion 412 of the protrusion 402 abuts against the left side wall of the protrusion receiving cavity 421.

The process from FIG. 6A to FIG. 6B illustrates the unlocking process of the locking means 120. During this process, the power source 150 drives the drive means 140 to rotate in the counterclockwise direction, and therefore, both the drive member 502 and the drive gear 504 also rotate in the counterclockwise direction. On the one hand, during rotation of the drive member 502 in the counterclockwise direction, the drive arm 503 of the drive member 502 abuts against and pushes the pushing portion 123 of the locking means 120, so as to drive the locking means 120 to move from the locking position to the release position. On the other hand, during rotation of the drive gear 504 in the counterclockwise direction, since the drive gear 504 is meshed with the toothed portion 422 of the transmission gear 132, the transmission gear 132 rotates in the clockwise direction. However, during the rotation of the transmission gear 132, the transmission gear 132 rotates with respect to the protrusion 402 of the flip cover rotating shaft 176 until the left side face of the upper protrusion 411 of the protrusion 402 abuts against the left side wall of the protrusion receiving cavity 421 and the right side face of the lower protrusion 412 of the protrusion 402 abuts against the right side wall of the protrusion receiving cavity 421. Accordingly, during the process from FIG. 6B to FIG. 6C, the locking means 120 is moved from the locking position to the release position. Moreover, since the transmission gear 132 rotates with respect to the protrusion 402 of the flip cover rotating shaft 176, the flip cover rotating shaft 176 does not move, and the flip cover 190 is in the closed position.

The process from FIG. 6B to FIG. 6D illustrates the process of the flip cover 190 moving from the closed position to the open position. During this process, the power source 150 continues to drive the drive means 140 to rotate in the counterclockwise direction, and therefore, both the drive member 502 and the drive gear 504 also continue to rotate in the counterclockwise direction. During rotation of the drive gear 504 in the counterclockwise direction, since the drive gear 504 is meshed with the toothed portion 422 of the transmission gear 132, the left side face of the upper protrusion 411 of the protrusion 402 of the flip cover rotating shaft 176 abuts against the left side wall of the protrusion receiving cavity 421, and the right side face of the lower protrusion 412 of the protrusion 402 abuts against the right side wall of the protrusion receiving cavity 421, the transmission gear 132 rotates in the clockwise direction, and the rotation of the transmission gear 132 drives the protrusion 402 of the flip cover rotating shaft 176 to rotate in the clockwise direction. The rotation of the protrusion 402 in the clockwise direction drives the flip cover 190 to rotate in the clockwise direction, thereby moving the flip cover 190 from the closed position to the open position.

It should be noted that during the process shown from FIG. 6B to FIG. 6C, the drive arm 503 of the drive member 502 also rotates in the clockwise direction, and therefore, the drive arm 503 continues to push the pushing portion 123 of the locking means 120 such that the locking means 120 is in an unlocking position. In the state shown in FIG. 6C, the drive arm 503 of the drive member 502 is separated from the pushing portion 123 of the locking means 120. That is to say, the drive arm 503 of the drive member 502 stops pushing the pushing portion 123 of the locking means 120. Since the locking means 120 is constantly moved to the left during the process shown from FIG. 6A to FIG. 6C, the spring 160 is constantly compressed. Until in the state shown in FIG. 6C, the drive arm 503 of the drive member 502 is separated from the pushing portion 123 of the locking means 120. At this moment, the spring 160 applies a rightward force to the locking means 120 to move the locking means 120 to the right until the locking means returns to the locking position. However, since the flip cover 190 has been opened, the locking means 120 having been returned to the locking position does not restrict the movement of the flip cover 190.

The process from FIG. 6D to FIG. 6E illustrates rotational movement of the protrusion 402 of the flip cover rotating shaft 176 with respect to the transmission gear 132. During this process, the power source 150 drives the drive means 140 to rotate in the clockwise direction, and therefore, both the drive member 502 and the drive gear 504 also rotate in the clockwise direction. Since the drive gear 504 is meshed with the toothed portion 422 of the transmission gear 132, the transmission gear 132 rotates in the counterclockwise direction. However, during the rotation of the transmission gear 132, the transmission gear 132 rotates with respect to the protrusion 402 of the flip cover rotating shaft 176 until the right side face of the upper protrusion 411 of the protrusion 402 abuts against the right side wall of the protrusion receiving cavity 421 and the left side face of the lower protrusion 412 of the protrusion 402 abuts against the left side wall of the protrusion receiving cavity 421. Accordingly, during the process from FIG. 6C to FIG. 6D, the flip cover 190 is in the open position.

FIGS. 6E-6H illustrate the process of closing and locking the flip cover 190.

The process from FIGS. 6E to 6G illustrates the process of the flip cover 190 from the open position to the closed position. During this process, the power source 150 continues to drive the drive means 140 to rotate in the clockwise direction, and therefore, both the drive member 502 and the drive gear 504 also continue to rotate in the clockwise direction. During rotation of the drive gear 504 in the clockwise direction, since the drive gear 504 is meshed with the toothed portion 422 of the transmission gear 132, the right side face of the upper protrusion 411 of the protrusion 402 of the flip cover rotating shaft 176 abuts against the right side wall of the protrusion receiving cavity 421, and the left side face of the lower protrusion 412 of the protrusion 402 abuts against the left side wall of the protrusion receiving cavity 421, the transmission gear 132 rotates in the counterclockwise direction, and the rotation of the transmission gear 132 drives the protrusion 402 of the flip cover rotating shaft 176 to rotate in the counterclockwise direction. The rotation of the protrusion 402 in the counterclockwise direction drives the flip cover 190 to rotate in the counterclockwise direction, thereby moving the flip cover 190 from the open position to the closed position.

It should be noted that during the process shown from FIG. 6E to FIG. 6G, the drive arm 503 of the drive member 502 also rotates in the clockwise direction. During the process shown from FIG. 6E to FIG. 6F, the drive arm 503 of the drive member 502 is always separated from the pushing portion 123 of the locking means 120 until the drive arm 503 of the drive member 502 is in contact with the pushing portion 123 of the locking means 120 in the state shown in FIG. 6F. During the process shown from FIG. 6F to FIG. 6G, the drive arm 503 pushes the pushing portion 123 of the locking means 120 to move the locking means 120 from the locking position to the unlocking position.

During the process shown from FIG. 6G to FIG. 6H, the drive arm 503 of the drive member 502 continues to rotate in the clockwise direction, and therefore, the drive arm 503 continues to push the pushing portion 123 of the locking means 120 such that the locking means 120 is moved from the unlocking position to the locking position, and the locking pin 128 of the locking means 120 is accordingly inserted into the through hole 222 of the base 101 and the flip cover hole 111 of the hinge 170 to keep the flip cover 190 in the closed position.

Although the fitting portion and the receiving portion are illustrated in the present disclosure by taking the protrusion 402 and the protrusion receiving cavity 421 as examples, it will be understood by those skilled in the art that the fitting portion and the receiving portion included in the engagement structure may be formed by different specific structures provided that the specific structures are configured such that the receiving portion and the fitting portion can be rotatably engaged or disengaged. When the receiving portion and the fitting portion are rotatably engaged, the drive gear 504 can drive the flip cover 190 to rotate by means of the transmission gear 132 and the flip cover rotating shaft 176, and when the receiving portion is rotationally disengaged from the fitting portion, the transmission gear 132 can rotate with respect to the flip cover rotating shaft 176.

In the prior art, after the flip cover is located in the closed position, the transmission gear is no longer limited by the drive gear and the drive gear only controls the movement of the locking means, and therefore, when the vehicle is shaken, the flip cover cannot keep in the closed position, and the locking means cannot lock the flip cover that is not in the closed position.

By contrast, the transmission gear 132 in the actuation assembly of the present disclosure is always meshed with the drive gear 504, and therefore, during the movement of the locking means 120 from the release position to the locking position, the rotation of the transmission gear 132 is always restricted by the drive gear 504 regardless of whether the vehicle is shaken. Therefore, the flip cover always remains in the closed position during the movement of the locking means 120 from the release position to the locking position.

Figure 7A:
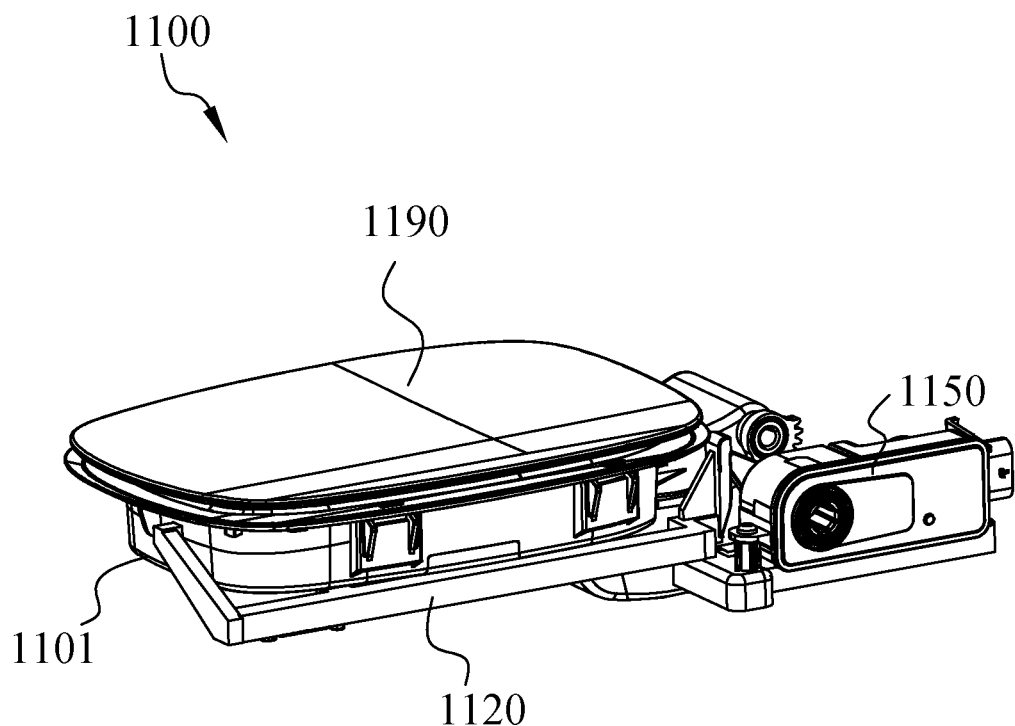
FIG. 7A is a perspective view, viewed from the front, of a second embodiment of a refueling port or charging port flip cover assembly of the present disclosure, with a flip cover being in a closed state.
Figure 7B:
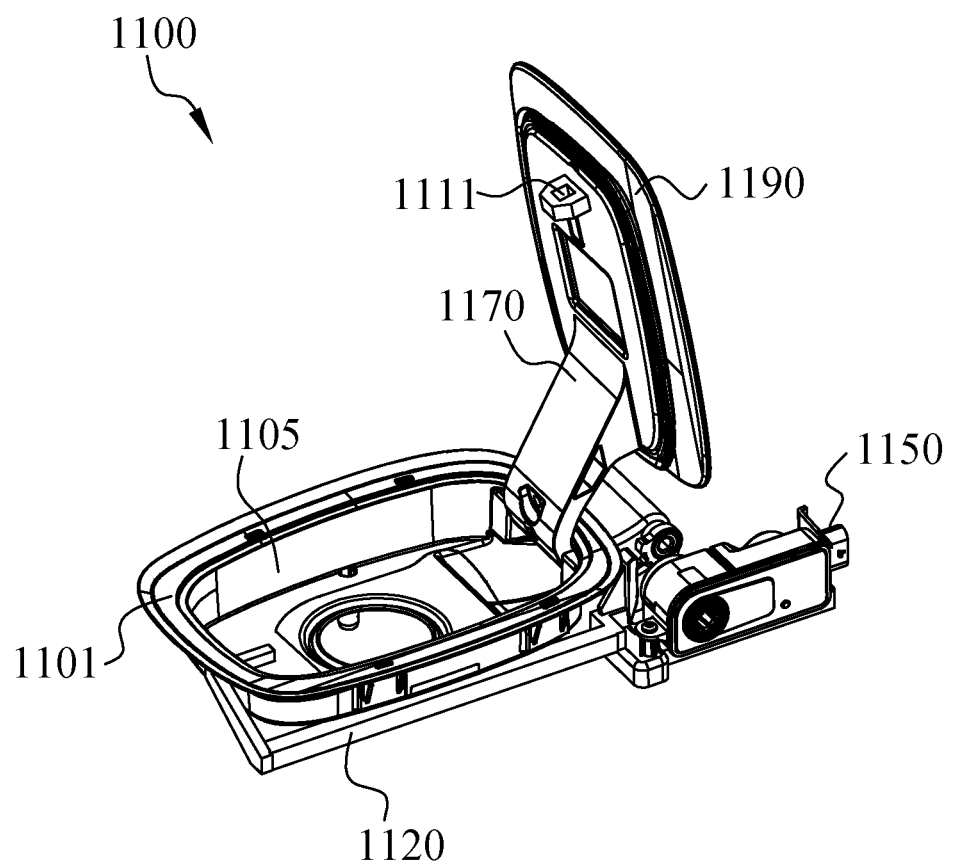
FIG. 7B is a perspective view, viewed from the front, of the refueling port or charging port flip cover assembly shown in FIG. 7A, with the flip cover being in an open state.
Figure 7C:
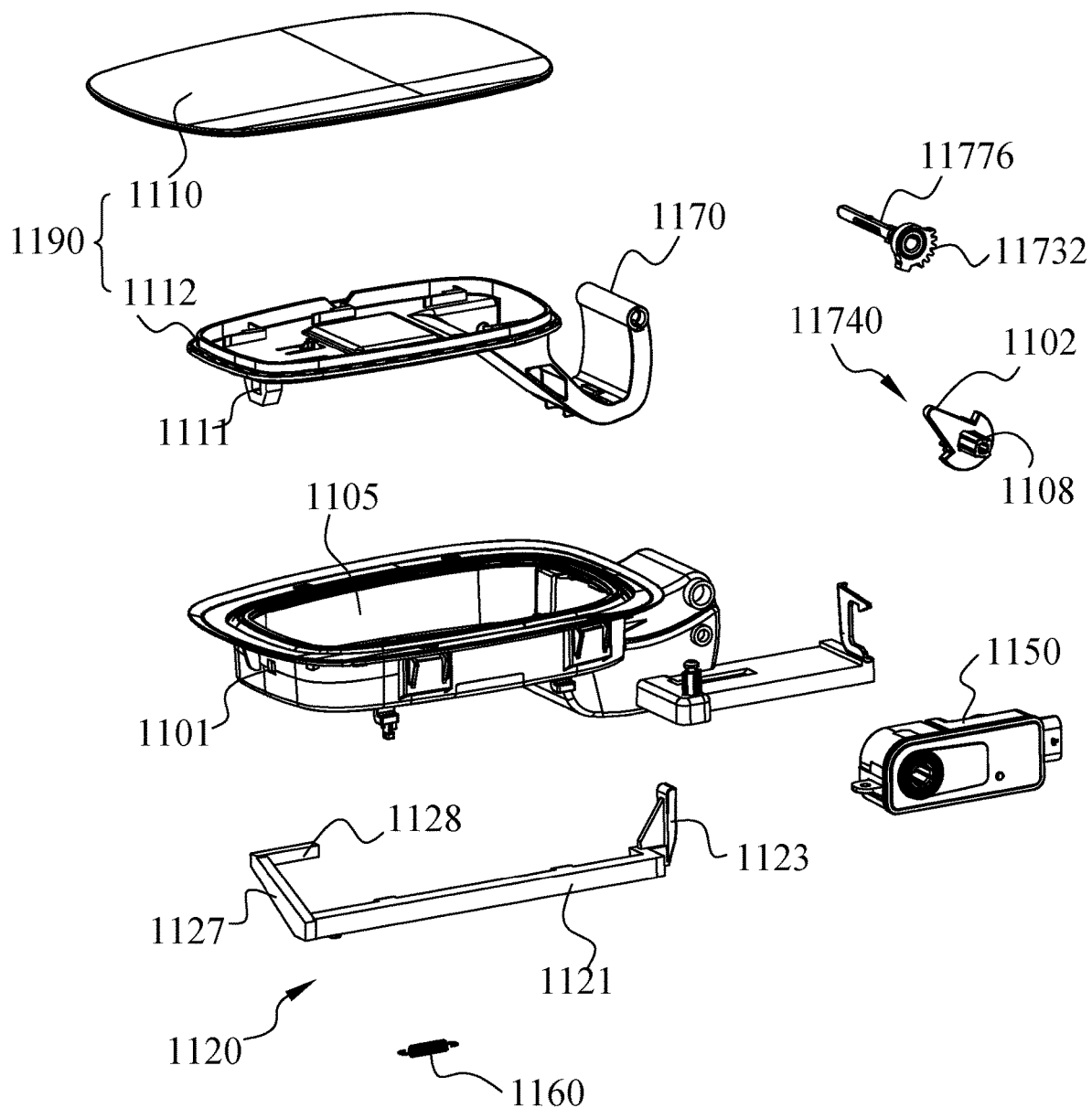
FIG. 7C is an exploded view, viewed from the front, of the refueling port or charging port flip cover assembly shown in FIG. 7A.
Figure 7D:
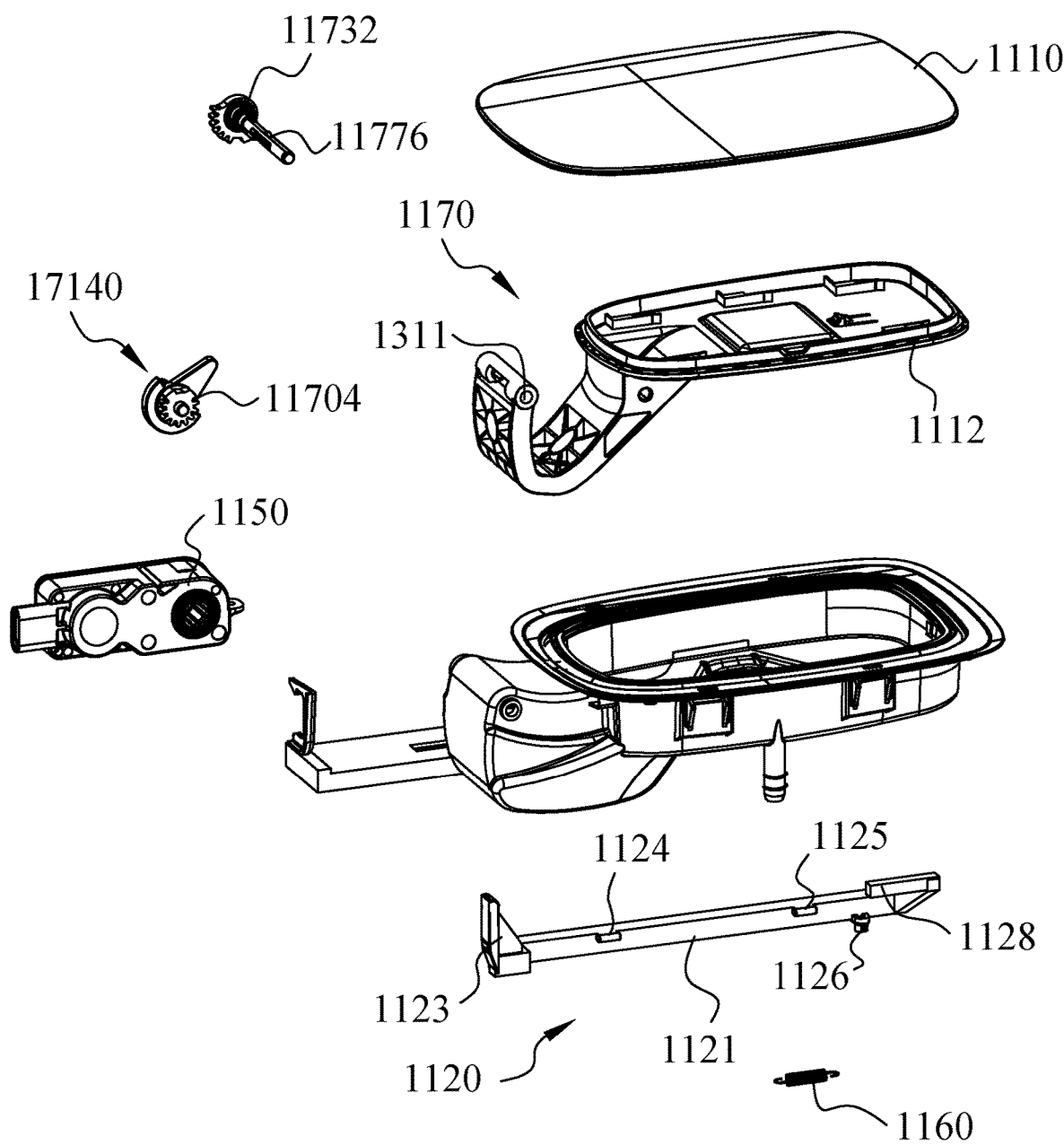
FIG. 7D is an exploded view, viewed from the rear, of the refueling port or charging port flip cover assembly shown in FIG. 7A.

FIG. 7A is a perspective view, viewed from the front, of a second embodiment of a refueling port or charging port flip cover assembly of the present disclosure, with a flip cover being in a closed state. FIG. 7B is a perspective view, viewed from the front, of the refueling port or charging port flip cover assembly shown in FIG. 7A, with the flip cover being in an open state. FIG. 7C is an exploded view, viewed from the front, of the refueling port or charging port flip cover assembly shown in FIG. 7A. FIG. 7D is an exploded view, viewed from the rear, of the refueling port or charging port flip cover assembly shown in FIG. 7A. For convenience of illustration and description, the right side of a base 1101 shown in FIG. 7A is defined as the right side, and the other side opposite to the right side is defined as the left side. Moreover, the front side of the base 1101 shown in FIG. 7A is defined as the front side, and the side opposite to the front side is defined as the rear side.

As shown in FIGS. 7A-7D, the refueling port or charging port flip cover assembly 1100 includes a base 1101, a flip cover 1190, and an actuation assembly. The actuation assembly includes a hinge 1170, a flip cover rotating shaft 11776, a transmission gear 11732, a drive means 11740, a power source 1150, a locking means 1120, and an elastic component 1160. The hinge 1170, the flip cover rotating shaft 11776, the transmission gear 11732, the drive means 11740, the power source 1150, the locking means 1120, and the elastic component 1160 are mounted on the base 1101. Specifically, the base 1101 has a receiving cavity 1105. The flip cover 1190 includes a flip cover body 1110 and a connecting portion 1112. The flip cover body 1110 covers the connecting portion 1112. The connecting portion 1112 is connected to the hinge 1170. The right end of the hinge 1170 is rotatably mounted on the base 1101 by means of the flip cover rotating shaft 11776 such that the flip cover 1190 is rotatable with respect to the base 1101. The connecting portion 1112 is provided with a flip cover hole 1111.

The transmission gear 11732 is connected to an end of the flip cover rotating shaft 11776. The flip cover 1190 has a closed position and an open position. When the flip cover 1190 is in the closed position, the flip cover 1190 covers the top of the receiving cavity 1105 to seal the top of the receiving cavity 1105. When the flip cover 1190 is in the open position, the receiving cavity 1105 is exposed to accommodate an external component for refueling or charging. The locking means 1120 is mounted on the front side of the base 1101 and is configured to lock or release the hinge 1170, so as to lock or release the flip cover 1190. The locking means 1120 has a locking position and a release position. When the locking means 1120 is in the locking position, the locking means 1120 passes through a through hole 1222 (see FIG. 8B) in the base 1101 and extends into the flip cover hole 1111 in the flip cover 1190. When the locking means 1120 is in the release position, the locking means 1120 is withdrawn from the flip cover hole 1111 in the flip cover 1190, such that the flip cover 1190 can rotate with respect to the base 1101. The power source 1150 is mounted at a lower portion of the front side of the base 1101 and is configured to provide a driving force to drive the flip cover to open or close and to provide a driving force to drive the locking means 1120 to lock or release. As an example, the power source 1150 is an electric motor. The drive means 11740 is mounted on the front side of the base 1101 and is disposed substantially on the rear side of the power source 1150. The drive means 11740 includes a drive shaft 1108 disposed on the front side, a drive gear 11704 disposed on the rear side, and a drive member 1102 disposed between the drive shaft 1108 and the drive gear 11704. The drive shaft 1108 is connected to the power source 1150 such that the drive means 11740 is configured to rotate under the drive of the power source 1150. The drive gear 11704 cooperates with the locking means 1120 and the transmission gear 11732 such that the rotation of the drive means 11740 can drive the locking means 1120 and the transmission gear 11732 to move. The elastic component 1160 is mounted below the base 1101 and is configured to apply force to the locking means 1120 to make it move from the release position to the locking position. As an example, the elastic component 1160 is a spring.

Figure 8A:
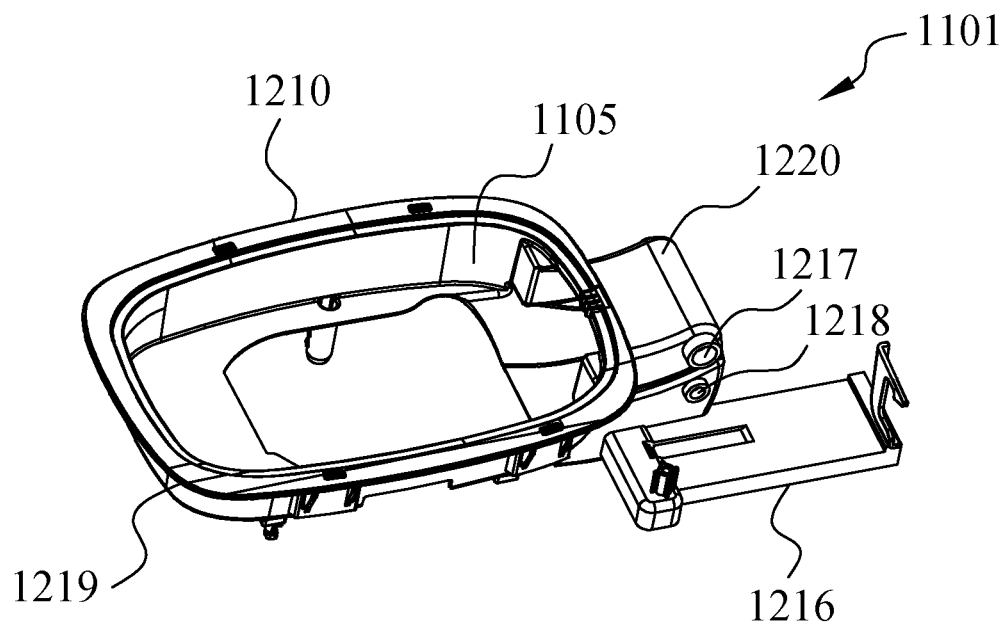
FIG. 8A is a perspective view, viewed from above, of a base shown in FIGS. 7A-7D.
Figure 8B:
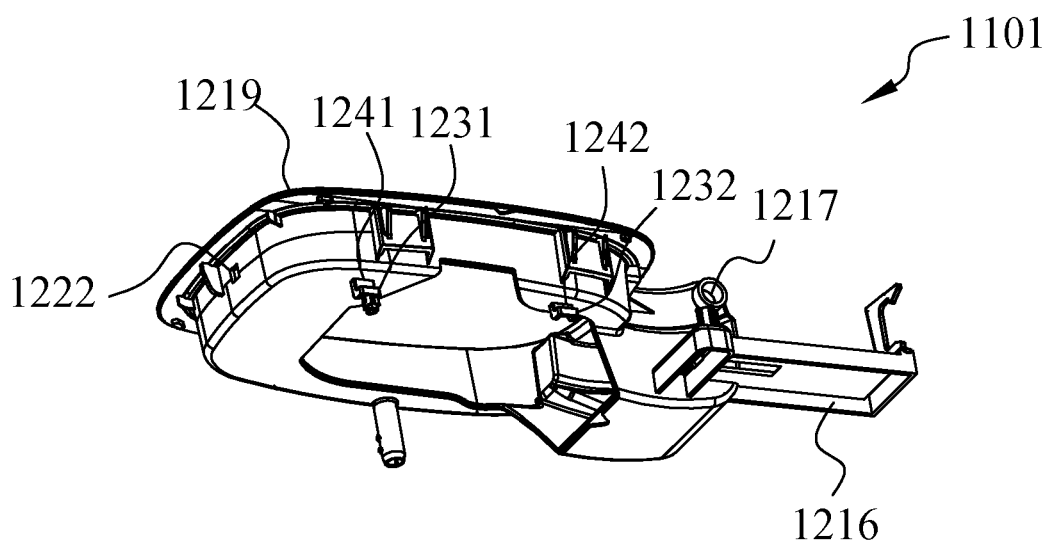
FIG. 8B is a perspective view, viewed from below, of the base shown in FIGS. 7A-7D.

FIG. 8A is a perspective view, viewed from above, of the base 1101 shown in FIGS. 7A-7D. FIG. 8B is a perspective view, viewed from below, of the base 1101 as shown in FIGS. 7A-7D for more clearly illustrating the specific structure of the base 1101. As shown in FIGS. 8A and 8B, the base 1101 includes a housing 1210 defining the receiving cavity 1105, and a mounting portion 1220. The mounting portion 1220 is connected to the housing 1210, and is located at the right end of the base 1101. The base 1101 can be mounted on a vehicle body by means of the mounting portion 1220. The top and the bottom of the receiving cavity 1105 of the housing 1210 are opened such that after the flip cover assembly 1100 is mounted on the vehicle body, the receiving cavity 1105 communicates with a fuel tank opening or a charging port of a vehicle. In this way, the external component for refueling or charging may extend into the fuel tank opening or the charging port of the vehicle through the receiving cavity 1105. A receiving cavity (not shown in the figures) in communication with the receiving cavity 1105 of the housing 1210 is formed in the mounting portion 1220 of the base 1101 and is configured to accommodate a part of the hinge 1170.

At the top of the housing 1210 of the base 1101, a flange 1219 is provided, the flange is formed by folding outward from the top of the housing. A side wall of the housing 1210 is provided with the through hole 1222. The through hole 1222 is formed in the left end of the base 1101 and close to the front side. The through hole 1222 is configured to receive a locking pin 1128 on the locking means 1120 (see FIGS. 7C and 7D).

The lower portion of the front side of the base 1101 is provided with a protrusion 1231 and a protrusion 1232. The protrusion 1231 and the protrusion 1232 extend downward from the bottom of the base 1101 toward the front side such that a recess 1241 is formed between the protrusion 1231 and the base 1101, and a recess 1242 is formed between the protrusion 1232 and the base 1101 for accommodating the locking means 1120, thereby guiding and limiting the locking means 1120 to move in left and right directions. One end of the elastic component 1160 is connected to the protrusion 1231 such that the elastic component 1160 is connected to the base 1101.

A power source mounting plate 1216, a flip cover rotating shaft mounting hole 1217, and a drive means mounting portion 1218 are disposed at the position of the mounting portion 1220 on the front side of the base 1101. The flip cover rotating shaft mounting hole 1217 and the drive means mounting portion 1218 penetrate the base 1101 in front and rear directions. The power source 1150 is disposed on the power source mounting plate 1216. The flip cover rotating shaft mounting hole 1217 is configured to accommodate the flip cover rotating shaft 11776 and the drive means mounting portion 1218 is configured to accommodate the drive means 11740.

Figure 9:
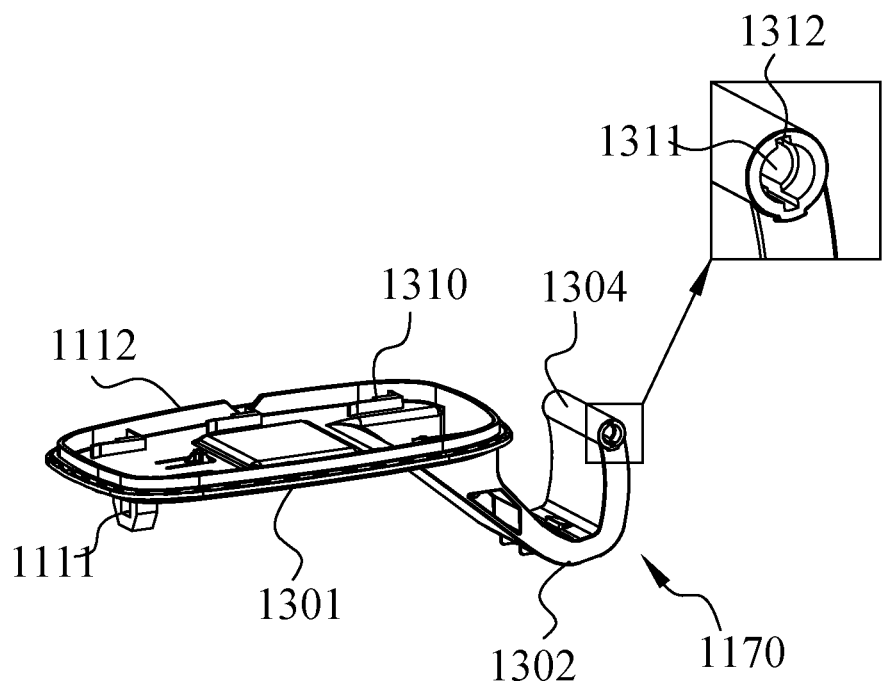
FIG. 9 is a perspective view, viewed from the front, of the hinge and a connecting portion of the flip cover shown in FIGS. 7A-7D.

FIG. 9 is a perspective view, viewed from the front, of the hinge 1170 and the connecting portion 1112 for the flip cover 1190 shown in FIGS. 7A-7D, for illustrating the specific structures of the hinge 1170 and the connecting portion 1112 for the flip cover 1190. As shown in FIG. 9, the hinge 1170 and the connecting portion 1112 for the flip cover 1190 are integrally formed. The hinge 1170 is connected to the right side of the connecting portion 1112. The connecting portion 1112 is configured for connection with the flip cover body 1110. Specifically, the top of the connecting portion 1112 is provided with a hinge snap-fitting portion 1310, the bottom of the flip cover body 1110 is provided with a corresponding flip cover snap-fitting portion (not shown), and the connecting portion 1112 is capable of cooperating with the flip cover snap-fitting portion to connect the connecting portion 1112 and the flip cover body 1110 together. The lower side of the left end of the connecting portion 1112 is provided with the flip cover hole 1111 to form a locking receiving portion. When the locking means 1120 passes through the through hole 1222 in the base 1101 and the flip cover hole 1111 (i.e., the locking receiving portion) in the connecting portion 1112 of the flip cover 1190, the locking means 1120 can lock the flip cover 1190 and the hinge 1170. When the locking means 1120 is withdrawn from the flip cover hole 1111, the locking means 1120 releases the flip cover 1190 and the hinge 1170, and the flip cover 1190 and the hinge 1170 can be opened. The hinge 1170 is substantially bent and includes a hinge rotating shaft 1304 disposed at an end thereof. The hinge rotating shaft 1304 is substantially a cylinder that is accommodated in the flip cover rotating shaft mounting hole 1217 of the base 1101 such that the hinge 1170 can rotate with respect to the base 1101. The hinge rotating shaft 1304 is provided with a flip cover rotating shaft accommodating portion 1311. The flip cover rotating shaft accommodating portion 1311 is substantially a cylinder that is formed by extending in the front and rear directions. A radial accommodating structure 1312 is also disposed on circumference of the front end of the flip cover rotating shaft accommodating portion 1311, and is formed by extending in a radial direction. The flip cover rotating shaft accommodating portion 1311 is configured to cooperate with the flip cover rotating shaft 11776 such that the flip cover rotating shaft 11776 can be connected to the hinge 1170.

The specific structure of the locking means 1120 will be described below with reference to FIGS. 7C and 7D. As shown in FIGS. 7C and 7D, the locking means 1120 includes a locking rod 1121, a locking portion 1127, a pushing portion 1123, a guide portion 1124, a guide portion 1125, and a protrusion 1126. Herein, the locking rod 1121 has an elongated shape and extends for a length in the left and right directions. The locking portion 1127 is disposed at the left end of the locking rod 1121 and is substantially in the shape of a hook protruding toward the rear side. One end of the locking portion 1127 is connected to the locking rod 1121, and the other end thereof forms the locking pin 1128. The locking pin 1128 can extend into or be withdrawn from the through hole 1222 in base 1101 and the flip cover hole 1111 in the hinge 1170, so as to lock the flip cover 1190 to the base 1101 or to release the flip cover 1190 from the base 1101. The pushing portion 1123 is disposed at the right end of the locking rod 1121 and is substantially plate-shaped. The pushing portion 1123 is disposed in a vertical direction and is connected to the locking rod 1121. The pushing portion 1123 is configured to cooperate with the drive means 11740. When the drive means 11740 pushes the pushing portion 1123, the drive means 11740 can push the locking means 1120 to move. The guide portion 1124 and the guide portion 1125 are disposed on the rear side of the locking rod 1121, and the guide portion 1124 and the guide portion 1125 are separated by a distance. The guide portion 1124 and the guide portion 1125 can cooperate with the protrusion 1232 and the protrusion 1231 on the base 1101 respectively, so as to guide the locking means 1120 to move in the left and right directions. The protrusion 1126 is disposed on the rear side of the locking rod 1121, and is disposed between the guide portion 1125 and the locking portion 1127. One end of the elastic component 1160 is connected to the protrusion 1126 and the other end of the elastic component 1160 is connected to the base 1101.

Figure 10A:
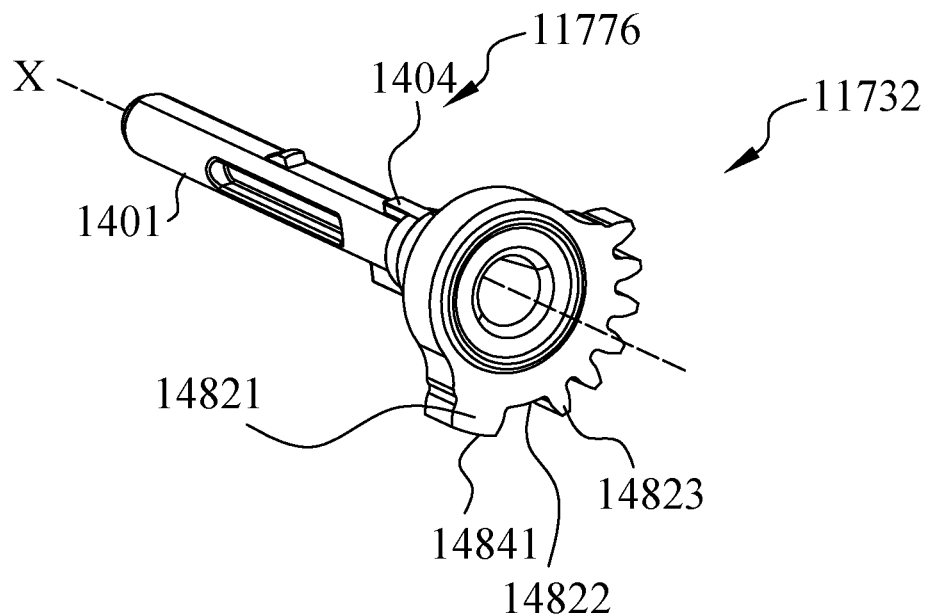
FIG. 10A is a perspective view, viewed from the front, of a flip cover rotating shaft and a transmission gear shown in FIGS. 7A-7D.
Figure 10B:
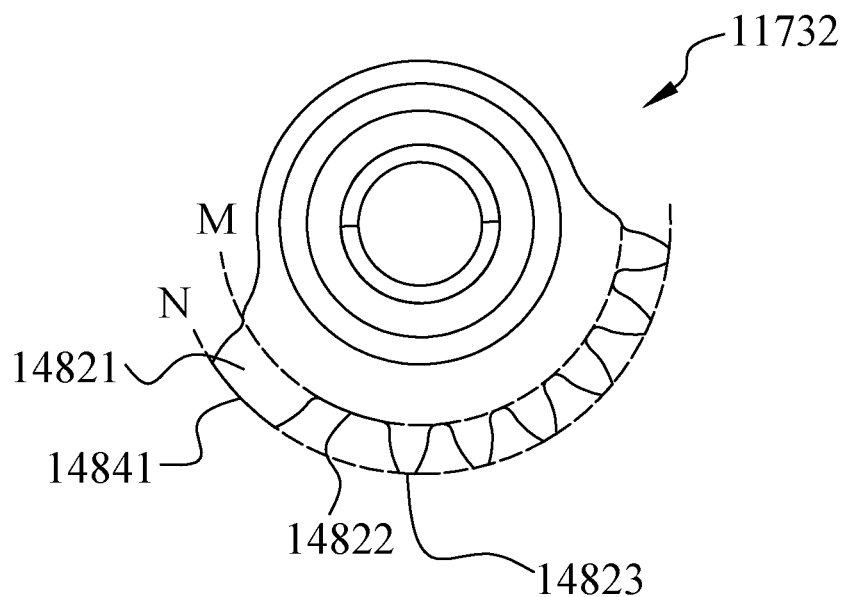
FIG. 10B is a front view, viewed from the front, of the transmission gear shown in FIG. 10A.

FIG. 10A is a perspective view, viewed from the front, of the flip cover rotating shaft 11776 and the transmission gear 11732 shown in FIGS. 7A-7D. FIG. 10B is a front view, viewed from the front, of the transmission gear 11732 shown in FIG. 10A, for illustrating the specific structures of the flip cover rotating shaft 11776 and the transmission gear 11732. As shown in FIGS. 10A and 10B, the flip cover rotating shaft 11776 includes a rotating shaft body 1401. The rotating shaft body is substantially a cylinder that can be accommodated in the flip cover rotating shaft accommodating portion 1311 in cooperation with the flip cover rotating shaft accommodating portion 1311. The transmission gear 11732 is connected to an end of the rotating shaft body 1401. The flip cover rotating shaft 11776 has the same axis of rotation as the transmission gear 11732. A radial protrusion 1404 is disposed on circumference of the end of the rotating shaft body 1401 near the transmission gear 11732, and is formed by extending outward in a radial direction of the rotating shaft body 1401. The radial protrusion 1404 is capable of engaging with the radial accommodating structure 1312 on the hinge 1170 to connect the flip cover rotating shaft 11776 to the hinge 1170.

The transmission gear 11732 is a fan-shaped gear. The outer periphery of the transmission gear 11732 is provided with a first transmission tooth portion, a second transmission tooth 14821, and a transmission disengagement portion 14822. The first transmission tooth portion and the second transmission tooth 14821 are located on two sides of the transmission disengagement portion 14822, respectively. Specifically, the first transmission tooth portion is located on the right side of the transmission disengagement portion 14822 in the circumferential direction. The first transmission tooth portion includes six first transmission teeth 14823 arranged in the circumferential direction. The transmission disengagement portion 14822 is a toothless portion that is in the shape of an arc in a plane perpendicular to the axis of rotation X. The circle in which the arc is located coincides with root circles M of the first transmission teeth 14823 and the second transmission tooth 14821. The second transmission tooth 14821 is located on the left side of the transmission disengagement portion 14822 in the circumferential direction. The circumferential dimension of the second transmission tooth 14821 is greater than that of the first transmission teeth 14823. In other words, the size of the second transmission tooth 14821 is greater than that of the first transmission teeth 14823 on any circumference centered on the axis of rotation X of the transmission gear 11732 and extending through the first transmission teeth 14823 and the second transmission tooth 14821. A tooth crest 14841 of the second transmission tooth 14821 is configured to cooperate with a limiting face 15951 on the drive gear 11704 (see FIGS. 11A and 11B), thereby limiting the positions of the transmission gear 11732 and the drive gear 11704.

Figure 11A:
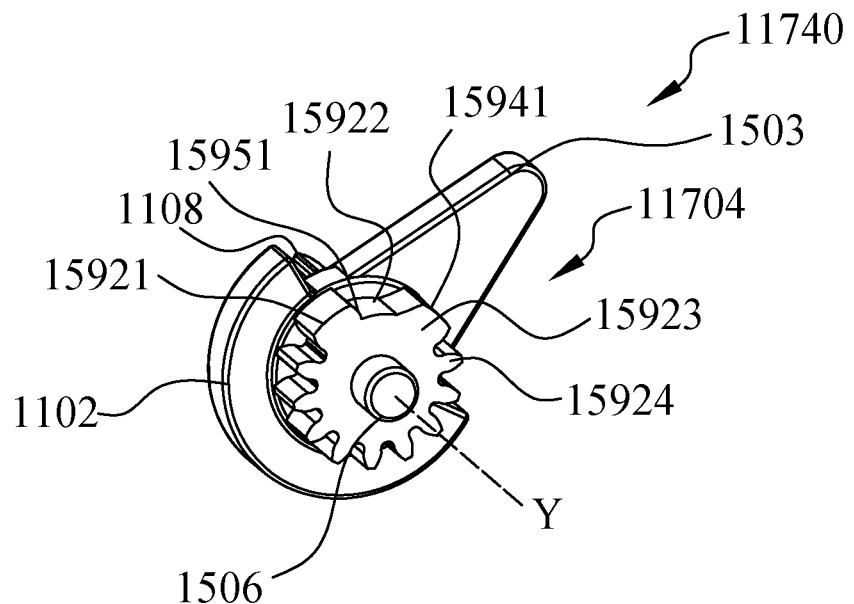
FIG. 11A is a perspective view, viewed from the rear, of a drive means shown in FIGS. 7A-7D.
Figure 11B:
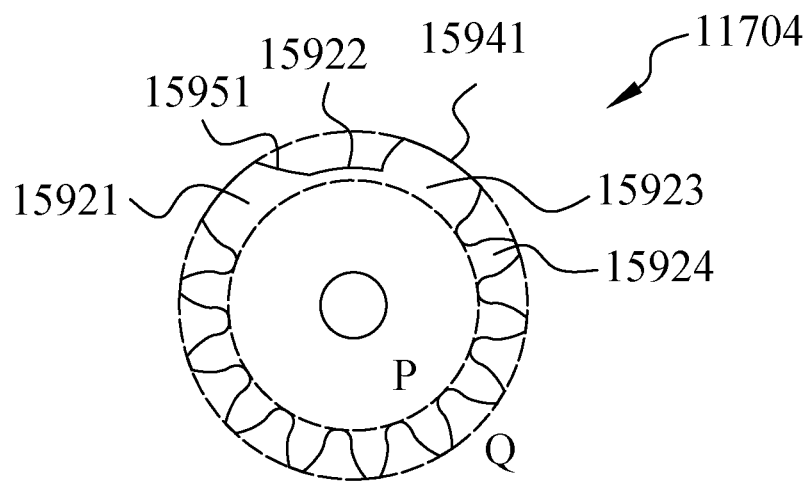
FIG. 11B is a front view, viewed from the rear, of the drive gear shown in FIG. 11 A.

FIG. 11A is a perspective view, viewed from the rear, of the drive means 11740 shown in FIGS. 7A-7D. FIG. 11B is an enlarged view of the drive gear 11704 shown in FIG. 11A, for illustrating the specific structure of the drive gear 11704. As shown in FIGS. 11A and 11B, the drive means 11740 includes a drive shaft 1108, a drive member 1102, a drive gear 11704, and a mounting shaft 1506. The drive shaft 1108, the drive member 1102, the drive gear 11704, and the mounting shaft 1506 are sequentially connected together, and the drive shaft 1108 and the mounting shaft 1506 are arranged coaxially. Specifically, the drive member 1102 is substantially a circular disc, and a drive arm 1503 is disposed thereon and is configured to be in contact with the pushing portion 1123 of the locking means 1120 (see FIGS. 7D and 7E). The drive gear 11704 is an external gear. A first drive tooth portion, a second drive tooth 15923, a third drive tooth 15921, and a drive disengagement portion 15922 are disposed on the outer periphery of the drive gear 11704. The third drive tooth 15921, the drive disengagement portion 15922, the second drive tooth 15923, and the first drive tooth portion are sequentially arranged in the circumferential direction. Specifically, the third drive tooth 15921 is located on the left side of the drive disengagement portion 15922 in the circumferential direction. The third drive tooth 15921 includes a limiting face 15951 connected to the drive disengagement portion 15922. The limiting face 15951 is configured to cooperate with the tooth crest 14841 of the second transmission tooth 14821 (see FIGS. 14A and 14B), thereby limiting the magnitude (or range) of rotation of the drive gear 11704 with respect to the transmission gear 11732. The drive disengagement portion 15922 is a toothless portion that is in the shape of an arc in a plane perpendicular to the axis of rotation Y. The circle in which the arc is located has a radius greater than that of root circles P of the first drive tooth portion, the second drive tooth 15923, and the third drive tooth 15921. The second drive tooth 15923 is located on the right side of the drive disengagement portion 15922 in the circumferential direction. The second drive tooth 15923 has a tooth crest 15941. The tooth crest 15941 is configured to cooperate with one of the first transmission teeth 14823 connected to one end of the transmission disengagement portion 14822 of the transmission gear 11732 to block the rotation of the transmission gear 11732. The first drive tooth portion includes nine first drive teeth 15924 arranged in the circumferential direction, each one of the first drive teeth 15924 having a circumferential dimension smaller than that of the second drive tooth 15923 and the third drive tooth 15921. In other words, the size of the first drive teeth 15924 is smaller than that of the second drive tooth 15923 and the third drive tooth 15921 on any one circumference centered on the axis of rotation Y of the drive gear 11704 and extending through the first drive teeth 15924, the second drive tooth 15923 and the third drive tooth 15921. Addendum circles Q of the first drive teeth 15924, the second drive tooth 15923, and the third drive tooth 15921 coincide.

Figure 12A:
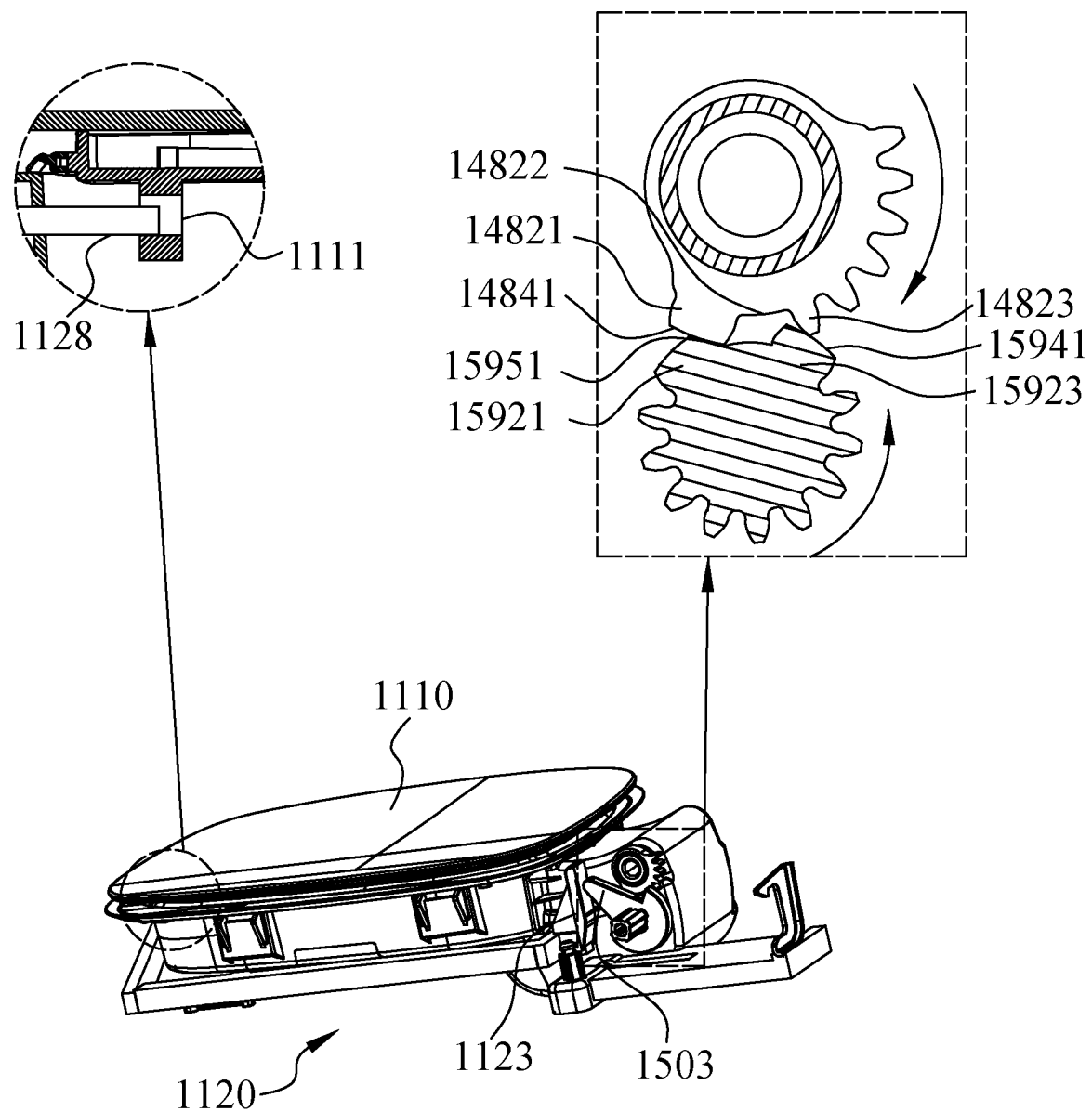
FIG. 12A is a schematic diagram showing the state of the flip cover assembly when the locking means is in a locking position and the flip cover is in a closed position.
Figure 12B:
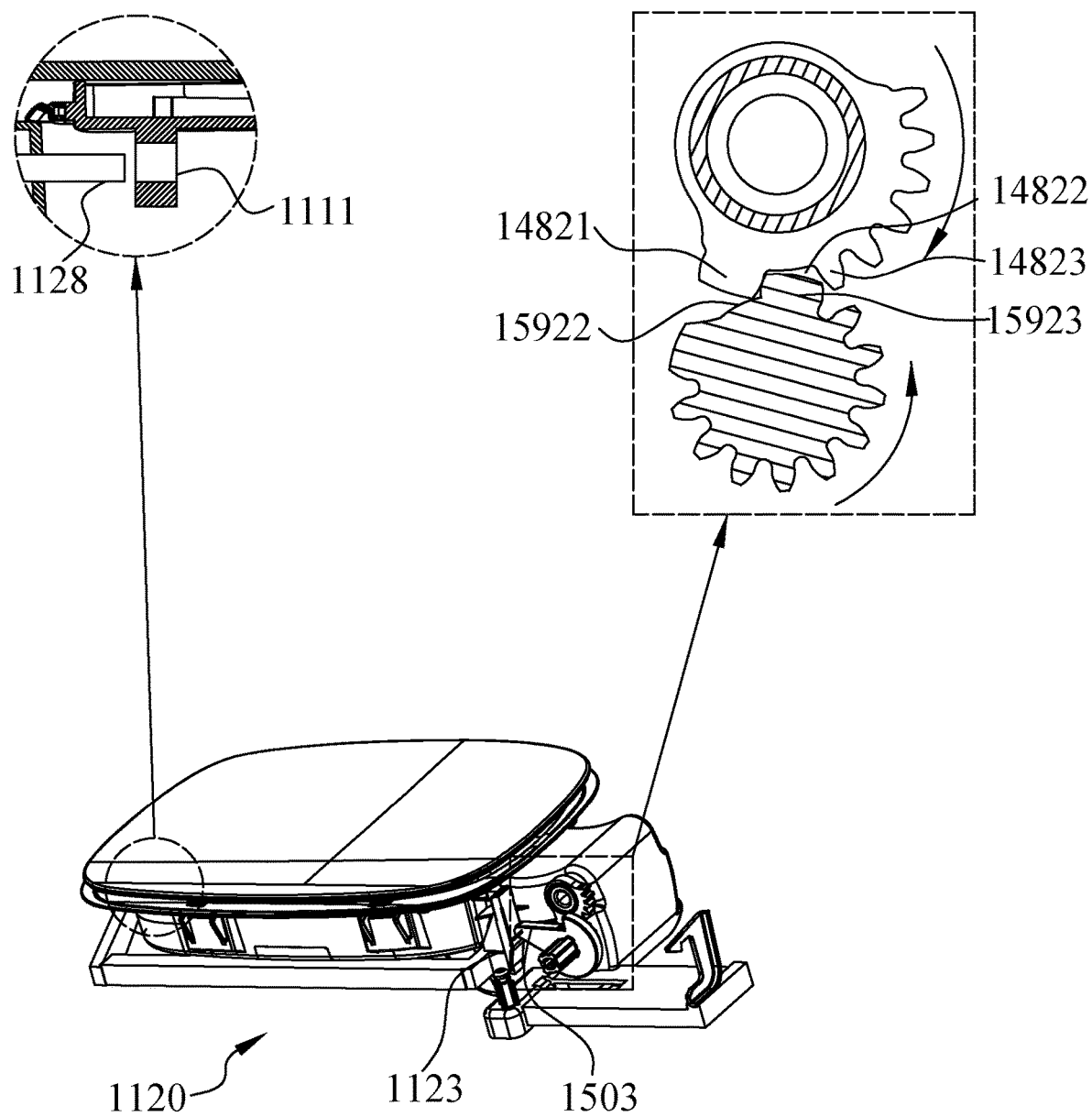
FIG. 12B is a schematic diagram showing the state of the flip cover assembly when the locking means is in a release position and the flip cover is in the closed position.
Figure 12C:
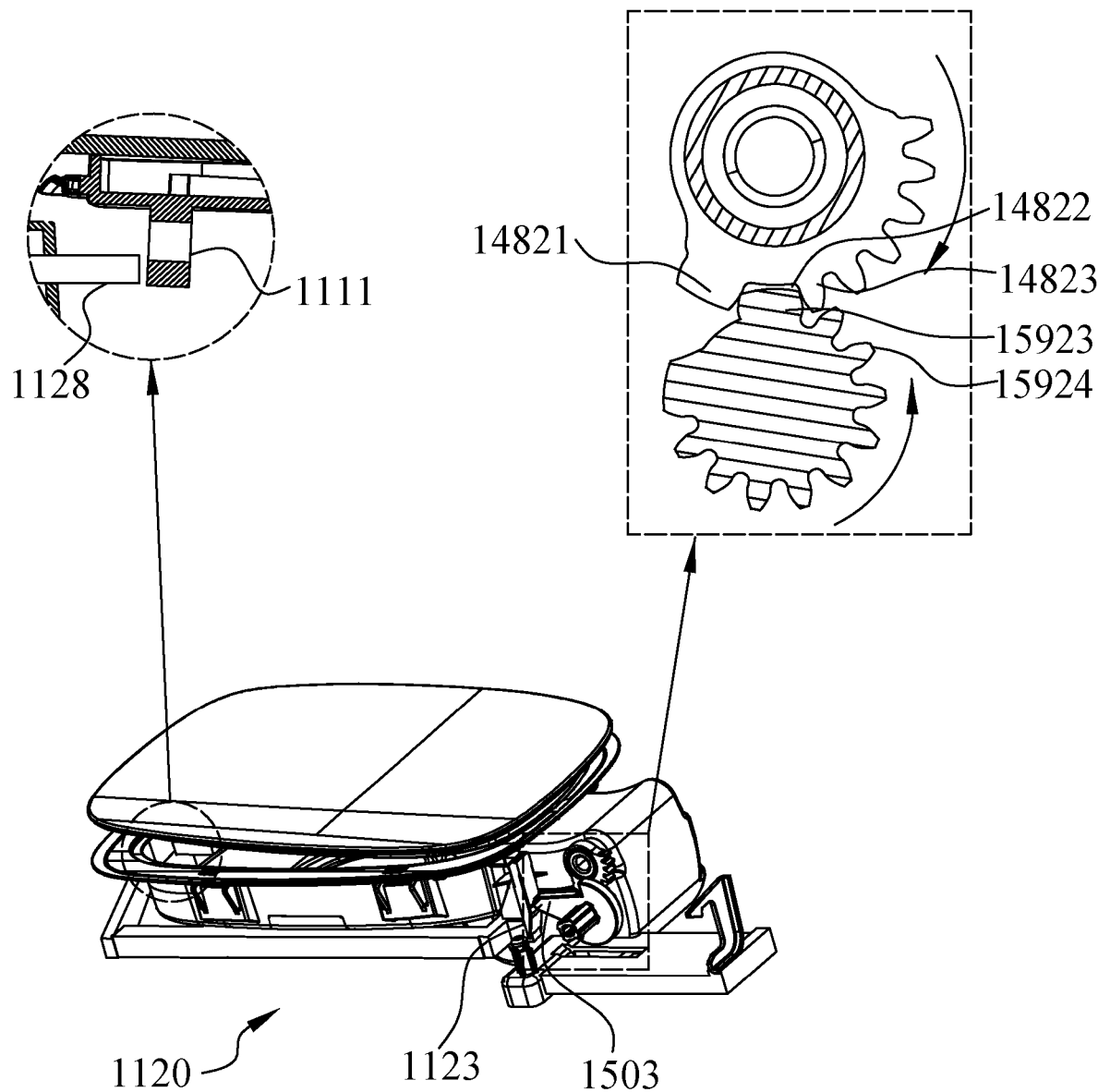
FIG. 12C is a schematic diagram showing a state in which a drive arm of a drive member is disengaged from a pushing portion of the locking means.
Figure 12D:
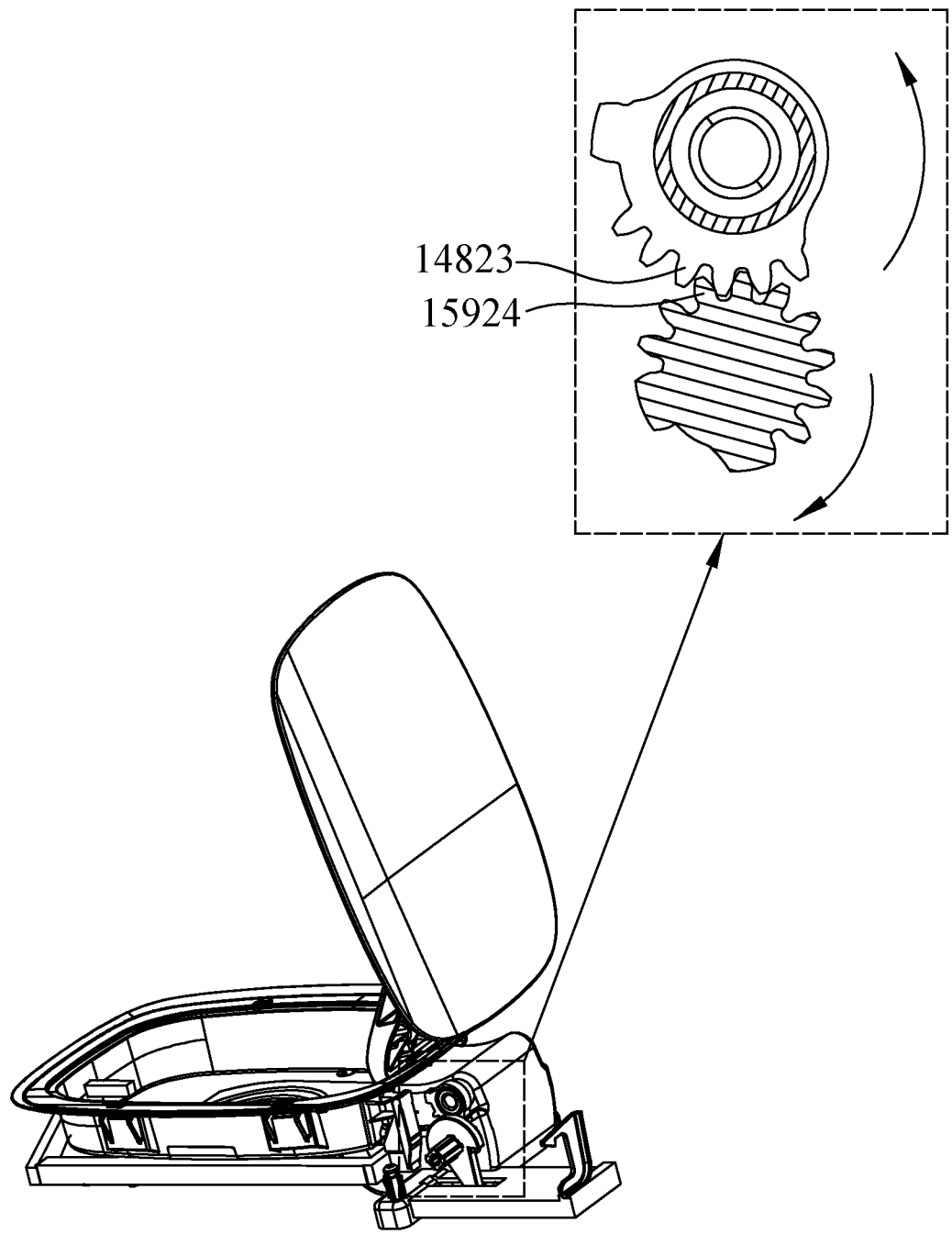
FIG. 12D is a schematic diagram showing the state of the flip cover assembly when the flip cover is completely opened.
Figure 12E:
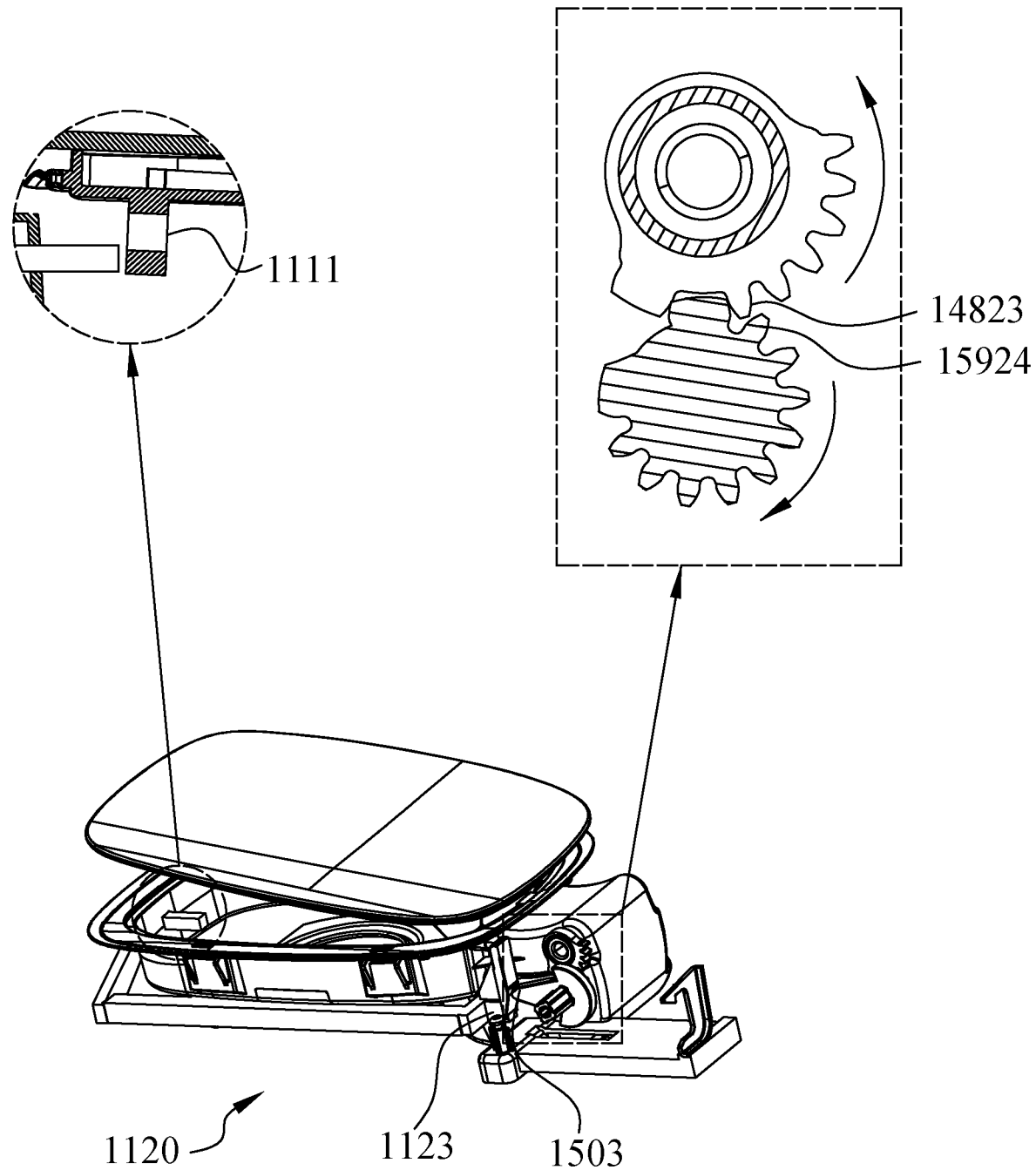
FIG. 12E is a schematic diagram showing a state in which the drive arm of the drive member is in contact with the pushing portion of the locking means.
Figure 12F:
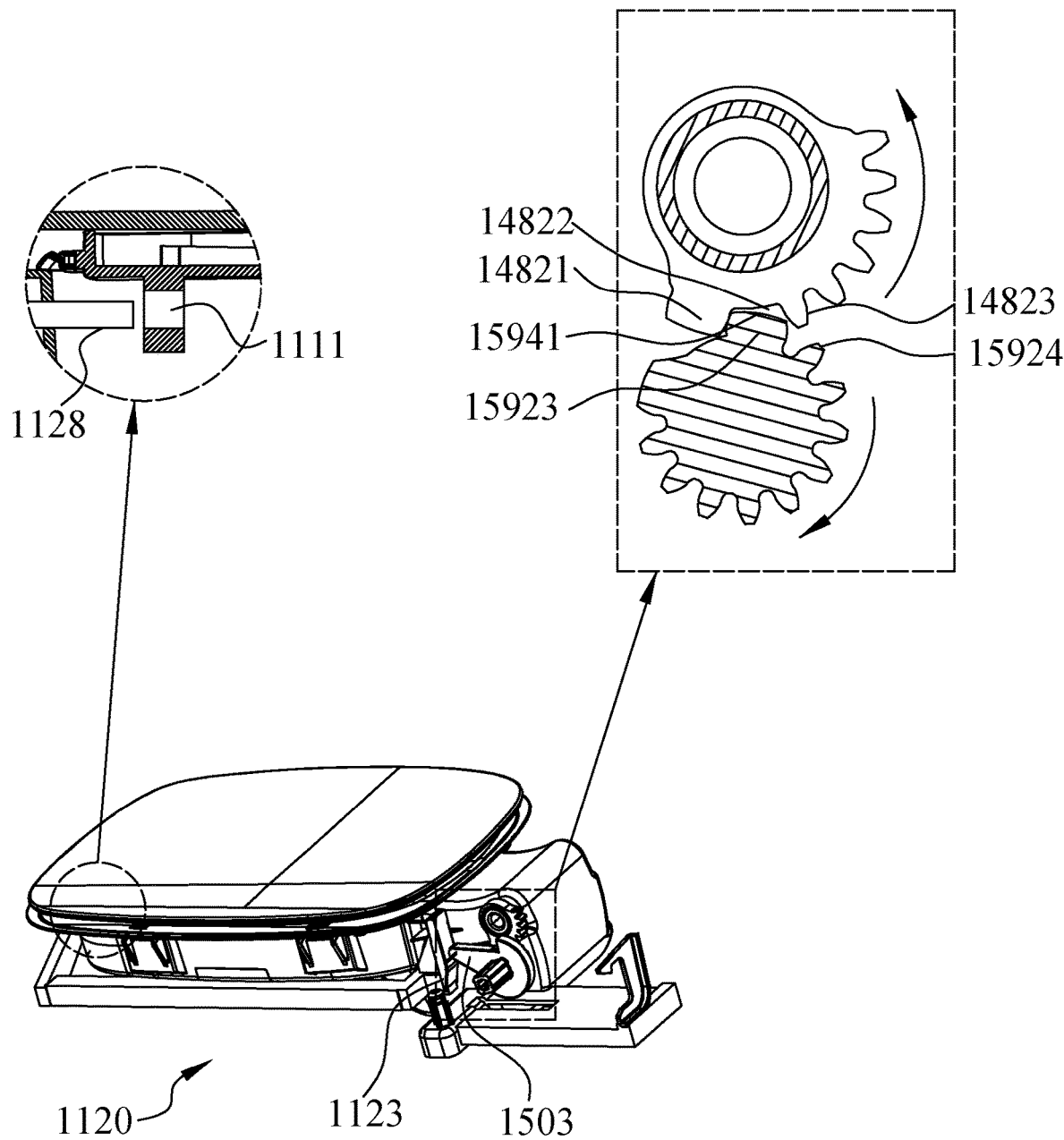
FIG. 12F is a schematic diagram showing the state of the flip cover assembly when the locking means is in the release position and the flip cover is in the closed position.
Figure 12G:
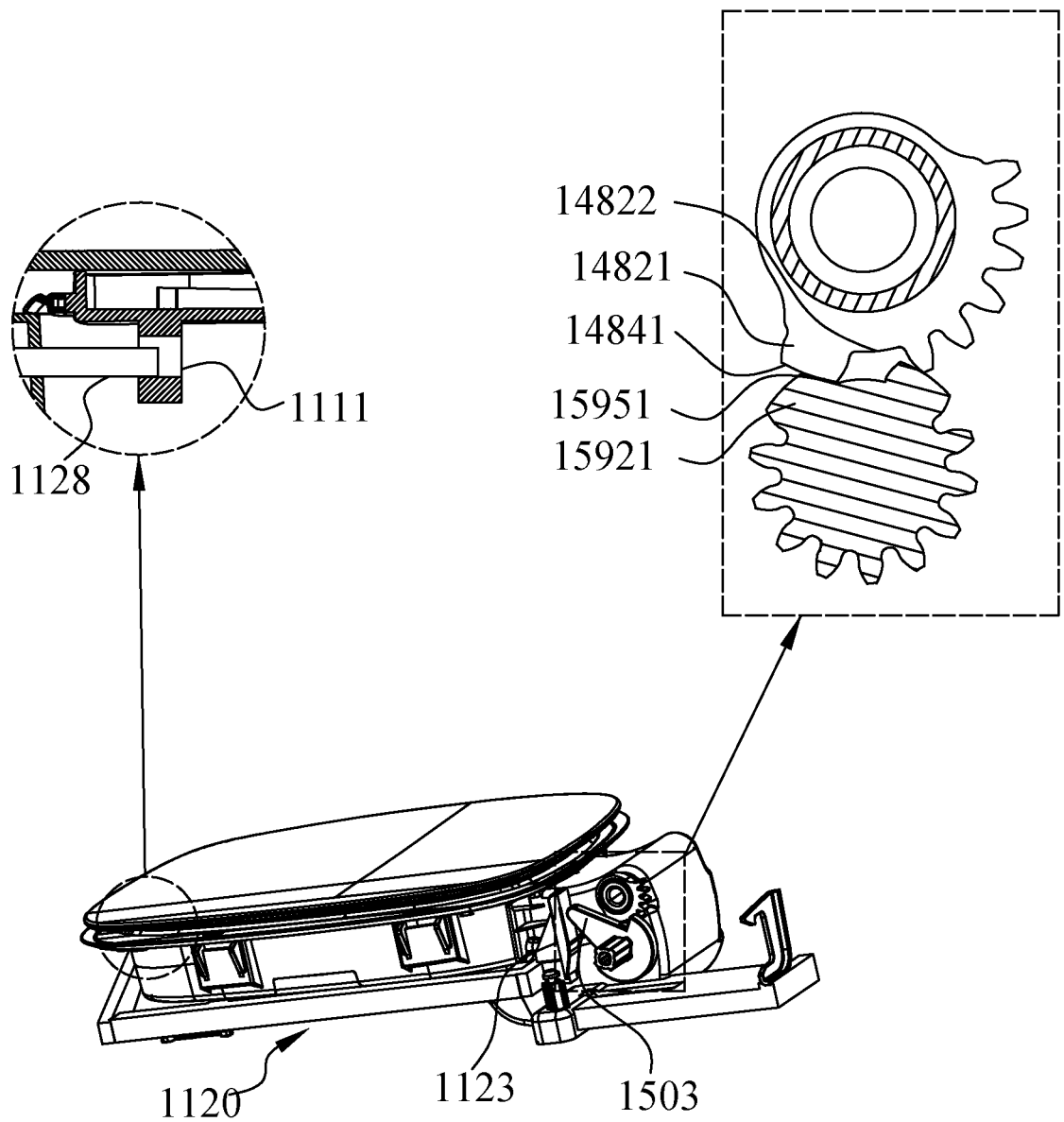
FIG. 12G is a schematic diagram showing the state of the flip cover assembly when the locking means is in the locking position and the flip cover is in the closed position.

The process of releasing and opening the flip cover 1190 and the process of closing and locking the flip cover 1190 are described below in conjunction with FIGS. 12A-12G:

FIG. 12A is a schematic diagram showing the state of the flip cover assembly 1100 when the locking means 1120 is in the locking position and the flip cover 1190 is in the closed position. FIG. 12B is a schematic diagram showing the state of the flip cover assembly 1100 when the locking means 1120 is in the release position and the flip cover 1190 is in the closed position. FIG. 12C is a schematic diagram showing a state in which the drive arm 1503 of the drive member 1102 is separated from the pushing portion 1123 of the locking means 1120. FIG. 12D is a schematic diagram showing the state of the flip cover assembly 1100 when the flip cover 190 is completely opened. FIG. 12E is a schematic diagram showing a state in which the drive arm 1503 of the drive member 1102 is in contact with the pushing portion 1123 of the locking means 1120. FIG. 12F is a schematic diagram showing the state of the flip cover assembly 1100 when the locking means 1120 is in the release position and the flip cover 1190 is in the closed position. FIG. 12G is a schematic diagram showing the state of the flip cover assembly 1100 when the locking means 1120 is in the locking position and the flip cover 1190 is in the closed position. For the convenience of illustration of the positional relationship of the components in different states in FIGS. 12A-12G, the power source 1150 is removed from FIGS. 12A-12G to better illustrate the cooperative relationship of the components of the flip cover assembly 1100. Dashed circular boxes in FIGS. 12A-12G show enlarged sectional views illustrating the cooperative relationship of the locking pin 1128 of the locking means 1120 and the flip cover hole 1111 of the hinge 1170, and dashed rectangular boxes in FIGS. 12A-12G show enlarged sectional views illustrating the cooperative relationship of the drive gear 11704 and the transmission gear 11732.

FIGS. 12A-12D show the process of releasing and opening the flip cover 1190. As shown in FIG. 12A, the flip cover 1190 is in the closed position and the locking means 1120 is in the locking position. The locking pin 1128 of the locking means 1120 is inserted into the through hole 1222 of the base 1101 and the flip cover hole 1111 in the hinge 1170, thereby keeping the flip cover 1190 in the closed position. At this moment, the limiting face 15951 of the third drive tooth 15921 of the drive gear 11704 abuts against the tooth crest 14841 of the second transmission tooth 14821 of the transmission gear 11732, and the tooth crest 15941 of the second drive tooth 15923 of the drive gear 11704 abuts against the first transmission tooth 14823 of the transmission gear 11732 that is adjacent to the transmission disengagement portion 14822.

The process from FIG. 12A to FIG. 12B illustrates the unlocking process of the locking means 1120. During this process, the power source 1150 drives the drive means 11740 to rotate in the counterclockwise direction, and therefore, both the drive member 1102 and the drive gear 11704 also rotate in the counterclockwise direction. On the one hand, during rotation of the drive member 1102 in the counterclockwise direction, the drive arm 1503 of the drive member 1102 abuts against and pushes the pushing portion 1123 of the locking means 1120 to withdraw the locking pin 1128 from the flip cover hole 1111, so as to drive the locking means 1120 to move from the locking position to the release position. On the other hand, during rotation of the drive gear 11704 in the counterclockwise direction, the second drive tooth 15923 of the drive gear 11704 gradually rotates into the transmission disengagement portion 14822 of the transmission gear 11732. At this moment, the drive gear 11704 rotates with respect to the transmission gear 11732. In other words, the drive gear 11704 does not drive the transmission gear 11732 to rotate at this moment. Accordingly, during the process from FIG. 12A to FIG. 12B, the locking means 1120 is moved from the locking position to the release position and, since the drive gear 11704 rotates with respect to the transmission gear 11732, the flip cover rotating shaft 11776 does not move and the flip cover 1190 remains in the closed position.

In the state shown in FIG. 12B, a tooth waist of the second drive tooth 15923 of the drive gear 11704 that is connected to the drive disengagement portion 15922 is in contact with a tooth waist of the second transmission tooth 14821 of the transmission gear 11732 that is connected to the transmission disengagement portion 14822.

The process from FIG. 12B to FIG. 12D illustrates the process of the flip cover 1190 moving from the closed position to the open position. During this process, the power source 1150 continues to drive the drive means 11740 to rotate in the counterclockwise direction, and therefore, both the drive member 1102 and the drive gear 11704 also continue to rotate in the counterclockwise direction. As shown in FIG. 12B, during rotation of the drive gear 11704 in the counterclockwise direction, the second drive tooth 15923 of the drive gear 11704 begins to be meshed with the second transmission tooth 14821 of the transmission gear 11732 such that the drive gear 11704 stops rotating with respect to the transmission gear 11732, but begins to drive the transmission gear 11732 to rotate in the clockwise direction, and the transmission gear 11732 then drives the hinge 1170 to rotate such that the flip cover 1190 presents the state as shown in FIG. 12C. In the state as shown in FIG. 12C, the second drive tooth 15923 of the drive gear 11704 is disengaged from the second transmission tooth 14821 of the transmission gear 11732 and the first drive teeth 15924 of the drive gear 11704 begin to be meshed with the first transmission teeth 14823 of the transmission gear 11732, such that the counterclockwise rotation of the drive gear 11704 can further drive the transmission gear 11723 to rotate in the clockwise direction and the rotation of the transmission gear 11723 drives the flip cover 1190 to rotate in the clockwise direction. In this way, the flip cover 1190 moves from the closed position to the open position as shown in FIG. 12D.

It should be noted that during the process shown from FIG. 12B to FIG. 12C, the drive arm 1503 of the drive member 1102 also rotates in the clockwise direction, and therefore, the drive arm 1503 continues to push the pushing portion 1123 of the locking means 1120 such that the locking means 1120 is in an unlocking position. In the state shown in FIG. 12C, the drive arm 1503 of the drive member 1102 is separated from the pushing portion 1123 of the locking means 1120. That is to say, the drive arm 1503 of the drive member 1102 stops pushing the pushing portion 1123 of the locking means 1120. Since the locking means 1120 is constantly moved to the left, during the process shown from FIG. 12A to FIG. 12C, the spring 1160 is constantly compressed. Until in the state shown in FIG. 12C, the drive arm 1503 of the drive member 1102 is separated from the pushing portion 1123 of the locking means 1120. At this moment, the spring 1160 applies a rightward force to the locking means 1120 to move the locking means 1120 to the right until the locking means returns to the locking position. However, since the flip cover 1190 has been opened, the locking means 1120 having been returned to the locking position does not restrict the movement of the flip cover 1190.

FIGS. 12D-12G illustrate the process of closing and locking the flip cover 1190.

The process from FIGS. 12D to 12F illustrates the process of the flip cover 1190 moving from the open position to the closed position. During this process, the power source 1150 drives the drive means 11740 to rotate in the clockwise direction, and therefore, both the drive member 1102 and the drive gear 11704 also continue to rotate in the clockwise direction. As shown in FIG. 12D, during rotation of the drive gear 11704 in the clockwise direction, the first drive teeth 15924 of the drive gear 11704 are meshed with the first transmission teeth 14823 of the transmission gear 11732 such that the clockwise rotation of the drive gear 11704 can drive the transmission gear 11723 to rotate in the counterclockwise direction, and the rotation of the transmission gear 11723 drives the flip cover 1190 to rotate in the counterclockwise direction such that the flip cover 1190 rotates to the state shown in FIG. 12E. In the state shown in FIG. 12E, the first drive teeth 15924 of the drive gear 11704 begin to be disengaged from the first transmission teeth 14823 of the transmission gear 11732 and the second drive tooth 15923 of the drive gear 11704 begins to be meshed with the second transmission tooth 14821 of the transmission gear 11732, such that the drive gear 11704 can drive the transmission gear 11732 to rotate in the counterclockwise direction. In this way, the flip cover 1190 moves from the open position to the closed position as shown in FIG. 12F.

It should be noted that, during the process shown from FIG. 12D to FIG. 12F, the drive arm 1503 of the drive member 1102 also rotates in the clockwise direction. During the process shown in FIGS. 12D and 12E, the drive arm 1503 of the drive member 1102 is always separated from the pushing portion 1123 of the locking means 1120 until the drive arm 1503 of the drive member 1102 is in contact with the pushing portion 1123 of the locking means 1120 in the state shown in FIG. 12E. During the process shown from FIG. 12E to FIG. 12F, the drive arm 1503 pushes the pushing portion 1123 of the locking means 1120, so as to move the locking means 1120 from the locking position to the unlocking position.

In the process shown from FIG. 12F to FIG. 12G, the power source 1150 drives the drive means 11740 to continue to rotate in the clockwise direction, and therefore, both the drive member 1102 and the drive gear 11704 also continue to rotate in the clockwise direction. On the one hand, the second drive tooth 15923 of the drive gear 11704 gradually rotates and, thus, disengages from the transmission disengagement portion 14822 of the transmission gear 11732. Until in the position shown in FIG. 12F, the drive gear 11704 stops driving the transmission gear 11732 to rotate, and at that moment, the drive gear 11704 rotates with respect to the transmission gear 11732. The drive gear 11704 continues to rotate clockwise until the limiting face 15951 of the third drive tooth 15921 of the drive gear 11704 abuts against the tooth crest 14841 of the second transmission tooth 14821 of the transmission gear 11732, and the drive gear 11704 does not continue to rotate in the clockwise direction. On the other hand, since the drive arm 1503 of the drive member 1102 continues to rotate in the clockwise direction, the drive arm 1503 continues to push the pushing portion 1123 of the locking means 1120 such that the locking means 1120 is moved from the unlocking position to the locking position, and the locking pin 1128 of the locking means 1120 is accordingly inserted into the through hole 1222 of the base 1101 and the flip cover hole 1111 of the hinge 1170 to keep the flip cover 1190 in the closed position. During the rotation, the first transmission tooth 14823 of the transmission gear 11732 that is connected to the transmission disengagement portion 14822 abuts against the tooth crest 15941 of the second drive tooth 15923 of the drive gear 11704 to block the rotation of the transmission gear 11732 in the clockwise direction.

In the prior art, after the flip cover is located in the closed position, the drive gear stops limiting the transmission gear and the drive gear only controls the movement of the locking means, and therefore, when the vehicle is shaken, the flip cover may swing toward the open position and accordingly cannot keep in the closed position, and the locking means cannot lock the flip cover that is not in the closed position.

By contrast, the actuation assembly of the present disclosure is configured such that when the flip cover is in the closed position, during the movement of the locking means 1120 from the release position to the locking position, the first transmission tooth 14823 of the transmission gear 11732 that is connected to the transmission disengagement portion 14822 abuts against the tooth crest 15941 of the second drive tooth 15923 of the drive gear 11704. Therefore, the rotation of the transmission gear 11732 in clockwise direction is restricted while the drive gear 11704 is rotating. That is to say, the flip cover is restricted from rotating in an opening direction while the drive gear 11704 is rotating. Accordingly, the rotation of the transmission gear 11732 is always restricted by the drive gear 11704 regardless of whether the vehicle is shaken. Therefore, the flip cover always remains in the closed position during the movement of the locking means 1120 from the release position to the locking position.

It should also be noted that, although the locking means 1120 is shown in the embodiments of the present disclosure, the locking means 1120 may not be provided in other embodiments to keep the flip cover in the closed position. The flip cover can keep in the closed position only due to the fact that the first transmission tooth 14823 of the transmission gear 11732 that is connected to the transmission disengagement portion 14822 abuts against the tooth crest 15941 of the second drive tooth 15923 of the drive gear 11704.

Although six first transmission teeth 14823 and nine first drive teeth 15924 are shown in the above embodiments, those skilled in the art will appreciate that the number of the first transmission teeth 14823 and the number of the first drive teeth 15924 may be selected as required.

Although the third drive tooth 15921 of the drive gear 11704 with a larger size and the second transmission tooth 14821 of the transmission gear 11732 with a larger size are shown in the above embodiments, those skilled in the art will appreciate that the gear with a larger size has improved stress-resistance and the design thereof with a larger size can prolong the service life of the actuation assembly.

Figure 13A:
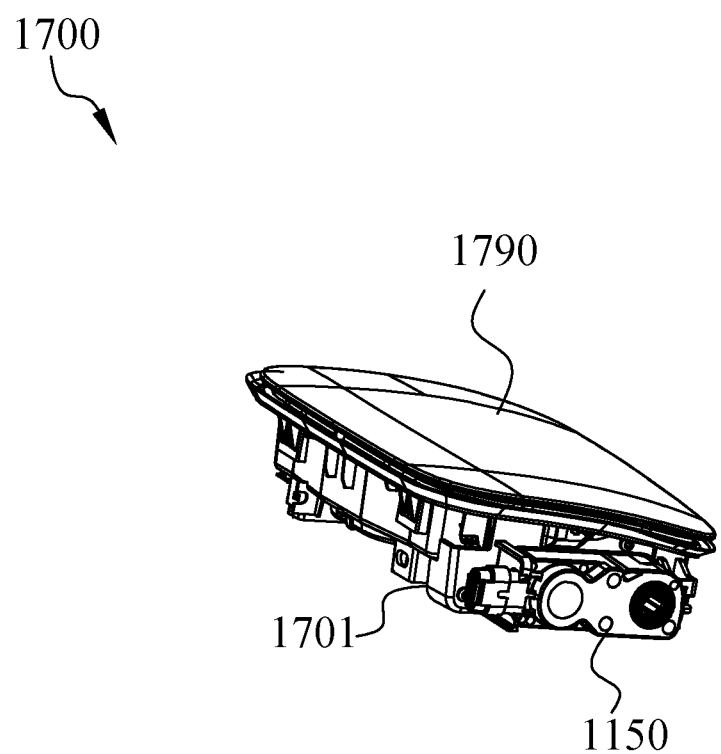
FIG. 13A is a perspective view, viewed from the front, of a third embodiment of a refueling port or charging port flip cover assembly of the present disclosure, with a flip cover being in a closed state.
Figure 13B:
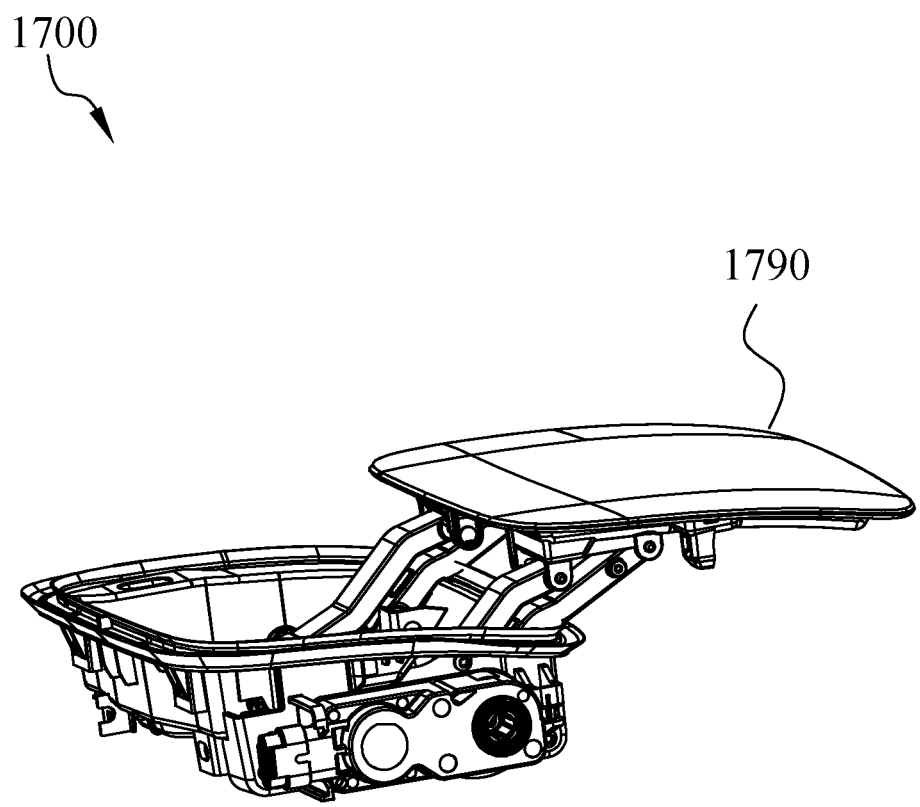
FIG. 13B is a perspective view, viewed from the front, of the refueling port or charging port flip cover assembly shown in FIG. 13A, with the flip cover being in an open state.
Figure 13C:
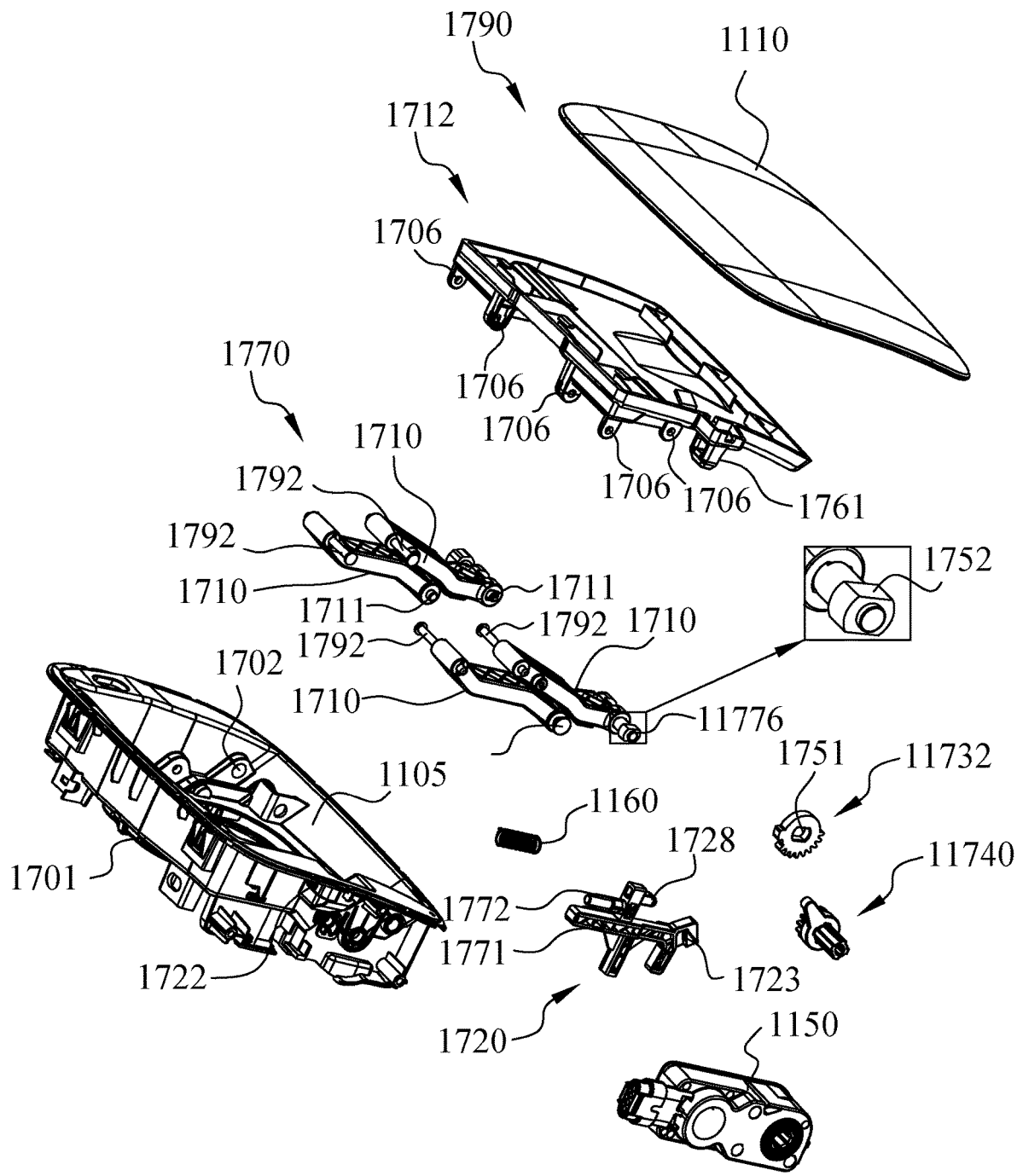
FIG. 13C is an exploded view, viewed from the front, of the refueling port or charging port flip cover assembly shown in FIG. 13A.

FIG. 13A is a perspective view, viewed from the front, of a third embodiment of a refueling port or charging port flip cover assembly of the present disclosure, with a flip cover being in a closed state. FIG. 13B is a perspective view, viewed from the front, of the refueling port or charging port flip cover assembly shown in FIG. 13A, with the flip cover being in an open state. FIG. 13C is an exploded view, viewed from the front, of the refueling port or charging port flip cover assembly shown in FIG. 13A.

The parts of the refueling port or charging port flip cover assembly 1700 shown in FIGS. 13A-13C that are similar to those of the refueling port or charging port flip cover assembly 1100 shown in FIGS. 7A-7D will not be described in detail. In order to keep the description concise, similar parts are given similar reference numerals. The differences between the refueling port or charging port flip cover assembly 1700 shown in FIGS. 13A-13D and the refueling port or charging port flip cover assembly 1100 shown in FIGS. 7A-7D are: first, that the shape of the hinge and the way for connecting the flip cover 1790 to the base are different, and second, that the structure of the locking means is different. The differences in the specific structure thereof will be described with reference to FIGS. 13A-13C.

As shown in FIGS. 13A-13C, the refueling port or charging port flip cover assembly 1700 includes a base 1701, a flip cover 1790, and an actuation assembly. The actuation assembly includes a hinge 1770, a flip cover rotating shaft 11776, a transmission gear 11732, a drive means 11740, a power source 1150, a locking means 1720, and an elastic component 1160.

In the refueling port or charging port flip cover assembly 1700, the base 1701 has a receiving cavity 1105. Four mounting portions 1702 are disposed in the receiving cavity 1105. Specifically, the four mounting portions 1702 extend upward from the bottom of the receiving cavity 1105, so as to be connected to the hinge. The four mounting portions 1702 are divided into two groups, each group including two mounting portions 1702. One group is disposed on the front side and is arranged substantially in parallel. The other group is disposed on the rear side and is arranged substantially in parallel. Each mounting portion 1702 is provided with a connection hole for accommodating a connector 1711. A wall of the front side of the base 1701 is provided with a through hole 1722. The through hole 1722 extends in the left and right directions. The through bore 1722 is configured to receive a locking pin 1728 on the locking means 1720.

As shown in FIGS. 13A-13C, in the refueling port or charging port flip cover assembly 1700, the flip cover 1790 includes a flip cover body 1110 and a connecting portion 1712. The flip cover body 1110 covers the connecting portion 1712. The lower side of the front portion of the connecting portion 1712 is provided with the flip cover hole 1761 to form a locking receiving portion. The hinge 1770 includes four rods 1710 and four connecting rods 1792. The four rods 1710 are rotatably connected to the connecting portion 1712 by means of the four connecting rods 1792 respectively. Specifically, the lower portion of the connecting portion 1712 is provided with eight mounting holes 1706, which are divided into four groups to match with the four rods 1710 respectively. The upper end of each rod 1710 is provided with a first through hole and the lower end of each rod 1710 is provided with a second through hole. For the two rods 1710 disposed on the rear side and the left rod 1710 disposed on the front side, the first through hole in each rod is aligned with a group of mounting holes 1706, and the connecting rod 1792 is accommodated in the first through hole and the mounting holes 1706, such that the rod 1710 is rotatably connected to the connecting portion 1712. The second through hole is aligned with the connection hole in the mounting portion 1702 on the base 1701 and the connector 1711 is accommodated in the first through hole in the rod 1710 and the connecting hole in the mounting portion 1702, such that the rod 1710 and the base 1701 are rotatably connected together. For the right rod 1710 disposed on the front side, the first through hole therein is aligned with a group of mounting holes 1706 and the connecting rod 1792 is accommodated in the first through hole and the mounting holes 1706, such that the rod 1710 is rotatably connected to the connecting portion 1712. The second through hole is aligned with the connection hole in the mounting portion 1702 on the base 1701 and the flip cover rotating shaft 11776 is accommodated in the first through hole on the rod 1710 and the connection hole in the mounting portion 1702, such that the rod 1710 and the base 1701 are rotatably connected together. The flip cover rotating shaft 11776 is connected to the transmission gear 11732. Specifically, the transmission gear 11732 has a through hole 1722 and an end 1752 of the flip cover rotating shaft 11776 is accommodated in the through hole 11732 such that the transmission gear 11732 can drive the flip cover rotating shaft 11776 to rotate while rotating.

As shown in FIGS. 13A-13C, in the refueling port or charging port flip cover assembly 1700, the locking means 1720 is disposed at the lower portion of the front side of the base 1701 and is configured to be capable of locking or releasing the hinge 1770, so as to lock or release the flip 1790. The locking means 1720 has a locking position and a release position. When the locking means 1720 is in the locking position, the locking means 1720 passes through a through hole 1722 in the base 1701 and extends into the flip cover hole 1761 in the hinge 1770. When the locking means 1720 is in the release position, the locking means 1720 is withdrawn from the flip cover hole 1761 in the hinge 1770, such that the flip cover 1790 can rotate with respect to the base 1701. Specifically, the locking means 1720 includes a locking body 1771, a support portion 1772, a pushing portion 1723, and a locking pin 1728. The support portion 1772 is disposed on the left side of the upper portion of the locking body 1771 for supporting the elastic component 1160. The elastic component 1160 is disposed around the support portion 1772 to provide a rightward force to the locking means 1720. The pushing portion 1723 is disposed at the right end of the locking body 1771 for cooperation with the drive means 11740. When the drive means 11740 pushes the pushing portion 1723, the drive means 11740 can push the locking means 1720 to move. The locking pin 1728 is disposed on the right side of the upper portion of the locking body 1771. The locking pin 1728 can extend into or be withdrawn from the through hole 1722 in base 1701 and the flip cover hole 1761 in the hinge 1770, so as to lock the flip cover 1790 to the base 1701 or to release the flip cover 1790 from the base 1701.

It should be noted that, although the hinge 1170 in the refueling port or charging port flip cover assembly 1100 is a gooseneck type hinge that includes a hinge body 1301 and a bent portion 1302, which are connected to each other, whereas the hinge 1770 in the refueling port or charging port flip cover assembly 1700 is a four-link type hinge, the function of the hinge in both cases is opening and closing the flip cover 1790.

Figure 14A:
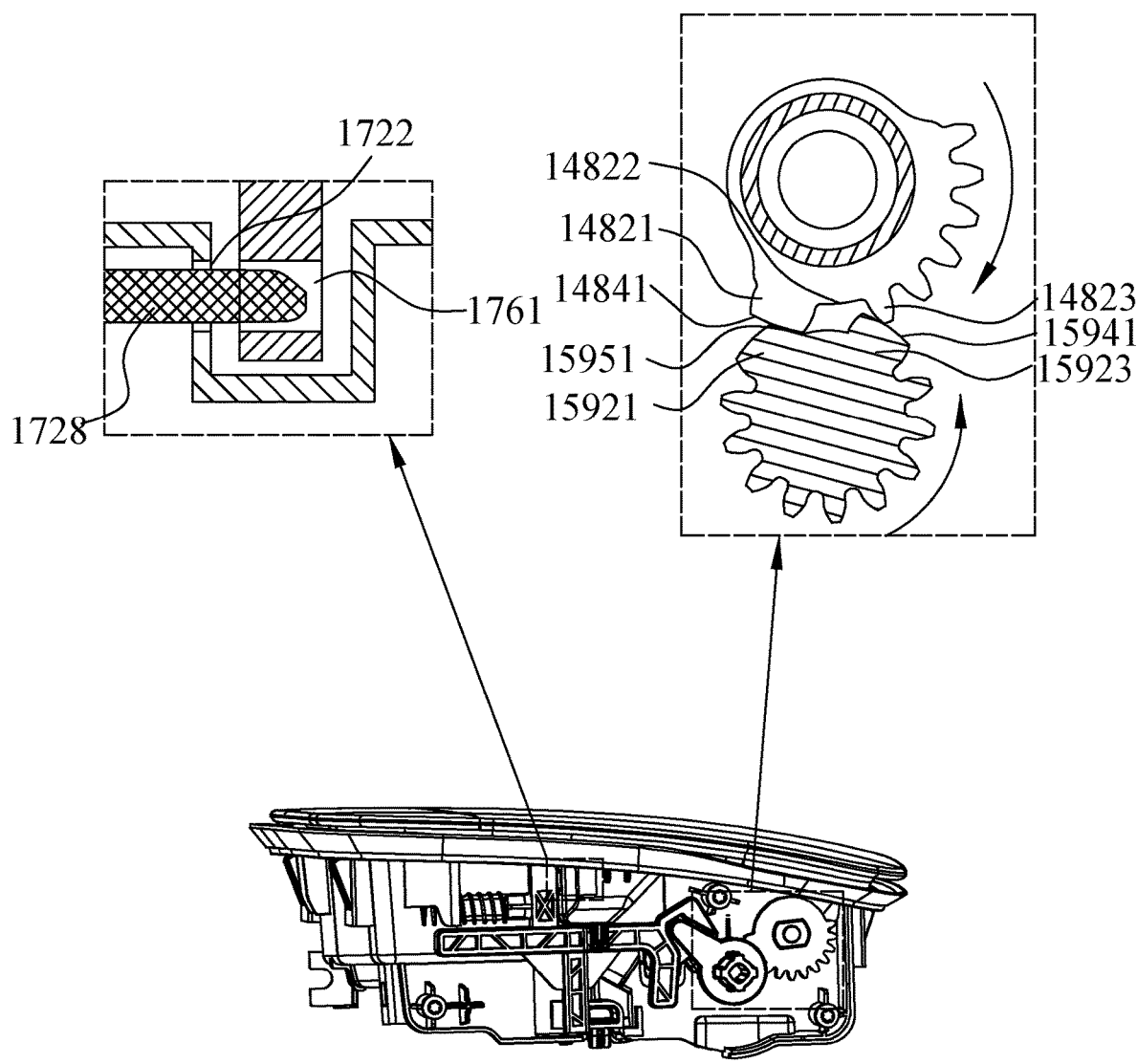
FIG. 14A is a schematic diagram showing the state of the flip cover assembly when the locking means is in a locking position and the flip cover is in a closed position.
Figure 14B:
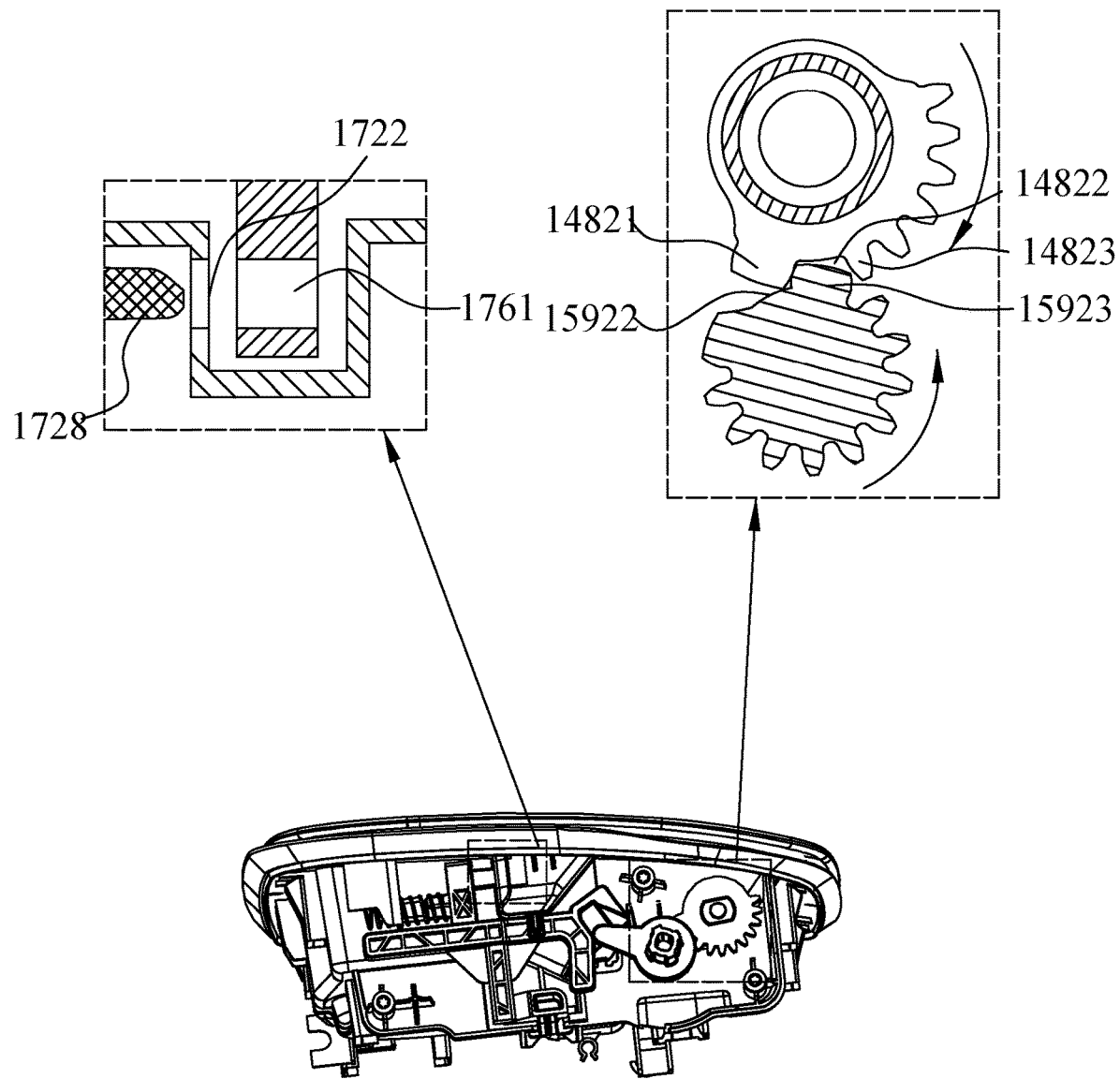
FIG. 14B is a schematic diagram showing the state of the flip cover assembly when the locking means is in a release position and the flip cover is in the closed position.
Figure 14C:
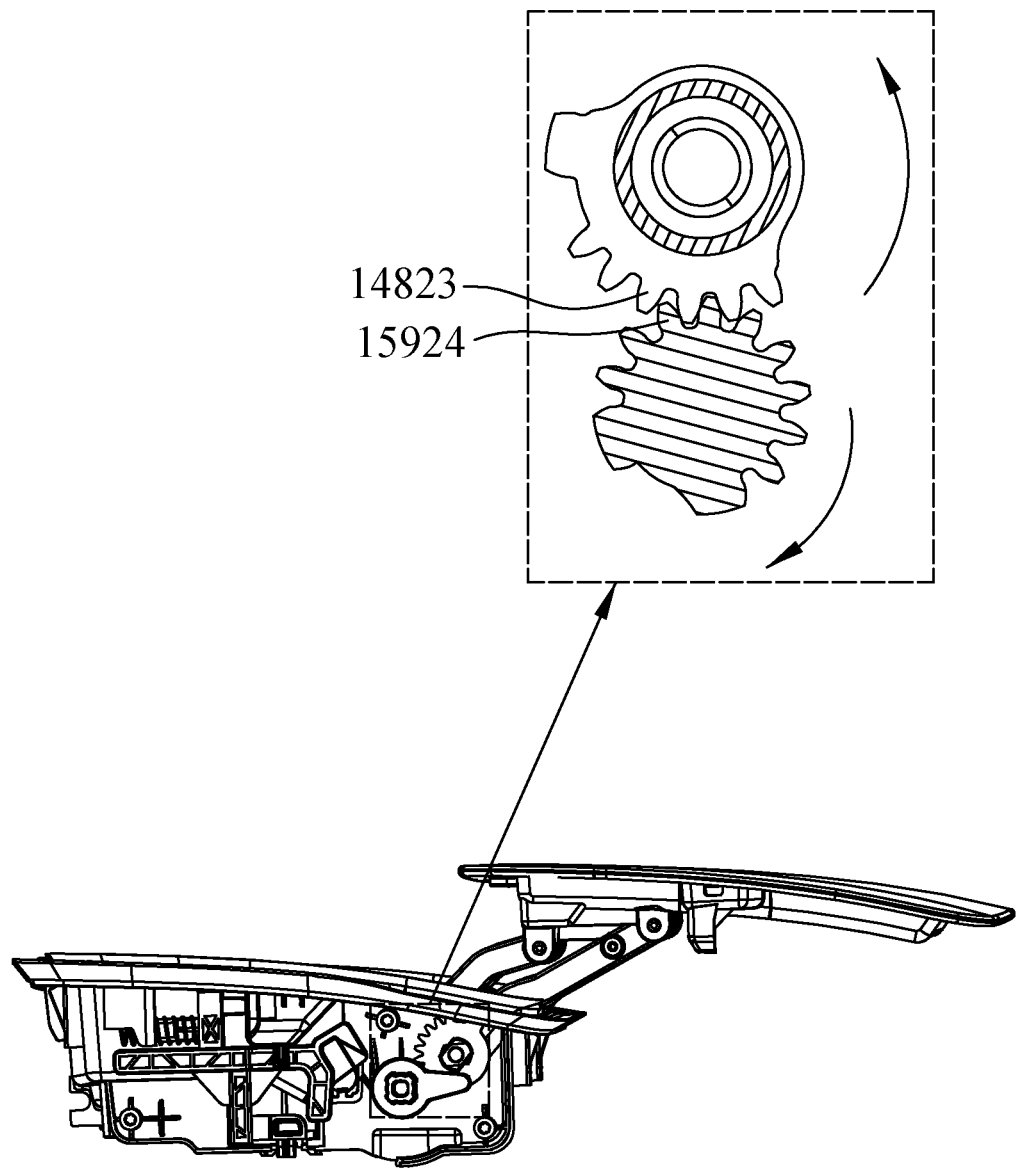
FIG. 14C is a schematic diagram showing the state of the flip cover assembly when the flip cover is completely opened.

FIGS. 14A-14C show the process of releasing and opening the flip cover 1790. As shown in FIG. 14A, the flip cover 1790 is in the closed position, and the locking means 1720 is in the locking position. The locking pin 1728 of the locking means 1720 is inserted into the through hole 1722 of the base 1101 and the flip cover hole 1761 in the hinge 1770, thereby keeping the flip cover 1790 in the closed position. At this moment, the limiting face 15951 of the third drive tooth 15921 of the drive gear 11704 abuts against the tooth crest 14841 of the second transmission tooth 14821 of the transmission gear 11732, and the tooth crest 15941 of the second drive tooth 15923 of the drive gear 11704 abuts against the first transmission tooth 14823 of the transmission gear 11732 that is adjacent to the transmission disengagement portion 14822.

The process from FIG. 14A to FIG. 14B illustrates the unlocking process of the locking means 1720. During this process, the power source 1150 drives the drive means 11740 to rotate in the counterclockwise direction, and therefore, both the drive member 1102 and the drive gear 11704 also rotate in the counterclockwise direction. On the one hand, during rotation of the drive member 1102 in the counterclockwise direction, the drive arm 1503 of the drive member 1102 abuts against and pushes the pushing portion 1723 of the locking means 1720, so as to drive the locking means 1720 to move from the locking position to the release position. On the other hand, during rotation of the drive gear 11704 in the counterclockwise direction, the second drive tooth 15923 of the drive gear 11704 gradually rotates into the transmission disengagement portion 14822 of the transmission gear 11732. At this moment, the drive gear 11704 rotates with respect to the transmission gear 11732. In other words, the drive gear 11704 does not drive the transmission gear 11732 to rotate at this moment. Accordingly, during the process from FIG. 14A to FIG. 14B, the locking means 1720 is moved from the locking position to the release position and, since the drive gear 11704 rotates with respect to the transmission gear 11732, the flip cover rotating shaft 11776 does not move and the flip cover 1790 is in the closed position.

In the state shown in FIG. 14B, a tooth waist of the second drive tooth 15923 of the drive gear 11704 that is connected to the drive disengagement portion 15922 is in contact with a tooth waist of the second transmission tooth 14821 of the transmission gear 11732 that is connected to the transmission disengagement portion 14822.

The process from FIG. 14B to FIG. 14C illustrates the process of the flip cover 1790 moving from the closed position to the open position. During this process, the power source 1150 continues to drive the drive means 11740 to rotate in the counterclockwise direction, and therefore, both the drive member 1102 and the drive gear 11704 also continue to rotate in the counterclockwise direction. As shown in FIG. 14B, during rotation of the drive gear 11704 in the counterclockwise direction, the second drive tooth 15923 of the drive gear 11704 begins to be meshed with the second transmission tooth 14821 of the transmission gear 11732 such that the drive gear 11704 stops rotating with respect to the transmission gear 11732, but begins to drive the transmission gear 11732 to rotate in the clockwise direction. Subsequently, the second drive tooth 15923 of the drive gear 11704 is disengaged from the second transmission tooth 14821 of the transmission gear 11732 and the first drive teeth 15924 of the drive gear 11704 begin to be meshed with the first transmission teeth 14823 of the transmission gear 11732, such that the counterclockwise rotation of the drive gear 11704 can further drive the transmission gear 11723 to rotate in the clockwise direction. The rotation of the transmission gear 11723 drives the flip cover 1790 to rotate in the clockwise direction and the flip cover 1790 is thus moved from the closed position to the open position.

Figure 14D:
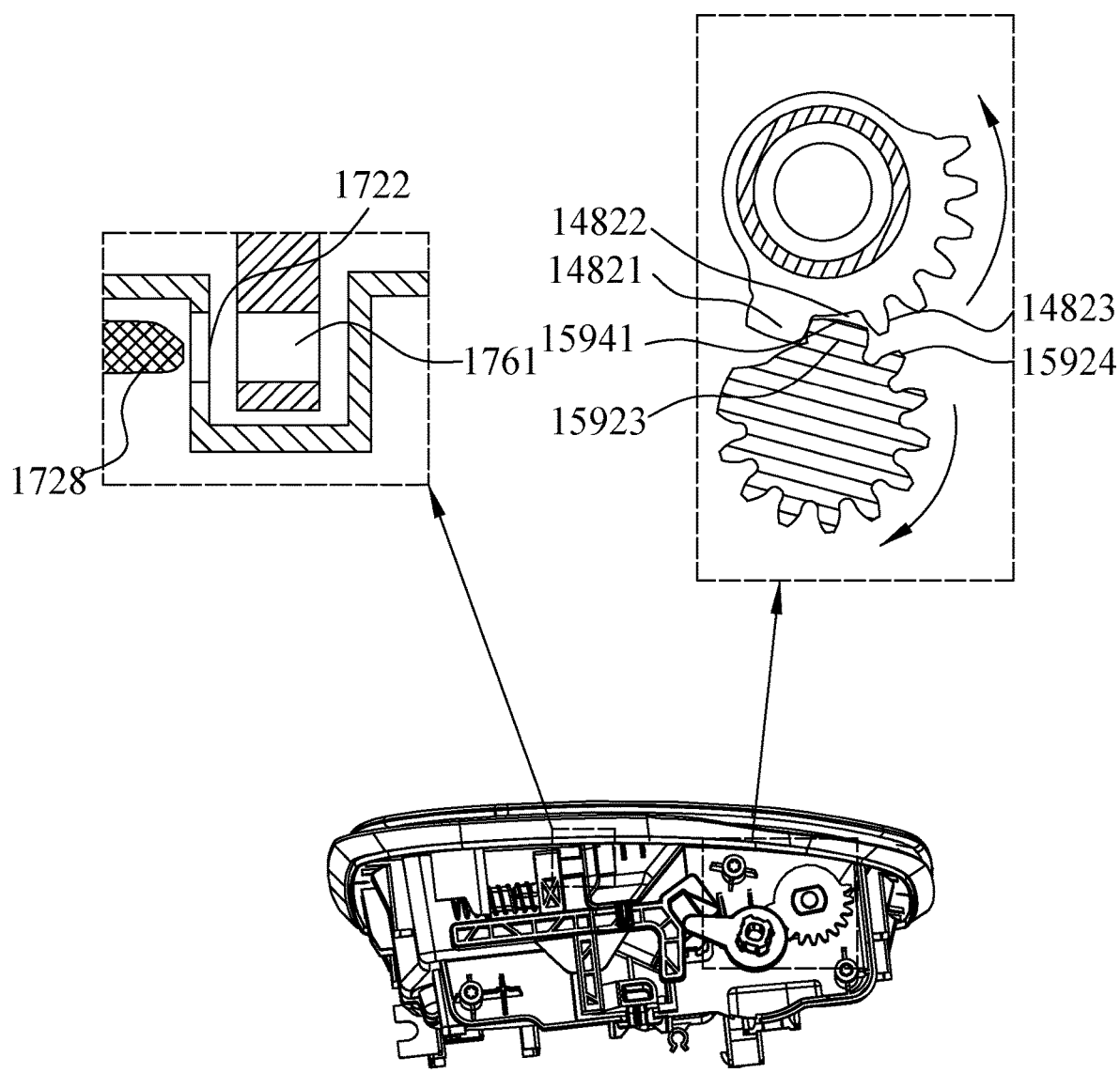
FIG. 14D is a schematic diagram showing the state of the flip cover assembly when the locking means is in the release position and the flip cover is in the closed position.
Figure 14E:
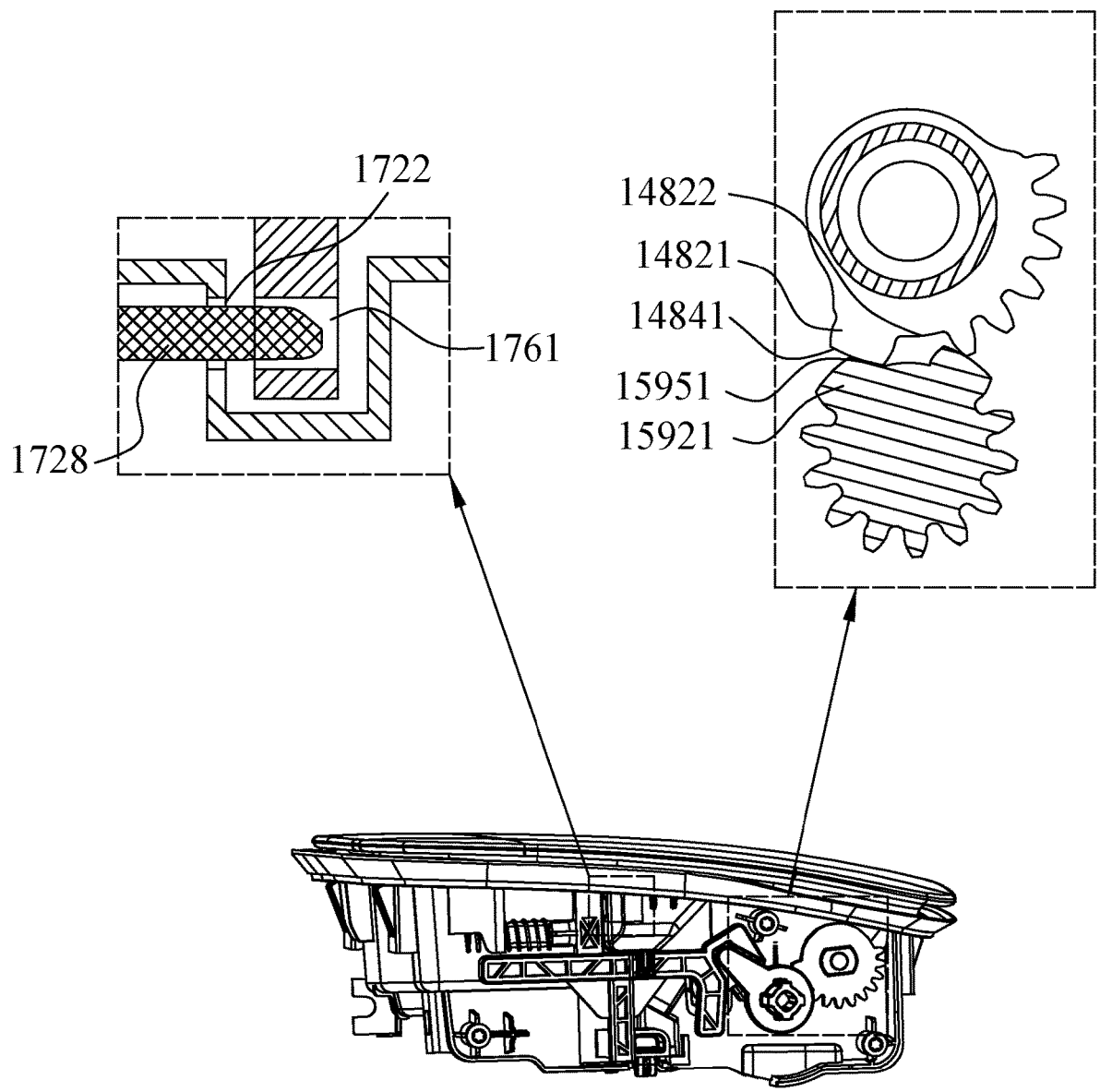
FIG. 14E is a schematic diagram showing the state of the flip cover assembly when the locking means is in the locking position and the flip cover is in the closed position.

FIGS. 14C-14E illustrate the process of closing and locking the flip cover 1790.

The process from FIGS. 14C to 14E illustrates the process of the flip cover 1790 moving from the open position to the closed position. During this process, the power source 1150 drives the drive means 11740 to rotate in the clockwise direction, and therefore, both the drive member 1102 and the drive gear 11704 also continue to rotate in the clockwise direction. As shown in FIG. 14C, during rotation of the drive gear 11704 in the clockwise direction, the first drive teeth 15924 of the drive gear 11704 are meshed with the first transmission teeth 14823 of the transmission gear 11732 such that the clockwise rotation of the drive gear 11704 can drive the transmission gear 11723 to rotate in the counterclockwise direction, and the rotation of the transmission gear 11723 drives the flip cover 1190 to rotate in the counterclockwise direction. Subsequently, the first drive teeth 15924 of the drive gear 11704 begin to be disengaged from the first transmission teeth 14823 of the transmission gear 11732 and the second drive tooth 15923 of the drive gear 11704 begins to be meshed with the second transmission tooth 14821 of the transmission gear 11732. Therefore, the drive gear 11704 can drive the transmission gear 11732 to rotate in the counterclockwise direction, thereby moving the flip cover 1790 from the open position to the closed position shown in FIG. 14E.

In the process shown from FIG. 14D to FIG. 14E, the power source 1150 drives the drive means 11740 to continue to rotate in the clockwise direction, and therefore, both the drive member 1102 and the drive gear 11704 also continue to rotate in the clockwise direction. On the one hand, the second drive tooth 15923 of the drive gear 11704 gradually rotates and, thus, disengages from the transmission disengagement portion 14822 of the transmission gear 11732. Until in the position shown in FIG. 14E, the drive gear 11704 stops driving the transmission gear 11732 to rotate, and at that moment, the drive gear 11704 rotates with respect to the transmission gear 11732. The drive gear 11704 continues to rotate clockwise until the limiting face 15951 of the third drive tooth 15921 of the drive gear 11704 abuts against the tooth crest 14841 of the second transmission tooth 14821 of the transmission gear 11732 and the drive gear 11704 does not continue to rotate in the clockwise direction. On the other hand, since the drive arm 1503 of the drive member 1102 continues to rotate in the clockwise direction, the drive arm 1503 continues to push the pushing portion 1123 of the locking means 1720 such that the locking means 1720 is moved from the unlocking position to the locking position, and the locking pin 1728 of the locking means 1720 is accordingly inserted into the through hole 1222 of the base 1101 and the flip cover hole 1111 of the hinge 1170 to keep the flip cover 1790 in the closed position. During the rotation, the first transmission tooth 14823 of the transmission gear 11732 that is connected to the transmission disengagement portion 14822 abuts against the tooth crest 15941 of the second drive tooth 15923 of the drive gear 11704 to block the rotation of the transmission gear 11732 in the clockwise direction.

Accordingly, the actuation assembly of the present disclosure can keep the flip cover 1790 in the closed position when the flip cover 1790 is in the closed position and the drive gear 11704 remains stationary.

It should be noted that in the prior art, the drive gear and the transmission gear are fully-toothed gears and are always in a meshed state. When the flip cover is located in the closed position and the flip cover is subjected to an external force, the flip cover will drive the transmission gear to rotate. Further, since the drive gear and the transmission gear are always in the meshed state, the transmission gear will drive the drive gear to rotate. This may compromise the drive means connected to the drive gear. In the present disclosure, since the limiting face 15951 of the third drive tooth 15921 of the drive gear 11704 abuts against the tooth crest 14841 of the second transmission tooth 14821 of the transmission gear 11732 when the flip cover 1790 is in the closed position, the rotation of the flip cover 1790 and the transmission gear 11732 is blocked and the drive gear 11704 is also prevented from driving the drive means 11740 to rotate, thereby protecting the drive means 11740 while keeping the flip cover 1790 in the closed position.

It should also be noted that, although the flip cover in the refueling port or charging port flip cover assembly of the first and second embodiments of the present disclosure is rotatable with respect to the base and the flip cover in the refueling port or charging port flip cover assembly of the third embodiment of the present disclosure is translatable with respect to the base, it is within the scope of protection of the present disclosure that the flip cover is movably disposed with respect to the base.

This description uses examples to disclose the present disclosure, in which one or more examples are illustrated in the drawings. Each example is provided to explain the present disclosure but is not intended to limit the present disclosure. In fact, it would have been obvious to those skilled in the art that various modifications and variations can be made to the present disclosure without departing from the scope or spirit of the present disclosure. For example, the illustrated or described features as part of one embodiment can be used with another embodiment to provide a further embodiment. Thus, it is intended that the present disclosure cover the modifications and variations made within the scope of the appended claims and their equivalents.

The invention claimed is:

1. An actuation assembly for actuating a flip cover rotatably mounted on a base, the actuation assembly comprising:
   a locking means, the locking means being movably disposed on the base and configured to lock or release the flip cover;
   a flip cover rotating shaft, the flip cover rotating shaft being configured to drive the flip cover to rotate, and the flip cover rotating shaft comprising a fitting portion;
   a transmission gear, the transmission gear comprising a receiving portion, and the transmission gear being installed around the fitting portion of the flip cover rotating shaft by means of the receiving portion; and
   a drive gear and a drive member, the drive gear and the drive member being configured to synchronously rotate under the drive of a common power source, the drive gear being meshed with the transmission gear for transmission, and the drive member being configured to drive the locking means to move,
   wherein the fitting portion and the receiving portion are provided with an engagement structure configured to enable the receiving portion to be rotatably engaged with or disengaged from the fitting portion, when the receiving portion is rotatably engaged with the fitting portion, the drive gear being configured to drive the flip cover to rotate by means of the transmission gear and the flip cover rotating shaft, and when the receiving portion is rotatably disengaged from the fitting portion, the transmission gear being configured to rotate with respect to the flip cover rotating shaft.

2. The actuation assembly of claim 1, wherein the locking means has a locking position and a release position, and the locking means is configured to lock the flip cover when the locking means is in the locking position and to release the flip cover when the locking means is in the release position; and
   wherein the engagement structure is configured such that in the process of moving the locking means from the locking position to the release position, the receiving portion is rotationally disengaged from the fitting portion such that the transmission gear rotates with respect to the flip cover rotating shaft, and when the receiving portion is rotationally engaged with the fitting portion to drive the flip cover rotating shaft to rotate by means of the transmission gear so as to open the flip cover, the locking means is in the release position.

3. The actuation assembly of claim 2, wherein the engagement structure comprises a protrusion disposed on the flip cover rotating shaft and a protrusion receiving cavity formed in the transmission gear, the protrusion being formed by extending outward from an outer periphery of the flip cover rotating shaft; and wherein in a rotating direction of the flip cover rotating shaft, the size of the protrusion receiving cavity is greater than that of the protrusion.

4. The actuation assembly of claim 1, wherein the transmission gear is fan shaped, and an outer circumference of the fan includes a toothed portion for meshing with the drive gear; and wherein the toothed portion is disposed around the receiving portion.

5. The actuation assembly of claim 4, wherein a central angle of the toothed portion of the outer circumference of the transmission gear is greater than the maximum angle to which the flip cover is configured to be opened.

6. The actuation assembly of claim 1, wherein the drive gear comprises outer teeth (505), the outer teeth (505) being disposed around the entire outer circumference of the drive gear.

7. The actuation assembly of claim 1, wherein
a drive means comprises a drive shaft, the drive gear and the drive member being connected to the drive shaft, and the drive gear and the drive member being configured to rotate with the rotation of the drive shaft; and wherein the drive shaft is driven by the common power source.

8. The actuation assembly of claim 7, wherein the drive member comprises a drive arm, the drive arm being rotatable around the drive shaft; and wherein the drive arm and the locking means are configured such that the drive arm is configured to push the locking means to move from the locking position to the release position.

9. A refueling port or charging port flip cover assembly, comprising:
a base;
a flip cover, the flip cover being rotatably mounted on the base; and
an actuation assembly according to claim 1, the actuation assembly being disposed on the base.

10. The refueling port or charging port flip cover assembly of claim 9, wherein the base is provided with a through hole, and the flip cover is provided with a locking receiving portion; and wherein the locking means is configured to pass through the through hole and the locking receiving portion so as to lock the flip cover.

* * * * *